(12) United States Patent
Krull et al.

(10) Patent No.: US 11,078,383 B2
(45) Date of Patent: Aug. 3, 2021

(54) ADHESIVE ARTICLES PERMITTING DAMAGE FREE REMOVAL

(71) Applicant: 3M INNOVATIVE PROPERTIES COMPANY, St. Paul, MN (US)

(72) Inventors: Brett P. Krull, Saint Anthony, MN (US); Dawud H. Tan, Lakeland, MN (US); Saurabh Batra, Minneapolis, MN (US); Bryan L. Gerhardt, Woodbury, MN (US); Stephen M. Sanocki, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/797,516

(22) Filed: Feb. 21, 2020

(65) Prior Publication Data
US 2020/0190365 A1 Jun. 18, 2020

Related U.S. Application Data

(63) Continuation of application No. PCT/US2018/047864, filed on Aug. 24, 2018.
(Continued)

(51) Int. Cl.
*C09J 7/21* (2018.01)
*C09J 7/26* (2018.01)
(Continued)

(52) U.S. Cl.
CPC .......... *C09J 7/21* (2018.01); *C09J 2301/124* (2020.08); *C09J 2301/16* (2020.08); *C09J 2400/283* (2013.01)

(58) Field of Classification Search
CPC ................. Y10T 428/24612; C09J 7/21; C09J 2301/124; C09J 2301/16; C09J 2400/283;
(Continued)

(56) References Cited

U.S. PATENT DOCUMENTS 2,464,301 A 3/1949 Francis, Jr.
2,679,072 A 5/1954 New
(Continued)

FOREIGN PATENT DOCUMENTS

CN 202179408 U 4/2012
CN 202301406 U 7/2012
(Continued)

OTHER PUBLICATIONS

Davies, "The Separation of Airborne Dust Particles", Institution of Mechanical Engineers, London, Proceedings (B) 1952-53, vol. 1B, Nos. 1-12, pp. 185-198.

*Primary Examiner* — Joanna Pleszczynska
(74) *Attorney, Agent, or Firm* — 3M IPC

(57) ABSTRACT

The present disclosure provides adhesive articles that can be removed from surfaces without damage by having reduced or eliminated contribution of a core backing to peel force generated by the adhesive during removal. In some instances, this can be accomplished by a core that loses structural integrity in a direction normal to a plane defined by a major surface. In other instances, the contribution is reduced by compromising the interface between the core and a peelable adhesive layer.

14 Claims, 20 Drawing Sheets

Related U.S. Application Data

(60) Provisional application No. 62/622,387, filed on Jan. 26, 2018, provisional application No. 62/550,204, filed on Aug. 25, 2017.

(51) Int. Cl.
*B32B 3/26* (2006.01)
*B32B 3/30* (2006.01)
*B32B 5/02* (2006.01)
*B32B 27/12* (2006.01)

(58) Field of Classification Search
CPC . C09J 7/26; B32B 3/263; B32B 5/022; B32B 3/30; B32B 27/12
See application file for complete search history.

(56) References Cited

U.S. PATENT DOCUMENTS

| | | | |
|---|---|---|---|
| 3,507,943 A | 4/1970 | Such et al. | |
| 3,691,140 A | 9/1972 | Silver | |
| 3,737,368 A | 6/1973 | Such et al. | |
| 3,780,537 A | 12/1973 | Spencer | |
| 3,802,817 A | 4/1974 | Matsuki et al. | |
| 3,844,869 A | 10/1974 | Rust, Jr. | |
| 3,857,731 A | 12/1974 | Merrill, Jr. et al. | |
| 4,166,152 A | 8/1979 | Baker et al. | |
| 4,259,399 A | 3/1981 | Hill | |
| 4,472,480 A | 9/1984 | Olson | |
| 4,599,766 A | 7/1986 | Wirth | |
| 4,640,810 A | 2/1987 | Laursen et al. | |
| 4,726,982 A | 2/1988 | Traynor et al. | |
| 4,736,048 A | 4/1988 | Brown et al. | |
| 4,844,973 A * | 7/1989 | Konishi | C09J 7/21 442/149 |
| 4,980,443 A | 12/1990 | Kendziorski et al. | |
| 5,082,706 A | 1/1992 | Tangney | |
| 5,096,532 A | 3/1992 | Neuwirth et al. | |
| 5,110,403 A | 5/1992 | Ehlert | |
| 5,114,787 A | 5/1992 | Chaplin et al. | |
| 5,167,765 A | 12/1992 | Nielsen et al. | |
| 5,256,231 A | 10/1993 | Gorman et al. | |
| 5,277,976 A | 1/1994 | Hogle et al. | |
| 5,409,189 A | 4/1995 | Lühmann | |
| 5,491,012 A | 2/1996 | Lühmann et al. | |
| 5,501,679 A | 3/1996 | Krueger | |
| 5,507,464 A | 4/1996 | Hamerski et al. | |
| 5,516,581 A | 5/1996 | Kreckel et al. | |
| 5,643,397 A | 7/1997 | Gorman et al. | |
| 5,697,961 A | 12/1997 | Kiamil | |
| 5,817,199 A | 10/1998 | Brennecke et al. | |
| 5,843,145 A | 12/1998 | Brink | |
| 5,965,256 A | 10/1999 | Barrera | |
| 5,967,474 A | 10/1999 | doCanto et al. | |
| 5,976,316 A | 11/1999 | Mlinar et al. | |
| 5,989,708 A | 11/1999 | Kreckel | |
| 6,082,686 A | 7/2000 | Schümann | |
| 6,129,964 A | 10/2000 | Seth | |
| 6,131,864 A | 10/2000 | Schümann | |
| 6,197,397 B1 | 3/2001 | Sher et al. | |
| 6,368,687 B1 | 4/2002 | Joseph et al. | |
| 6,383,958 B1 | 5/2002 | Swanson et al. | |
| 6,403,206 B1 | 6/2002 | Breis | |
| 6,429,159 B1 | 8/2002 | Watanabe et al. | |
| 6,569,521 B1 | 5/2003 | Sheridan | |
| 6,572,945 B2 | 6/2003 | Bries | |
| 6,607,624 B2 | 8/2003 | Berrigan et al. | |
| 6,730,397 B2 | 5/2004 | Melancon et al. | |
| 6,811,126 B2 | 11/2004 | Johansson et al. | |
| 6,835,452 B1 | 12/2004 | Hamerski | |
| 6,972,141 B1 | 12/2005 | Bries | |
| 7,028,958 B2 | 4/2006 | Pitzen et al. | |
| 7,690,548 B2 | 4/2010 | Mlinar et al. | |
| 7,781,056 B2 | 8/2010 | Bries | |
| 7,795,326 B2 | 9/2010 | Salamone et al. | |
| 8,162,153 B2 | 4/2012 | Fox et al. | |
| 8,202,594 B2 | 6/2012 | Kobayashi et al. | |
| D665,653 S | 8/2012 | Thompson et al. | |
| 8,240,484 B2 | 8/2012 | Fox | |
| 8,398,804 B2 | 3/2013 | Baqai et al. | |
| 8,481,156 B2 | 7/2013 | Suzuki et al. | |
| 8,530,021 B2 | 9/2013 | Bartusiak et al. | |
| 8,534,419 B2 | 9/2013 | Coates et al. | |
| 8,550,423 B2 | 10/2013 | Taylor et al. | |
| 8,685,204 B2 | 4/2014 | Nakano et al. | |
| 8,708,305 B2 | 4/2014 | McGreevy | |
| 8,765,881 B2 | 7/2014 | Hays et al. | |
| 9,139,940 B2 | 9/2015 | Berrigan et al. | |
| 9,469,091 B2 | 10/2016 | Henke et al. | |
| 9,493,680 B2 | 11/2016 | Schümann et al. | |
| 2002/0193724 A1* | 12/2002 | Stebbings | A61F 13/0246 602/54 |
| 2003/0077423 A1 | 4/2003 | Flanigan et al. | |
| 2004/0011506 A1 | 1/2004 | Langlois et al. | |
| 2004/0131846 A1 | 7/2004 | Epple et al. | |
| 2005/0137375 A1 | 6/2005 | Hansen et al. | |
| 2008/0038976 A1 | 2/2008 | Berrigan et al. | |
| 2008/0138618 A1 | 6/2008 | Sasaki et al. | |
| 2008/0190544 A1 | 8/2008 | Hopf | |
| 2009/0075052 A1 | 3/2009 | Hopf | |
| 2009/0272491 A1 | 11/2009 | Kobayashi | |
| 2010/0274333 A1 | 10/2010 | Dunshee et al. | |
| 2011/0000845 A1 | 1/2011 | Fox | |
| 2011/0300361 A1 | 12/2011 | Nakayama | |
| 2012/0171913 A1 | 7/2012 | Fox | |
| 2012/0220975 A1 | 8/2012 | Chan et al. | |
| 2013/0059114 A1 | 3/2013 | Grynaeus et al. | |
| 2013/0101805 A1 | 4/2013 | Altshuler et al. | |
| 2014/0027064 A1 | 1/2014 | Tani et al. | |
| 2014/0041786 A1 | 2/2014 | Henke | |
| 2014/0083608 A1 | 3/2014 | Schubert et al. | |
| 2014/0127501 A1 | 5/2014 | Schuemann | |
| 2014/0213716 A1 | 7/2014 | Okada et al. | |
| 2014/0306076 A1 | 10/2014 | Friesch | |
| 2014/0308482 A1 | 10/2014 | Masunari et al. | |
| 2014/0335299 A1 | 11/2014 | Wang et al. | |
| 2014/0370221 A1* | 12/2014 | Chen | C09J 7/26 428/40.2 |
| 2015/0027625 A1 | 1/2015 | Wright et al. | |
| 2015/0034104 A1 | 2/2015 | Zhou | |
| 2016/0002838 A1 | 1/2016 | Ausen | |
| 2016/0145471 A1 | 5/2016 | Krawinkel et al. | |
| 2017/0014733 A1 | 1/2017 | Massingill | |
| 2017/0015163 A1 | 1/2017 | Sielhorst | |
| 2017/0022339 A1 | 1/2017 | Hanschen | |
| 2017/0051442 A1 | 2/2017 | Endle et al. | |
| 2018/0024347 A1 | 1/2018 | Kiedrowski et al. | |
| 2019/0359861 A1 | 11/2019 | Runge et al. | |

FOREIGN PATENT DOCUMENTS

| | | |
|---|---|---|
| CN | 202312760 U | 7/2012 |
| CN | 202312761 U | 7/2012 |
| CN | 202477318 U | 10/2012 |
| CN | 203000466 U | 6/2013 |
| CN | 103254828 | 8/2013 |
| CN | 203468257 U | 3/2014 |
| CN | 103834321 | 6/2014 |
| CN | 204722780 U | 10/2015 |
| DE | 3331016 | 7/1992 |
| DE | 102004030252 | 1/2006 |
| JP | 2006-346940 | 12/2006 |
| JP | 5028580 | 9/2012 |
| JP | 5129925 | 1/2013 |
| JP | 2014-221115 | 11/2014 |
| JP | 2014-240477 | 12/2014 |
| KR | 100792493 | 1/2008 |
| TW | M413038 | 10/2011 |
| WO | 2005/110737 | 11/2005 |
| WO | 2007/75771 | 7/2007 |
| WO | 2012/152715 | 11/2012 |
| WO | 2014/151414 | 9/2014 |
| WO | 2015/035556 | 3/2015 |
| WO | 2015/035960 | 3/2015 |

(56) References Cited

FOREIGN PATENT DOCUMENTS

| WO | 2015/195344 | 12/2015 |
|----|-------------|---------|
| WO | 2016/109418 | 7/2016 |
| WO | 2016/109420 | 7/2016 |
| WO | 2016/168283 | 10/2016 |
| WO | 2016/182803 | 11/2016 |
| WO | 2016/209916 | 12/2016 |
| WO | 2017/014733 | 1/2017 |
| WO | 2017/015163 | 1/2017 |
| WO | 2017/030856 | 2/2017 |
| WO | 2017/083289 | 5/2017 |
| WO | 2017/109210 | 6/2017 |
| WO | 2017/136188 | 8/2017 |
| WO | 2017/136189 | 8/2017 |
| WO | 2017/136219 | 8/2017 |
| WO | 2017/136432 | 8/2017 |
| WO | 2018/039584 | 3/2018 |
| WO | 2018/183195 | 10/2018 |
| WO | 2019/040820 | 2/2019 |

\* cited by examiner

1000μm

1000μm

1000μm

1000μm

ADHESIVE ARTICLES PERMITTING DAMAGE FREE REMOVAL

RELATED APPLICATIONS

This application is a continuation application of 35 U.S.C. 371 of PCT/US2018/047,864, filed Aug. 24, 2018, which claims the benefit of provisional Application No. 62/622,387, filed Jan. 26, 2018, and provisional Application No. 62/550,204, filed Aug. 25, 2017, the disclosures of which are incorporated by reference in their entirety herein.

This application is related to PCT/US2018/047,939, filed Aug. 24, 2018, which claims the benefit of provisional Application No. 62/550,190, filed Aug. 25, 2017, the disclosures of which are incorporated by reference in their entirety herein.

TECHNICAL FIELD

The present disclosure generally relates to peelable adhesive articles that are capable of attaching or adhering to a substrate and that can be removed from the substrate without causing damage to the substrate. The present disclosure also generally relates to methods of making and using such adhesive articles.

BACKGROUND

The revolutionary Command® Adhesive Strip products are a line of stretch removable adhesive strips that hold strongly on a variety of surfaces (including paint, wood, and tile) and that remove cleanly—no holes, marks, or sticky residue. These products generally have utility in bonding to various surfaces or substrates for numerous applications.

In general, these products include a stretch release adhesive composition disposed on tape or other backings. Stretch releasable adhesives are high performance pressure-sensitive adhesives that combine strong holding power with clean removal and no surface damage. Stretch releasable adhesive products are designed to firmly adhere an article, such as a hook (to hold a picture or an article of clothing) or other decorative or utilitarian element, to a surface (an adherend), yet remove cleanly when pulled away from the architectural surface at a low angle. The clean removal aspect means that a tacky and/or unsightly residue is not left behind on the surface after removal of the stretch release adhesive and that no damage to the surface occurs during the removal process. During the process of stretch release removal, the adhesive layer typically remains adhered to the tape backing as the backing is stretched, but releases from the surface (adherend).

Peelable adhesive technology was recently introduced into products for mounting. Some exemplary commercially available peelable mounting products (e.g., Jimmy Hook™ products, GeckoTech™ products, Elmer's Freestyle™ products, and Hook Um™ products) rely on both suction technology and frictional or dry adhesives to generate the mounting device's holding power. The mounting devices include a semi-rigid plastic backing and a rigid hook, both of which are integrated as a one-piece article support. The rigid hook is permanently attached to a first major planar surface of the semi-rigid plastic backing. The second major planar surface of the backing can be adhered to a wall surface. The second major planar surface includes one or more of suction technology (e.g., numerous microsuction or nanosuction elements) and/or a frictional adhesive (in which the backing is impregnated with a rubber-based adhesive to increase friction between the substrate and backing) or dry adhesive (which relies on van der Waals forces). The entire construction can, thereafter, be removed by peeling.

SUMMARY

Existing peelable adhesive products often do not work well on various surfaces, including, for example, painted surfaces and rough surfaces (e.g., drywall). Additionally, the existing peelable products can exhibit low shear strength and thus can hold little weight or alternatively require a relatively thick construction, which can cause an increase in the potential for damage when such products are removed from an adherend. Attempts have been made to replace existing backings with those having lower stiffness (modulus) to reduce the peel force upon removal. Soft, elastic backings, for example, have been shown to result in lower peel forces, which correlate with appreciable stretch (strain) of the adhesive at release. Even with advantageous modifications to the backing materials, the present inventors recognized that certain delicate surfaces (e.g., paper and drywall) still experienced visible damage, particularly under circumstances in which the ability of the backing to stretch is compromised. As such, the inventors of the present disclosure sought to formulate peelable mounting products and/or adhesive articles with at least one of higher shear strength, ability to work well on painted or rough surfaces, and/or that are capable of consistently holding higher weights, all without damaging the substrate to which they are applied.

The inventors of the present disclosure recognized that the existing peel release adhesive products could be improved or enhanced by reducing or eliminating the contribution of the backing to peel force generated by the adhesive during removal. In some instances, this can be accomplished by ensuring the core loses structural integrity in a direction normal to a plane defined by a major surface thereof. In other instances, the contribution is reduced by compromising the interface between the backing and a peelable adhesive layer. By separating the peel force from characteristics of the backing, the adhesive articles of the present disclosure can capitalize on myriad backing materials and constructions without deleteriously impacting damage free removability. In some instances, the enhanced construction allows the adhesive articles to hold more weight. In some embodiments, the enhanced performance permits the adhesive articles to be used on new surfaces (e.g., delicate paper). In some embodiments, the enhanced removability increases or enhances the product performance on certain surfaces (e.g., rough or textured surfaces such as, for example, wallpaper, drywall, etc.).

The inventors of the present disclosure also recognized that providing a backing that minimally contributes to the peel release force during the removal process is a novel and effective method to increase performance of the adhesive article while enhancing the damage-free features of the product.

In one aspect, the present disclosure provides an adhesive article comprising a first peelable adhesive layer, a second peelable adhesive layer, and a discrete core disposed between the first and second peelable adhesives and defining a core plane.

In another aspect, the present disclosure provides an adhesive article for mounting an object to a surface, the article comprising: a first adhesive layer; a core adjacent the first adhesive layer and defining a perimeter, the core comprising core material and including first and second major surfaces; and a first arranged pattern of recesses on at least the first major surface of the core, each recess terminating in a membrane comprising core material; and an adhesive interface at the bottom wall surface, wherein the adhesive interface comprises contact between the first adhesive layer and the membrane.

In another aspect, the present disclosure provides a method for making an adhesive article, the method comprising: providing a core having first and second opposing major surfaces and including a consolidatable core material; laminating a peelable adhesive on at least one of the major surfaces; and consolidating a plurality of discrete regions of the material to form an arranged pattern of recesses; and creating a plurality of adhesive interfaces between the peelable adhesive and each consolidated region of the backing. In some embodiments, the consolidating occurs through ultrasonic point bonding. In another aspect, the backing is provided having a first arranged pattern of recesses, and the consolidation creates a second pattern of recesses.

In yet another aspect, the present disclosure provides an adhesive article for mounting an object to a surface, the article comprising: a first adhesive layer comprising a first peelable adhesive composition: a core adjacent the first adhesive layer and defining a perimeter, the core comprising porous core material and including first and second major surfaces; and a first arranged pattern of recesses on at least the first major surface of the core, each recess terminating in a membrane comprising core material, wherein the first peelable adhesive composition is at least partially within the pores of each membrane.

As used herein, "porosity" means a measure of void spaces in a material. Size, frequency, number, and/or interconnectivity of pores and voids contribute the porosity of a material.

As used herein, "void volume" means a percentage or fractional value for the unfilled space within a porous or fibrous body, such as a web or filter, which may be calculated by measuring the weight and volume of a web or filter, then comparing the weight to the theoretical weight of a solid mass of the same constituent material of that same volume.

As used herein, "Solidity" describes a dimensionless fraction (usually reported in percent) that represents the proportion of the total volume of a nonwoven web that is occupied by the solid (e.g., polymeric filament) material. Loft is 100% minus Solidity and represents the proportion of the total volume of the web that is unoccupied by solid material.

As used herein, "layer" means a single stratum that may be continuous or discontinuous over a surface.

As used herein, the terms, "height", "depth", "top" and "bottom" are for illustrative purposes only, and do not necessarily define the orientation or the relationship between the surface and the intrusive feature. Accordingly, the terms "height" and "depth", as well as "top" and "bottom" should be considered interchangeable.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As recited herein, all numbers should be considered modified by the term "about".

As used herein, "a", "an", "the", "at least one", and "one or more" are used interchangeably. Thus, for example, a core comprising "a" pattern of recesses can be interpreted as a core comprising "one or more" patterns.

Also herein, the recitations of numerical ranges by endpoints include all numbers subsumed within that range (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exhaustive list.

Figure 1:
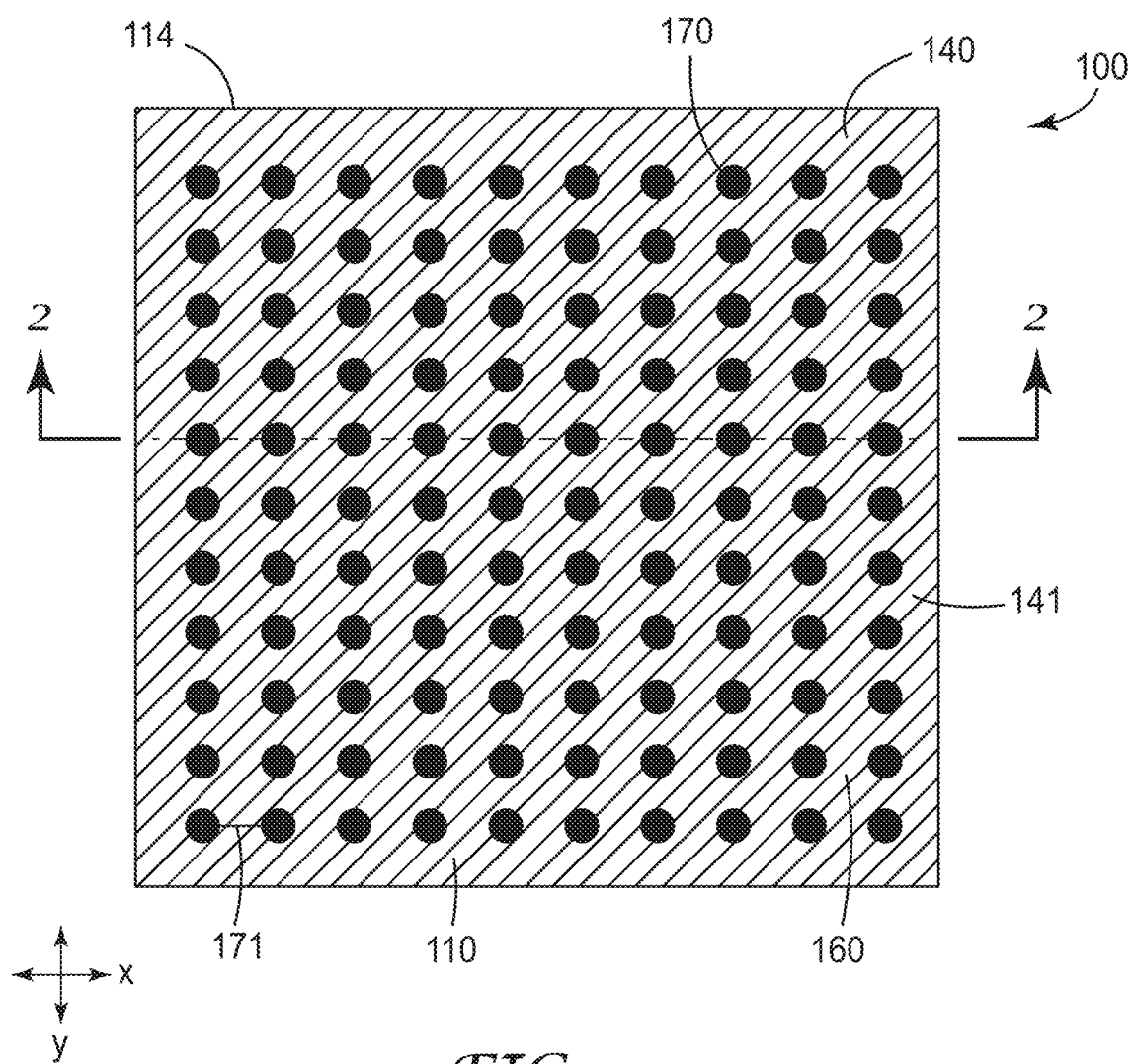
FIG. 1 is a top plan view of one embodiment of an exemplary adhesive article of the type generally described herein.

Layers in certain depicted embodiments are for illustrative purposes only and are not intended to absolutely define the thickness, relative or otherwise, or the absolute location of any component. While the above-identified figures set forth several embodiments of the disclosure other embodiments are also contemplated, as noted in the description. In all cases, this disclosure is presented by way of representation and not limitation. It should be understood that numerous other modifications and embodiments can be devised by those skilled in the art, which fall within the scope and spirit of the principles of the disclosure.

DETAILED DESCRIPTION

Various embodiments and implementations will be described in detail. These embodiments should not be construed as limiting the scope of the present application in any manner, and changes and modifications may be made without departing from the spirit and scope of the inventions. Further, only some end uses have been discussed herein, but end uses not specifically described herein are included within the scope of the present application. As such, the scope of the present application should be determined by the claims.

The present disclosure generally relates to adhesive articles that can be removed from a substrate, wall, or surface (generally, an adherend) without damage. As used herein, the terms "without damage" and "damage-free" or the like means the adhesive article can be separated from the substrate without causing visible damage to paints, coatings, resins, coverings, or the underlying substrate and/or leaving behind residue. Visible damage to the substrates can be in the form of, for example, scratching, tearing, delaminating, breaking, crumbling, straining, and the like to any layers of the substrate. Visible damage can also be discoloration, weakening, changes in gloss, changes in haze, or other changes in appearance of the substrate.

The adhesive article includes (1) one or more peelable adhesive layers adjacent to (2) a discrete core. As used herein, the term "peelable" means that the adhesive article can be removed from a substrate or surface by peeling at angle of between about 1° and about 180°. In some embodiments, the adhesive article can be removed from a substrate or surface by peeling at angle of between 30° to 120°. In some embodiments, the adhesive article can be removed from a substrate or surface by peeling at angle of at least about 35°.

During peel release removal, specified regions of the core and adhesive undergo delamination. In particular, the articles of the present disclosure feature destructible adhesive/core material interfaces offset from major surfaces, preventing force from easily transferring from the load introduced during peel removal to an adherend. The adhesive articles are thus specifically designed to mimic a "backingless" construction, where the core has little to no contribution to adhesive removal forces experienced by the adherend. The "backingless" construction provides an adhesive article with a peel force that does not exceed the damage threshold on substrates including, for example, drywall, paint, glass, etc.

Figure 2:
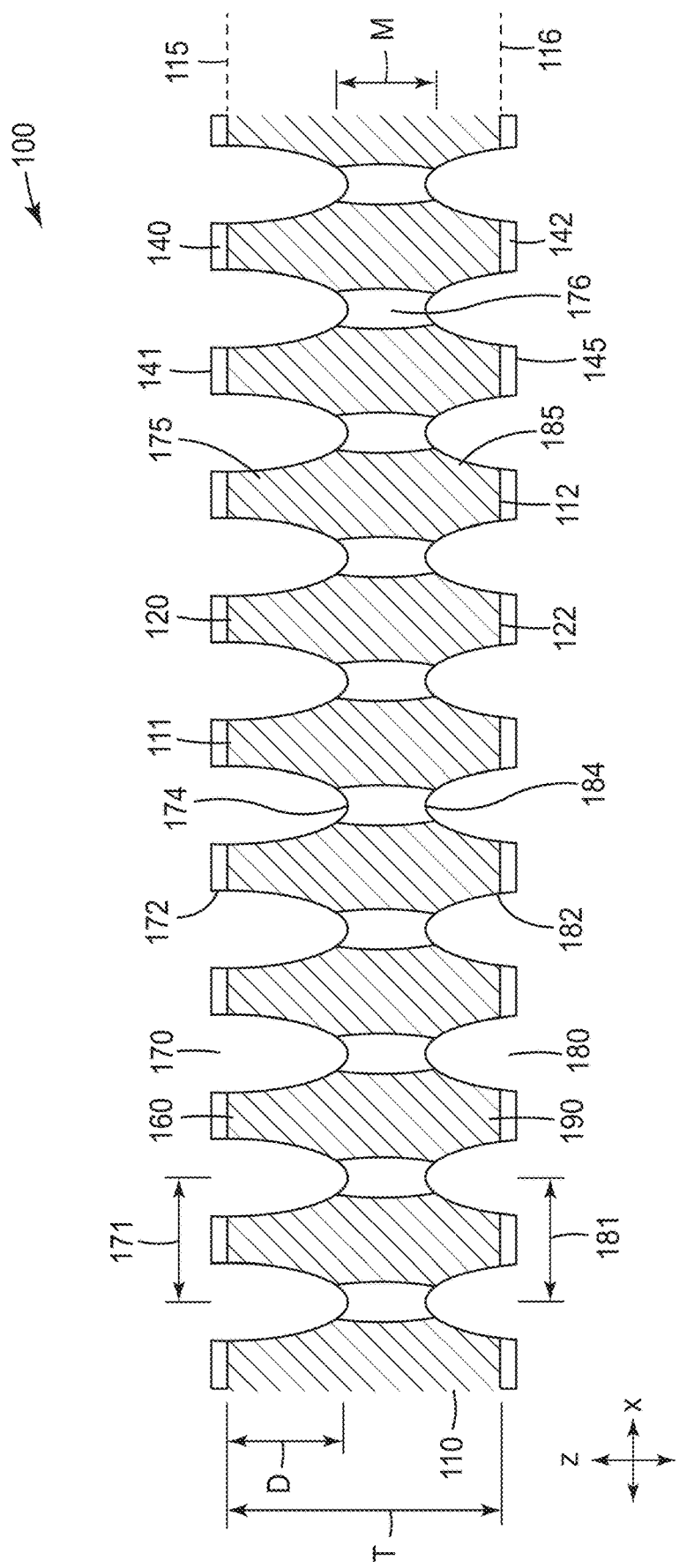
FIG. 2 is a cross-sectional view of the adhesive article of FIG. 2.

FIGS. 1 and 2 depict an exemplary embodiment of an adhesive article 100 as generally described herein. The adhesive article 100 includes a core 110 having first and second opposed major surfaces 111 and 112. FIG. 1 depicts the adhesive article 100 in top plan view, with the core 110 visible through an adhesive layer 140. In some embodiments, the adhesive 140 can be generally optically clear such that the core is at least partially visible. In other embodiments, the adhesive layer 140 can be generally opaque or the core may be otherwise not visually identifiable in top plan view. As seen in FIG. 2, the core 110 has a square shape defined by an upper edge, a lower edge, and side edges. The shape of the core 110 is not particularly limited, and can include any suitable shape or combination of shapes. The edges cooperate to form a core perimeter 114, which defines an identifiable boundary between the core and the remainder of the adhesive article 100 (e.g., adhesive layer 140).

The core 110 exists as a distinct structural component of adhesive article 100 and not as material dispersed or otherwise distributed in one or both adhesive layers 140, 142. Materials forming core 110 can include a paper, natural or synthetic polymer films, nonwovens made from natural and/or synthetic fibers and combinations thereof, fabric reinforced polymer films, fiber or yarn reinforced polymer films or nonwovens, fabrics such as woven fabric formed of threads of synthetic or natural materials such as cotton, nylon, rayon, glass, ceramic materials, and the like, or combinations of any of these materials. The core 110 may also be formed of metal, metallized polymer films, or ceramic sheet materials in combination with at least one of the above. In some embodiments, the core is a multilayered film having two or more layers; in some such embodiments the layers are laminated. For example, the core can be formed of a foam, a film, or a combination thereof with any suitable thickness, composition, and opaqueness or clarity. In other embodiments, the core may include an arrangement of discrete particles or an adhesive or other composition having relatively high gel content. Exemplary materials and constructions for the core 110 are explored in further detail below. Combinations of two or more such compositions and constructions are also useful in various embodiments of the present disclosure.

In the specific embodiment of FIGS. 1 & 2, the core 110 includes a single core layer of material having a thickness "T", though multilayer or multi-material constructions are also contemplated and described herein. In some embodiments, the core has a thickness "T" of between about 2 mils and about 100 mils. In some embodiments, the core has a thickness of greater than 2 mils, greater than 5 mils, greater than 8 mils, greater than 10 mils, greater than 12 mils, greater than 15 mils, greater than 20 mils, greater than 22 mils, or greater than 24 mils. In some embodiments, the core has a thickness of less than 100 mils, less than 90 mils, less than 80 mils, less than 75 mils, less than 70 mils, less than 65 mils, less than 60 mils, less than 55 mils, less than 50 mils, less than 45 mils, less than 40 mils, less than 38 mils, less than 35 mils, less than 32 mils, less than 30 mils, less than 28 mils, or less than 25 mils.

As depicted in of FIG. 2, the core 110 is generally rectangular in cross-section, however the core may have a variety of cross-sectional shapes. For example, the cross-sectional shape of the core 110 may be a polygon (e.g., square, tetrahedron, rhombus, trapezoid), which may be a regular polygon or not, or the cross-sectional shape of the core 110 can be curved (e.g., round or elliptical). A first core plane 115 is coincident with the first major surface 111, while a second core plane 116 is coincident with the second major surface 112. The core planes 115, 116 are depicted in parallel, but may intersect and form an oblique angle in other embodiments.

Each of the major surfaces 111, 112 are adjacent to peelable adhesive layers 140 and 142. Peelable adhesive layers 140 and 142 can be the same as one another or disparate from one another. Disparate, in this context, is used to describe substantial differences in composition or adhesive performance. Adhesive layers 140 and 142 can each be a single layer or can be multilayer. Adhesive layers 140 and 142 can each be continuous or discontinuous (e.g., patterned) across the major surfaces of the core 110. Each of adhesive layers 140 and 142 include opposed major surfaces 141, 145, respectively. An available bond area for the article includes by the total area defined by opposed major surfaces 141, 145 of each adhesive layer on the major surfaces 111, 112 of the core 110. In embodiments featuring recesses as detailed herein, the available bond area will not include the recesses. The available bond areas of the major surfaces 141, 145 are used to couple the adhesive article 100 to, for example, a wall surface or a hardgood. In other exemplary embodiments, an adhesive article 100 may lack an adhesive layer on the second major surface 112.

The adhesive layers 140 and 142, as depicted, are no more than coextensive with the major surfaces 111, 112 of the core and are separated by the thickness "T". The core 110 is thus discrete from the adhesive layers 140, 142 and includes a defined and identifiable geometry, as described above. In other embodiments, the adhesive layers are in contact in areas surrounding the perimeter of the core 110. Such constructions are described in detail in applicants co-filed provisional application matter No. 79561US002, entitled "Adhesive Articles Permitting Damage Free Removal". The thickness of the adhesive layer(s) is not particularly limited, but is typically substantially continuous across at least the major surfaces of the core. In presently preferred implementations, the thickness of the adhesive layer is no greater than 95% of the core thickness "T", no greater than 90%, no greater than 80%, no greater than 75%, no greater than 60%, no greater than 50%, no greater than 40%, no greater than 30%, no greater than 20%, and in some embodiments no greater than 10% of the core thickness "T". In typical embodiments, one or both adhesive layers 140, 142 have a thickness of between about 1 mil and about 3 mils. The thickness of a given adhesive layer 140, 142 may be different from the other or the same.

The core 110 includes an array of recesses 170 on the first major surface 111 and an array of recesses 180 on the second major surface 112. Recesses, for example, can include wells, cavities, concavities, pockets, channels, and the like. Recesses 170, 180 can have a volume with dimensions such as diameter, radius, depth, length, and width. A base of the recess can generally refer to a location within the recessed feature having points lying closest to an average elevation of a major surface, while the surface or region of the recess farthest from the average elevation is considered an apex or bottom surface.

In some embodiments and as depicted in FIGS. 1-2, the core 110 includes an arranged pattern of recesses 170, 180. An "arranged pattern" is a plurality of features (e.g., recesses, channels, etc.) arranged at predetermined positions, arranged with some degree of regularity, or arranged in any desired manner. The recesses 170, 180 in core 110 are each arranged in a grid array, but other patterns and arrangements are possible. In some embodiments, one or both recesses 170, 180 are distributed as a periodic array across a core surface (e.g., a one-dimensional array or a two-dimensional array, for example a square array, hexagonal, or other regular array). For example, the arranged pattern of recesses can include an arranged row pattern, an arranged lattice pattern such as an arranged square lattice pattern, an arranged zigzag pattern, or an arranged radial pattern. The arranged pattern need not be formed evenly on the entire surface but may be formed in only a portion of a given major surface. The pattern of recesses may vary or remain the same over any portion of the article. For example, similar or different patterns can be used within the same plane. The recesses within the pattern can be of similar geometry or can have different geometries. Similarly, the pattern of recesses 170 on the first major surface 111 may be the same or different than the corresponding pattern of recesses 180 on the second major surface. In certain implementations, the patterns on the first and second major surfaces 111, 112 may have substantially the same pitch and recess geometry, but are offset in the transverse or longitudinal direction, as described below.

In one exemplary construction, the arranged pattern of features includes both an array of discrete recesses (e.g., wells) and a series of channels extending between and/or through individual wells.

A Cartesian x-y-z coordinate system is included in FIGS. 1 & 2 for reference purposes. The first and second major surfaces 111, 112 extend generally parallel to the x-y plane, and the thickness "T" of the core 110 corresponds to the z-axis. Each array of recesses 170, 180 includes a transverse direction, generally along the x-axis and a longitudinal direction, generally along the y-axis. The arranged patterns include a defined pitch 171, 181 between nearest-neighboring, adjacent recesses 170, 180. The pitch between nearest-neighboring, adjacent recesses 170, 180 in an array or pattern may be the same in both the transverse direction and longitudinal direction. In other embodiments, the pitch along the transverse direction is less than the pitch along the longitudinal direction, and vice versa. The configuration of recesses in any given region can be chosen so that the pitch is at least, 0.25 millimeters, at least 0.5 millimeters, in other embodiments at least 15 millimeters, in other embodiments at least 20 millimeters, in other embodiments at least 25 millimeters, and in yet other embodiments at least 30 millimeters. In certain embodiments, the pitch is no greater than 70 millimeters, in some embodiments no greater than 60 millimeters, in some embodiments no greater than 50 millimeters, and in certain embodiments no greater than 45 millimeters.

The arranged pattern of recesses may result in a particular density of recesses 170, 180 per square centimeter. For example, the recesses can appear as discrete features in a sea of core material, or may encompass the majority of the core surface such that the core appears as a mesh or scrim. In some implementations, a major surface comprises at least 50 recesses per square centimeter, in some embodiments at least 100 recesses per square centimeter, in some embodiments, at least 200, and in yet other embodiments at least 300 microstructures per square centimeter. The core may comprise no greater than 2000 recesses per square centimeter, in some embodiments no greater than 1500, in some embodiments no greater than 1000, in some embodiments no greater than 750, and in other embodiments no greater than 500 recesses/cm$^2$. Without wishing to be bound by theory, greater density of the recesses has been shown to be correlated with higher shear performance of the adhesive article. Under certain circumstances, a greater density of recesses requires a higher peel force to initiate internal delamination where desired.

The recesses 170, 180 can take the form of any shape. Similarly, the three-dimensional geometry of the recesses 170, 180 is not particularly limited so long as the recess does not extend through the thickness of the core to the opposing major surface. The illustrated embodiment of the core 110 comprises a plurality of circular recess bases 172, 182. Non-limiting examples of shapes that are suitable for recess bases 172, 182 include circles, triangles, squares, rectangles, and other polygons. The three-dimensional geometry of the recesses 170, 180 can include circular cylindrical; elliptical cylindrical; cuboidal (e.g., square cube or rectangular cuboid); conical; truncated conical and the like.

Regardless of cross-sectional shape, each recess 170, 180 comprises a largest cross-sectional dimension at the base 172, 182 and/or the bottom surface 174, 184. The size of the largest cross-sectional dimension is not particularly limited, but is typically at least 0.5 millimeters. A recess 170, 180 typically includes a depth "D" inversely related to the thickness "M" of the membrane 176. A relatively thicker membrane will result in shallower recess depth. It may be noted, however, that not all recesses of the plurality of recesses need fall within the depth range listed above.

Figure 3A:
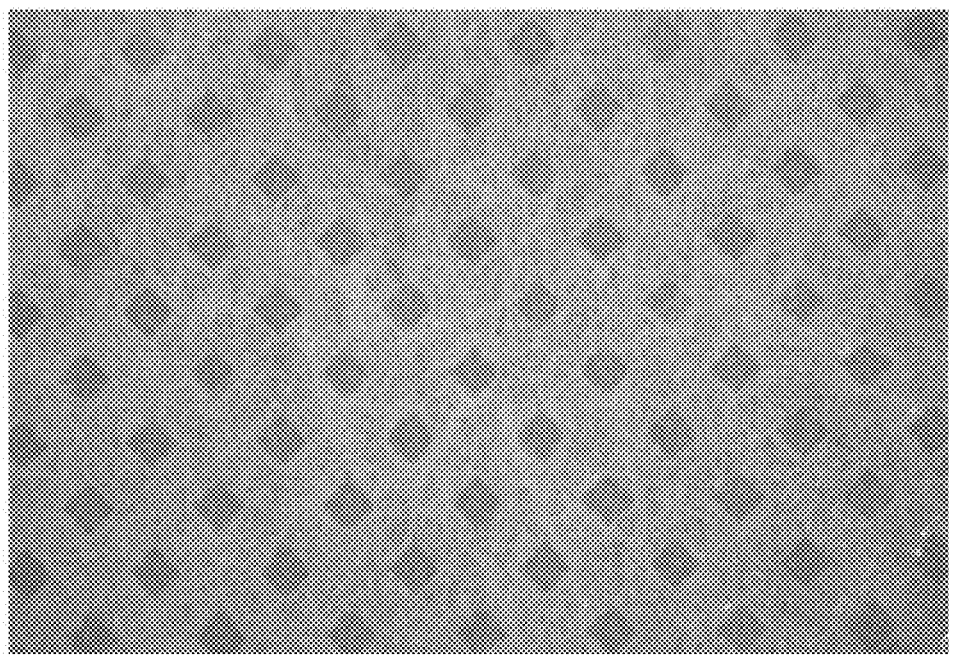
FIGS. 3A-3X are photographs of exemplary arranged patterns of recesses suitable for adhesive articles of the present disclosure.
Figure 3B:
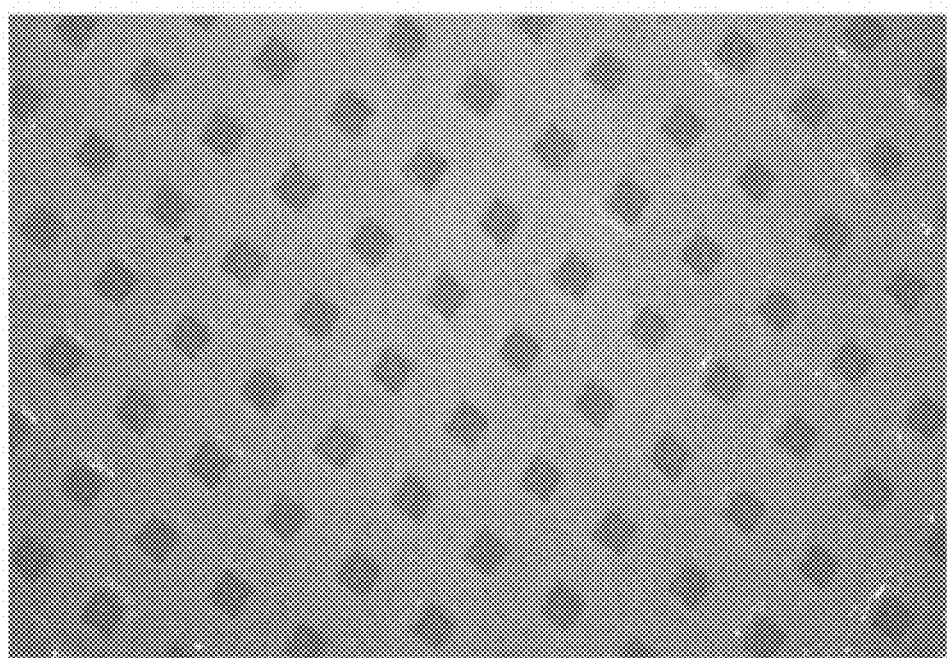
Figure 3C:
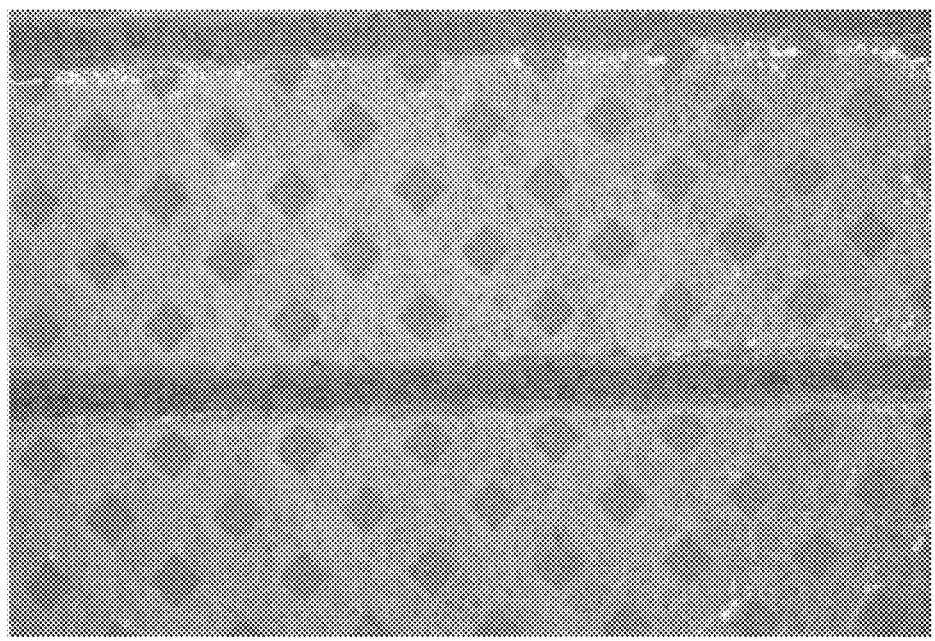
Figure 3D:
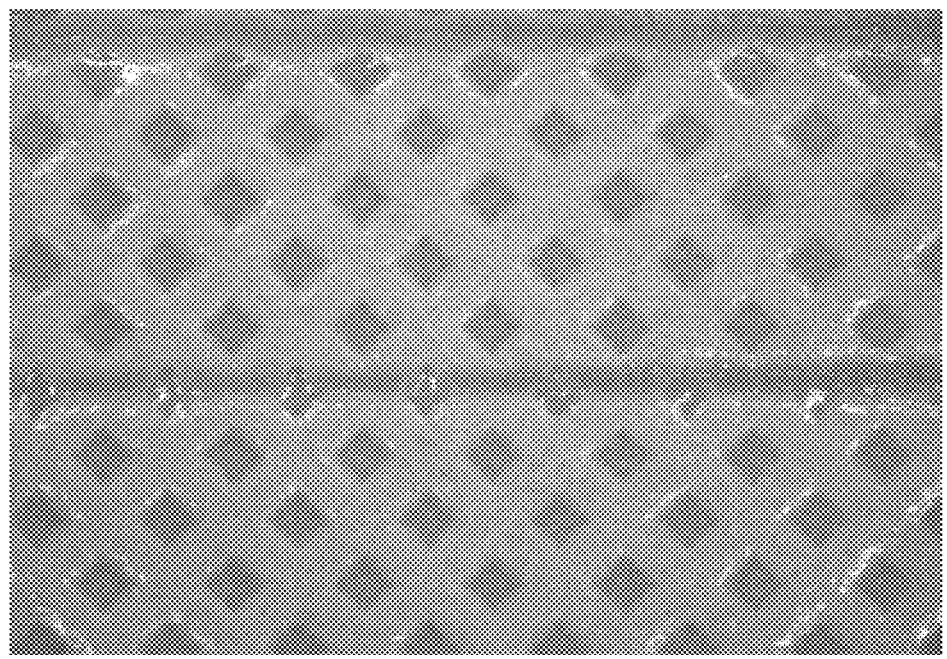
Figure 3E:
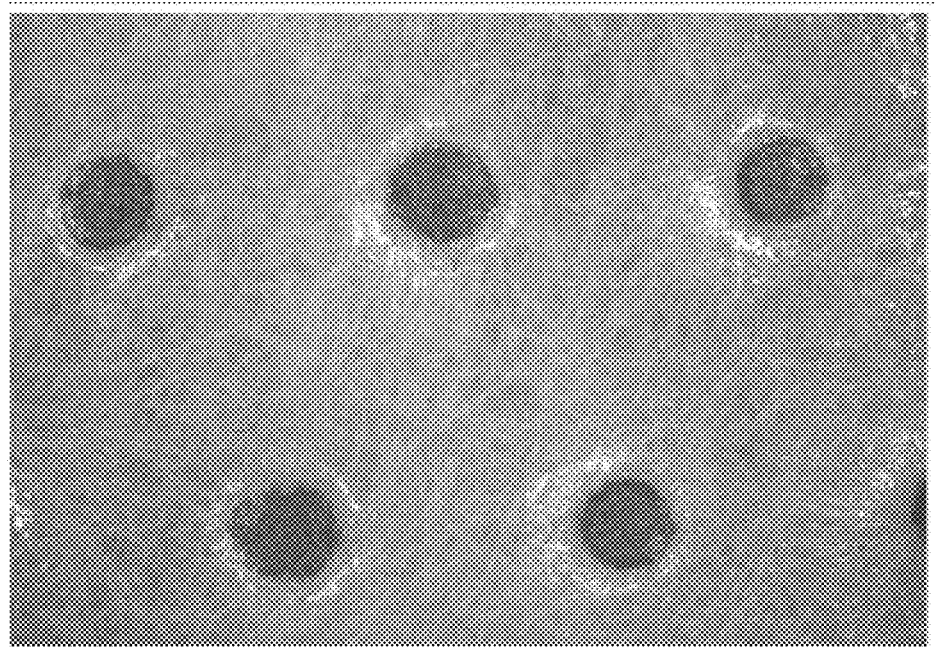
Figure 3F:
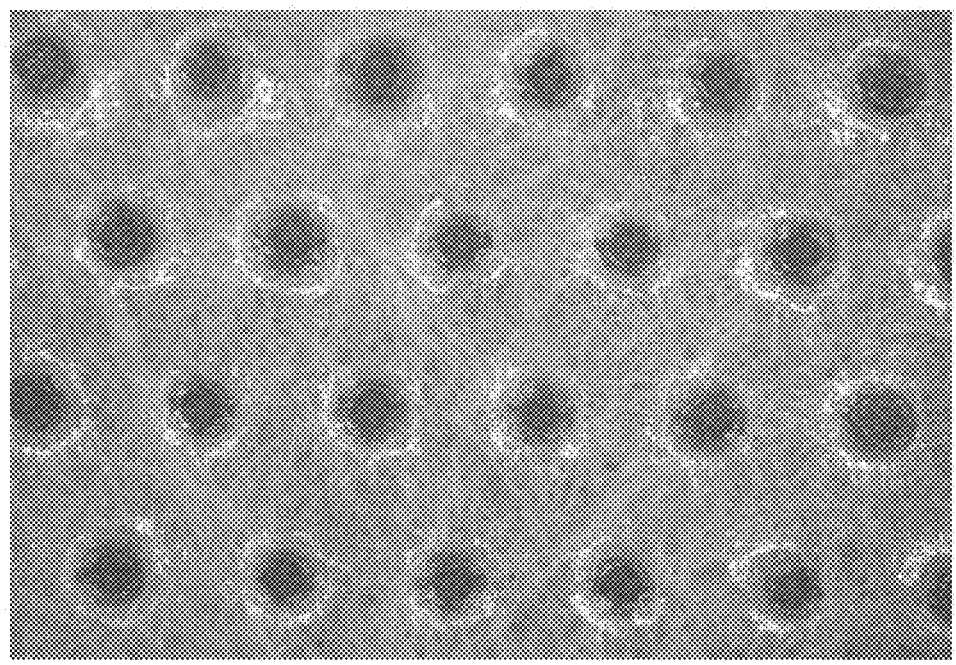
Figure 3G:
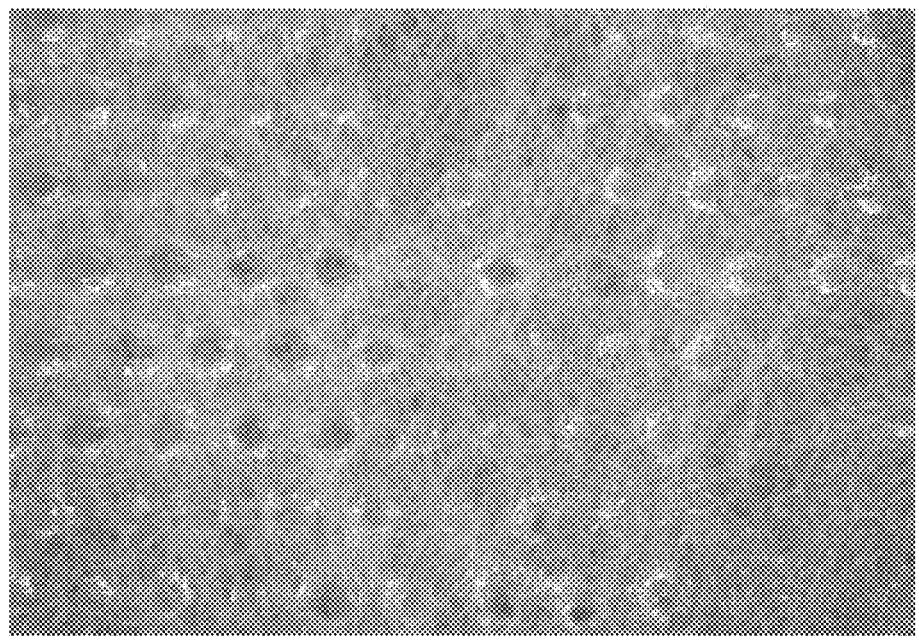
Figure 3H:
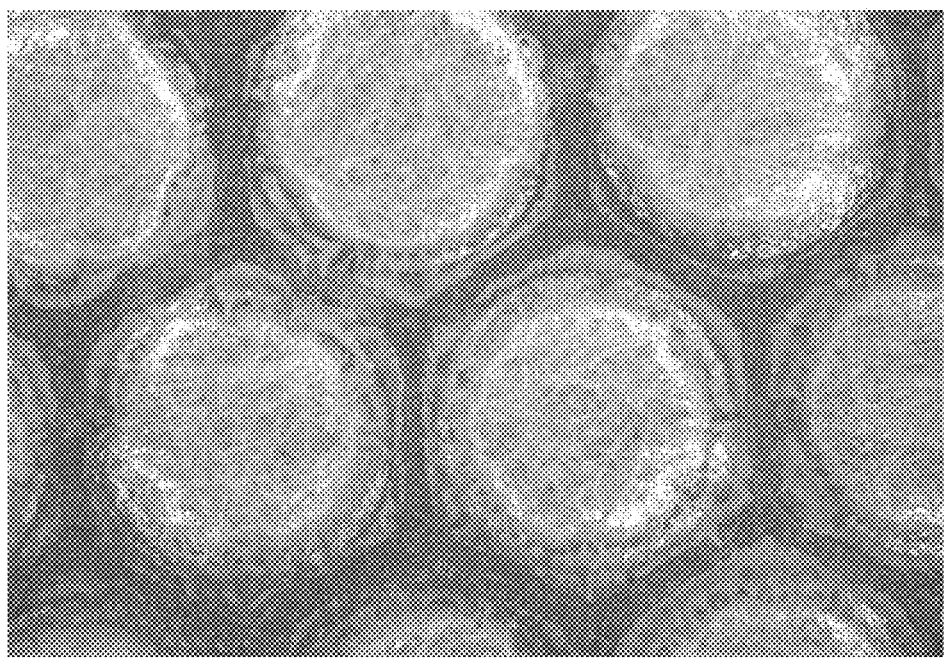
Figure 3I:
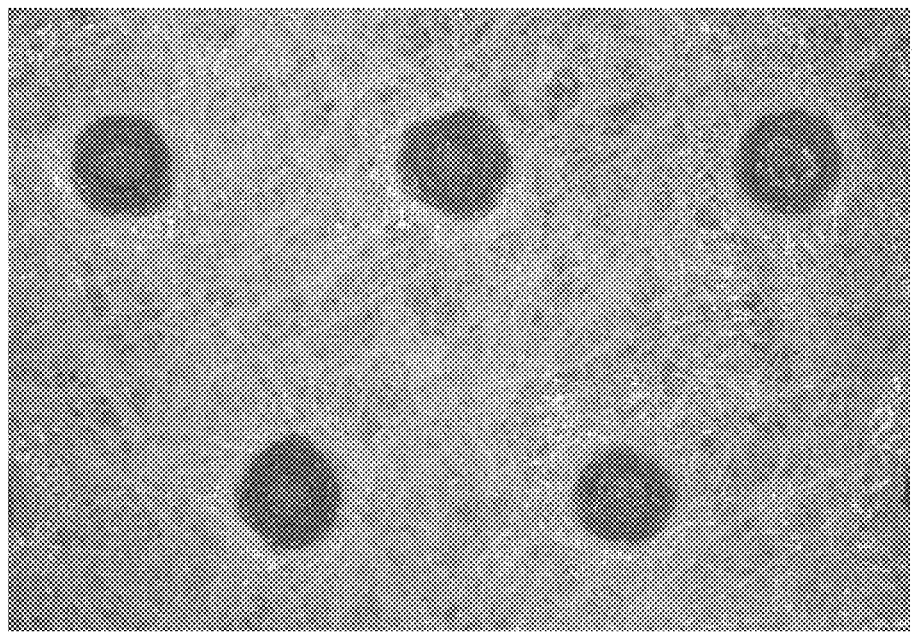
Figure 3J:
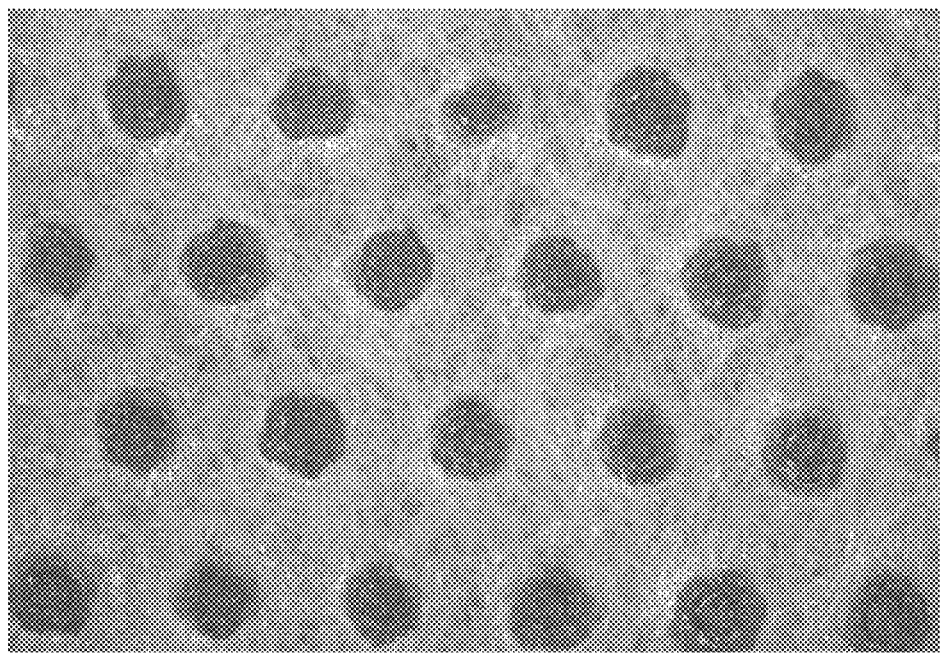
Figure 3K:
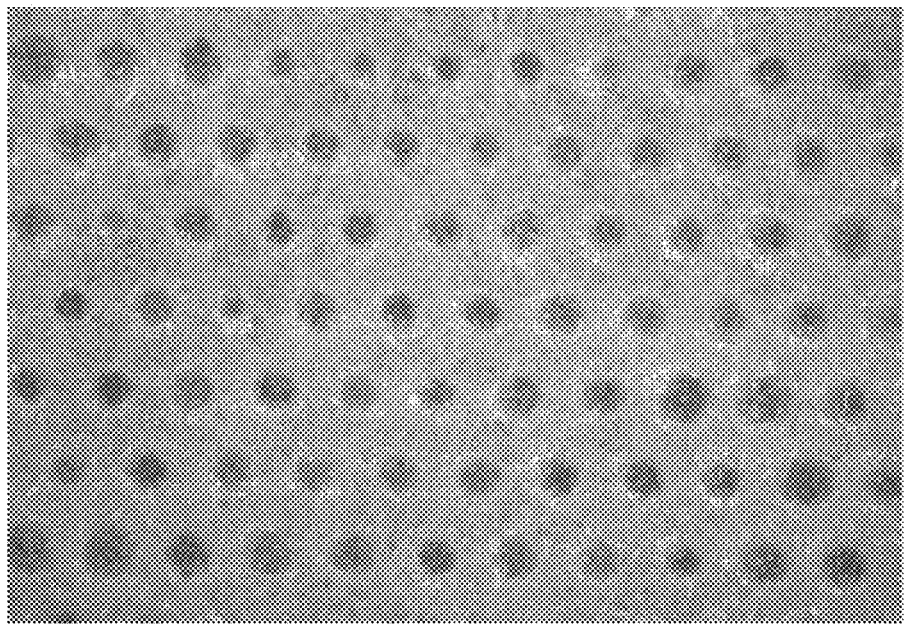
Figure 3L:
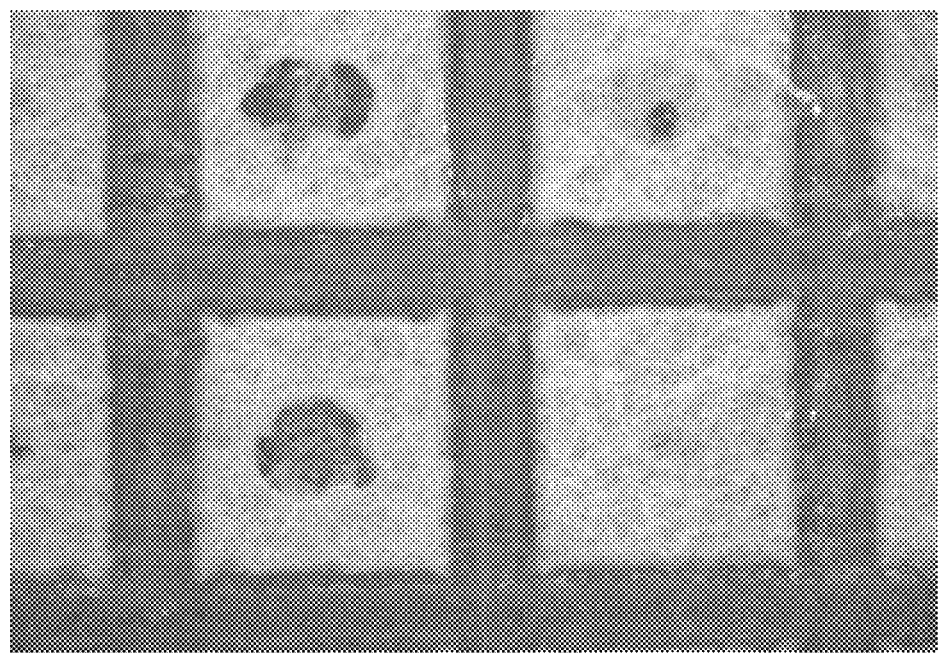
Figure 3M:
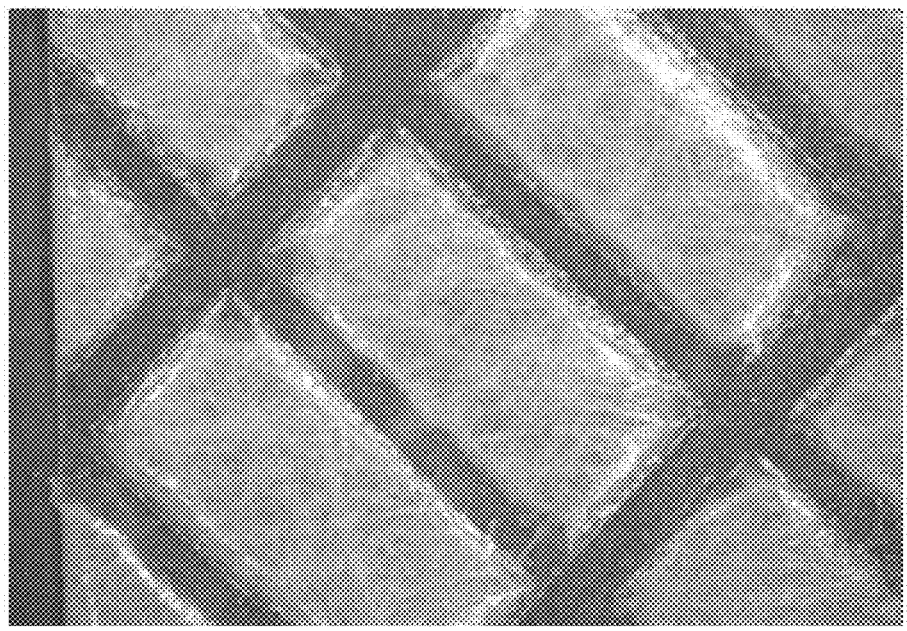
Figure 3N:
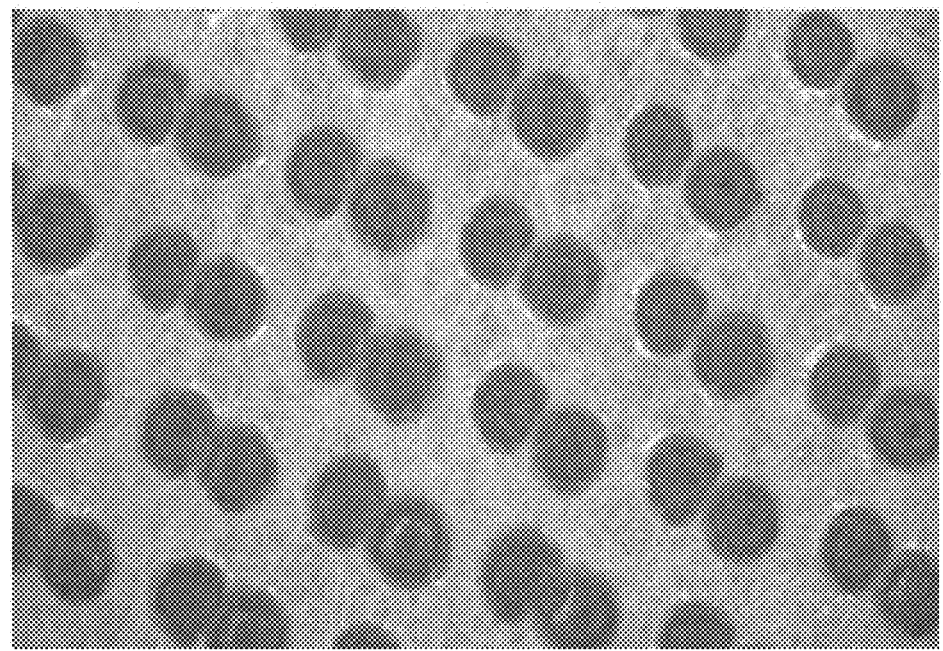
Figure 3O:
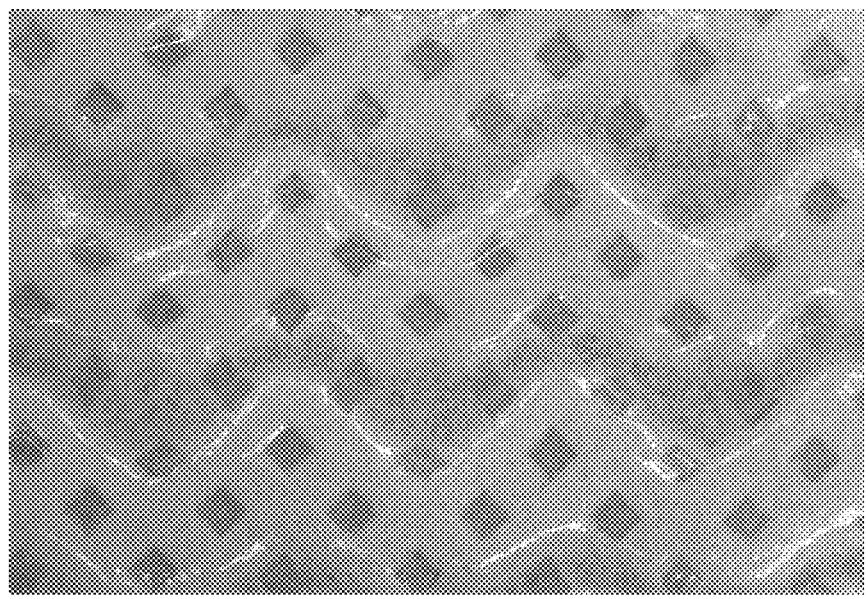
Figure 3P:
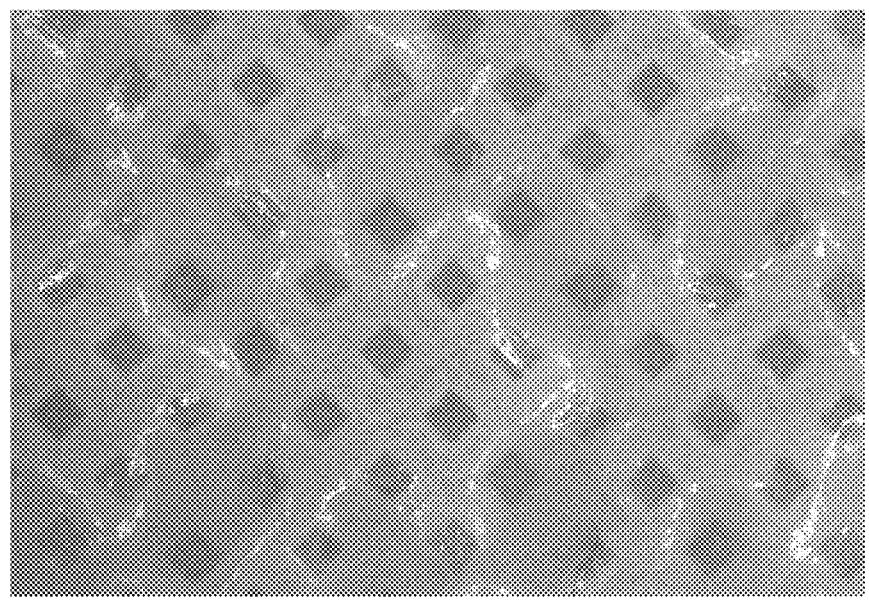
Figure 3Q:
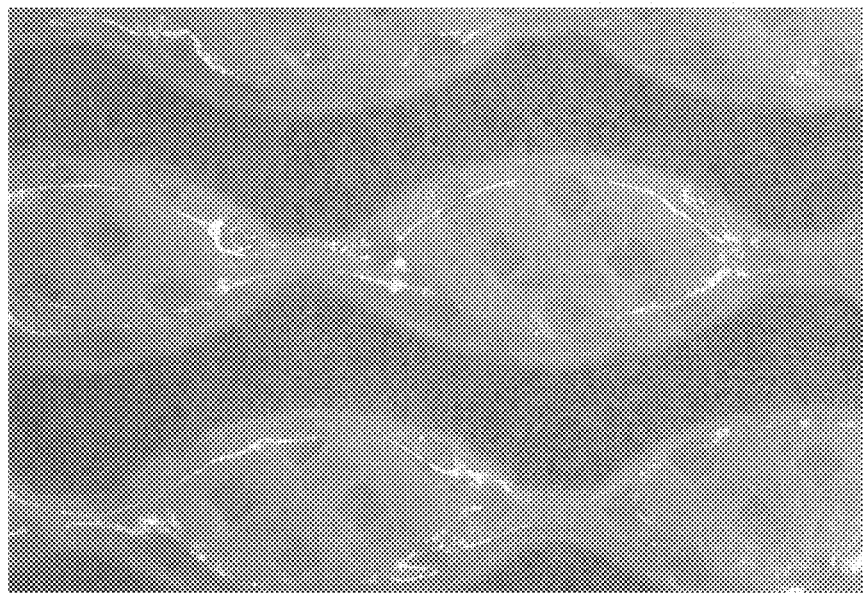
Figure 3R:
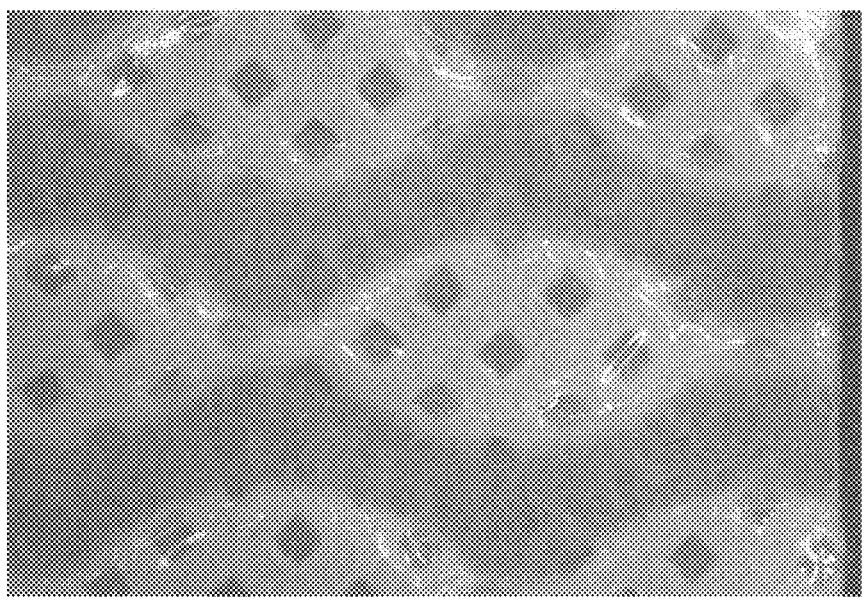
Figure 3S:
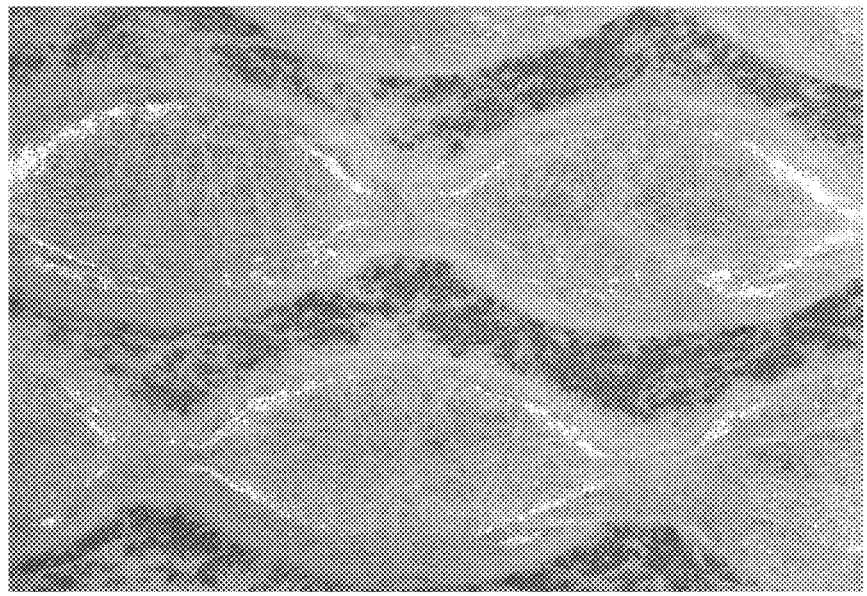
Figure 3T:
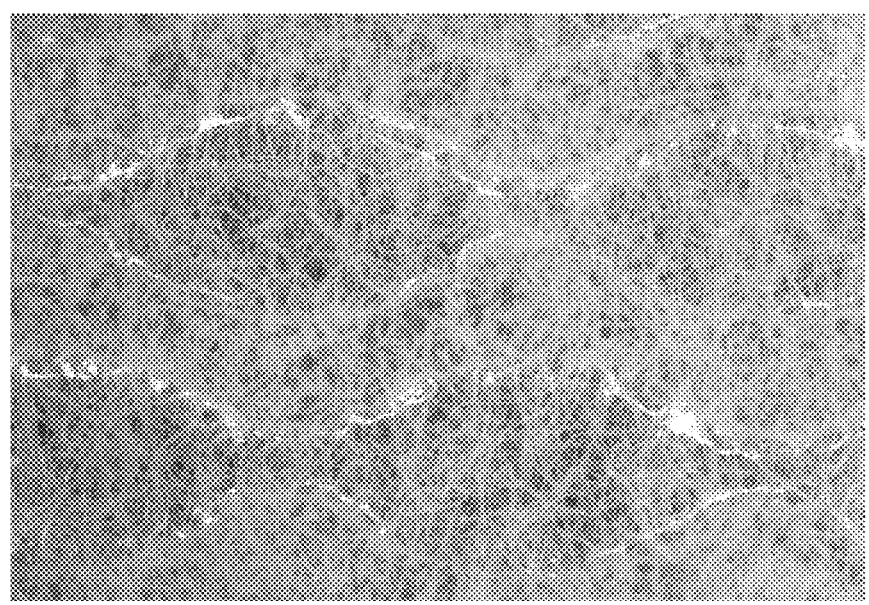
Figure 3U:
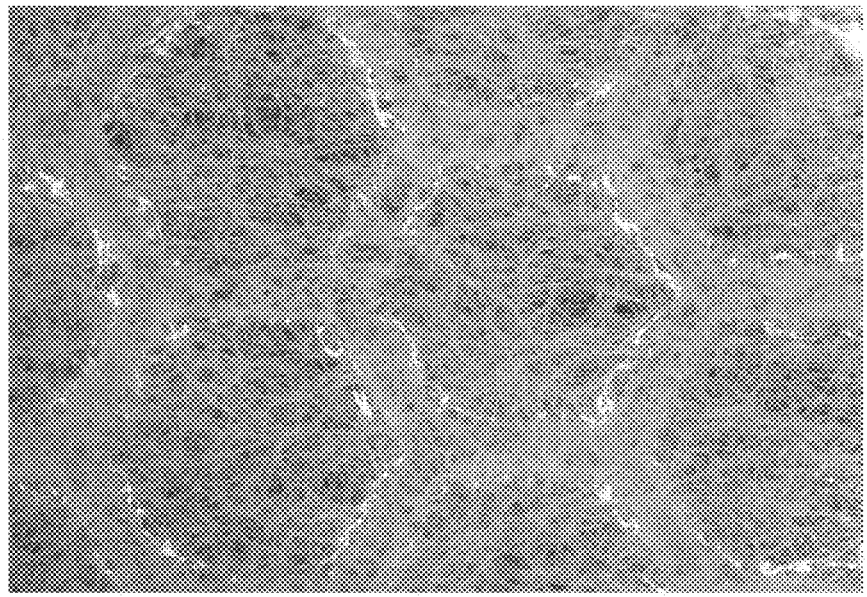
Figure 3V:
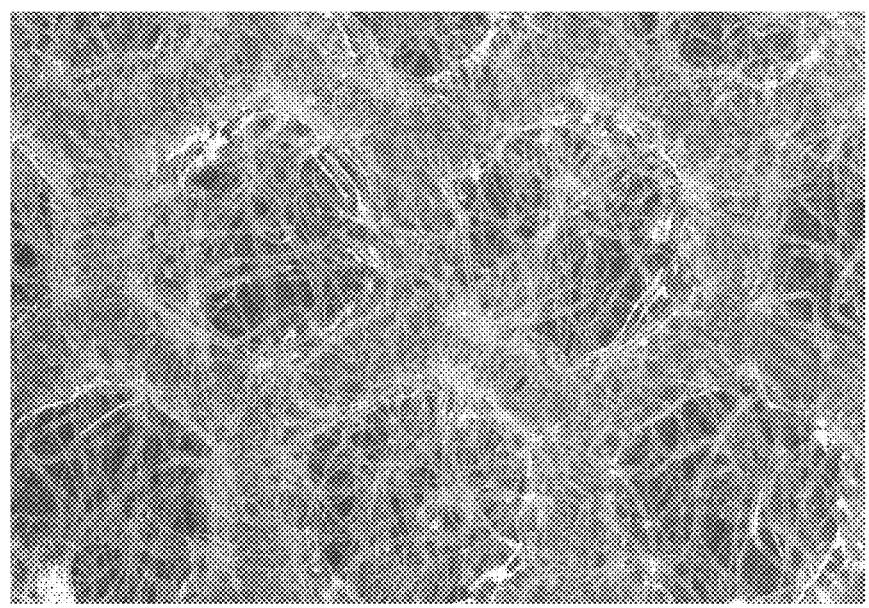
Figure 3W:
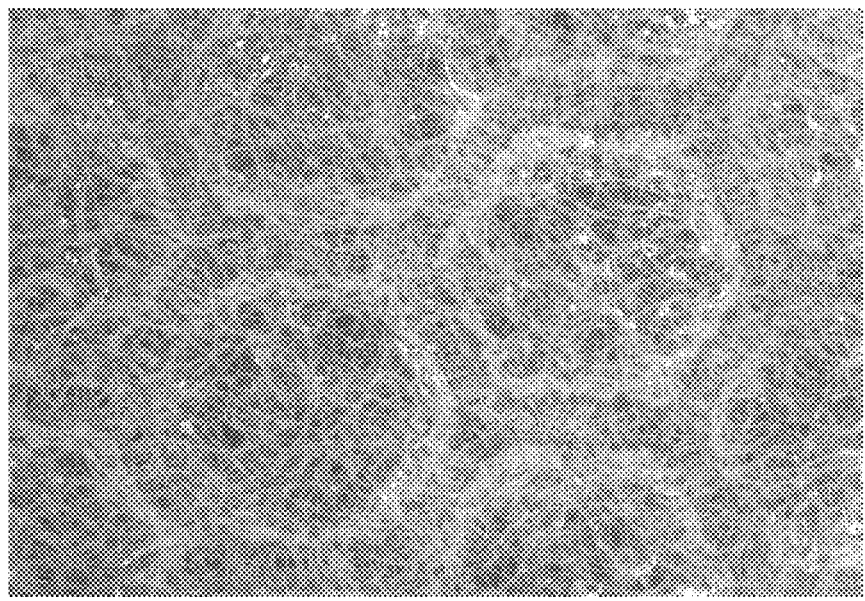
Figure 3X:
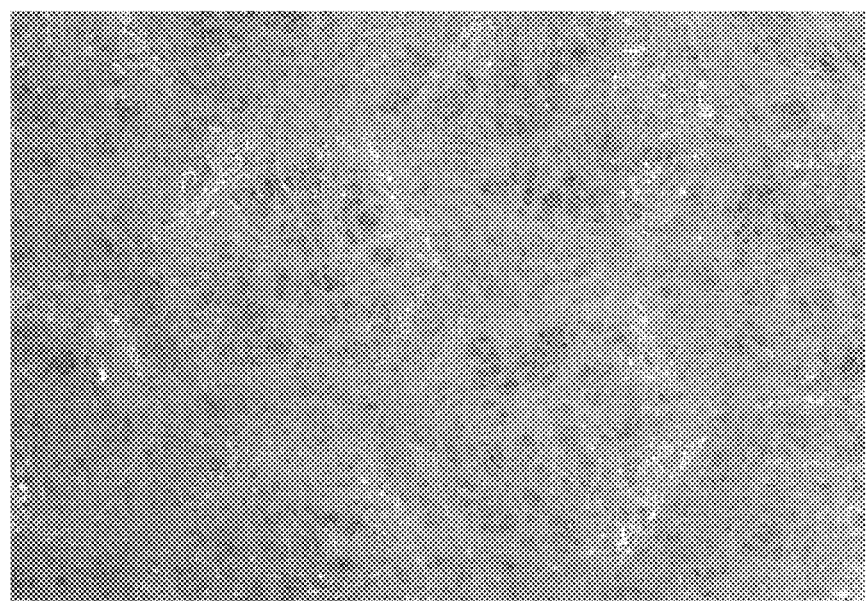

As depicted, the recesses 170, 180 are discrete along both the transverse and longitudinal directions. In other embodiments, one or both recesses 170, 180 can be discrete along one direction, such that the apertures resemble channels in the core, or may extend diagonally (relative to the orientation shown in FIG. 1) across one or both the major surfaces 111, 112 of the core. Such channels can follow any desired path and can be continuous or discontinuous across a surface of the core in any given direction. Exemplary arranged patterns, some including channels are shown in FIGS. 3A-3X.

The recesses 170, 180 are essentially discreet and the core 110 includes interstitial spaces 160, 190 between adjacent recesses 170, 180, respectively. The interstitial space 160, 190 is, in the depicted implementation, un-patterned in that it generally lacks any additional hierarchical features. Accordingly, the sum area of the interstitial spaces 160, 190 defines the un-patterned regions on the first major surface 111 and second major surface 112, respectively.

The recesses 170, 180 on each of the first major surface 111 and second major surface 112 each have substantially the same geometry. In other embodiments, the size or shape of the recesses 170, 180 may change across the transverse direction, longitudinal direction, or combinations thereof. In yet other embodiments, a major surface can include two or more recesses of different geometries arranged in repeating unit cell. The unit cell can be repeated in an arranged pattern of unit cells. A variety of shapes may be used to define the unit cell, including rectangles, circles, half-circles, ellipses, half-ellipses, triangles, trapezoids, and other polygons (e.g., pentagons, hexagons, octagons), etc., and combinations thereof. In such embodiments, each unit cell boundary is directly adjacent the boundary of a neighboring unit cell, so that the plurality of unit cells resembles, e.g., a grid or tessellation.

Each recess 170, 180 extends a certain depth "D" into the thickness of the core 110 from respective major surface 111, 112. Generally, recesses comprise a base 172, 182 adjacent and substantially coplanar with a major surface and a bottom surface 174, 184 separated from base 172, 182 by the depth "D". The core adjacent the bottom surface 174, 184 defines a relatively thin membrane 176 of core material.

The membranes 176 separate recesses 170 on the first major surface 111 from portions or all of recesses 180 on the second major surface 112. Any given collection of membranes can extend along the same plane within the core 110, such that the depth D is substantially the same for all recesses within the arrangement on one or both of the major surfaces 111, 112. In alternative implementations, the location of the membrane 176 in the z-direction within the core 110 varies along the transverse direction, the longitudinal direction, or both.

The membrane 176 separates the adhesive layers 140, 142 across each recess 170, 180. Each recess 170, 180 thus includes a core-adhesive interface on the bottom surface 174, 184, one or more sidewalls 175, 185, or combinations thereof. This core-adhesive interface is hereinafter referred to as a recess interface. The membrane 176 typically has a thickness "M" of at least about 5% of the thickness "T" of the core, and in other embodiments at least about 10% of the thickness of the core. In the same or other embodiments, the thickness "M" is no greater than 95% of the thickness of the core 110. In embodiments featuring a nonwoven core, the thickness of the membrane is typically correlated with the porosity of the given nonwoven material(s). Under certain circumstances and constructions described herein and without wishing to be bound by theory, the structural integrity of the core can be more easily compromised upon peel removal with relatively thinner membranes 176 throughout the body of core 110.

In embodiments featuring a porous core material (e.g., nonwoven fabric), the membrane 176 typically possesses a lower porosity than the core in the non-recessed/unpatterned areas 160, 190. In some embodiments, the void volume (or porosity) of the membrane is no greater than 50 percent, no greater than 40 percent, no greater than 30 percent, no greater than 20 percent, and in some other embodiments no greater than 10 percent the porosity of the non-recessed area.

Contact between the first adhesive layer 140 and the interstitial spaces 160 defines a second core interface 120. Similarly, contact between the second adhesive layer 142 and the interstitial spaces 190 on the second major surface 112 defines a third core interface 122 opposing the second core interface 120. In some embodiments, the second and third interfaces 120, 122 include an area of adhesive contact with the core of at least about 5%; at least about 10%, at least about 25%; at least about 30%; at least about 35%; at least about 40%; at least about 45%; at least about 50%; at least about 55%; at least about 60%; at least about 65%; at least about 70%; at least about 75%; or at least about 80%. In some embodiments, the second and third core interfaces include an area of adhesive contact between the adhesive layer 140, 142 and the core of between about 10% and about 100%. In some embodiments, the second and third core interfaces 120, 122 include an area of adhesive contact between the adhesive layer 140, 142 and the core of between about 40% and about 90%. The area of adhesive contact for each core interface 120, 122 may be the same or different. In some embodiments, including those with a hardgood mounted to the second peelable adhesive layer 142, the area of adhesive contact at the third core interface 122 is greater than the area of adhesive contact at the second core interface 120. In other embodiments, the area of adhesive contact at the third core interface 122 is greater than the area of adhesive contact at the second core interface 120. In typical embodiments, the adhesive layers 140, 142 do not occupy all available volume within a given aperture.

The materials making up the core 110 and adhesive layers 140, 142, as well as the construction of the adhesive article, can be selected so that the bond at the recess interfaces is stronger than: 1) the bond strength at or near the first and/or second core interfaces 120, 122; 2) the structural integrity (e.g., cohesive strength) of the core 110 in a direction substantially perpendicular to the core plane 115 or 3) combination thereof.

The relationship between the recess interface and the core interfaces can be expressed as a Peel Ratio, which is defined as the peel strength (oz/in$^2$) at the recess interfaces compared to the peel strength at the core interface(s). In some embodiments, the Peel Ratio can be at least 1.15:1; in some embodiments at least 1.25:1; in some embodiments at least 1.5:1; in some embodiments at least 2:1; in some embodiments at least 3:1; in some embodiments at least 5:1; in some embodiments at least 10:1; in some embodiments at least 15:1; in some embodiments at least 20:1.

The recesses 170, 180 can be created in a core material before, during, or after an adhesive layer has been applied to a major surface. The recesses 170 can be created by a combination of force and thermal/fusion energy, such as ultrasonic welding (or bonding), thermal contact welding, and/or point welding to reduce the thickness (i.e., consolidate) of core material. In implementations featuring a non-woven or other porous core material, the creation of recesses 170, 180 can condense the core material by reducing porosity and/or causing core material to flow into regions of the core adjacent the bonding site. In certain implementations of the embodiment in FIGS. 1-3, the recesses are created by ultrasonic point bonding of the adhesive layer and the core according to an arranged pattern. Point bonding may also occur by, for example, by passing the core and the adhesive layer(s) through a heated patterned embossing roll nip. The point bonding creates an intermittent bond between the adhesive and core, condensing a portion of both the peelable adhesive and core material into the depths of individual recesses. In other embodiments, the desired pattern (including one or multiple patterns) may be created in the core prior to application of the adhesive layer. In yet other embodiments, multiple patterns may be created in the core, one or more prior to application of the adhesive layer and one or more after application of the adhesive layer.

Ultrasonic welding (or bonding) generally refers to a process performed, for example, by passing the requisite layers of material between a sonic horn and a patterned roll (e.g., anvil roll). Such bonding methods are well-known in the art. For instance, ultrasonic welding through the use of a stationary horn and a rotating patterned anvil roll is described in U.S. Pat. No. 3,844,869 (Rust Jr.); and U.S. Pat. No. 4,259,399, "Ultrasonic Nonwoven Bonding", (Hill). Moreover, ultrasonic welding through the use of a rotary horn with a rotating patterned anvil roll is described in U.S. Pat. No. 5,096,532 (Neuwirth, et al.); U.S. Pat. No. 5,110,403 (Ehlert); and U.S. Pat. No. 5,817,199, (Brennecke, et al.). Of course, any other ultrasonic welding technique may also be used in the present invention.

In embodiments featuring a non-woven core, the intermittent bonding of the adhesive to the nonwoven fabric or web (e.g., using at least one of heat, pressure, or ultrasonics as described above) to create recesses can collapse (i.e., condense or consolidate) porous structure at or in the bond sites, resulting in the creation of membranes 176. The bond sites may be see-through regions of lower porosity that contrast with the surrounding region. The term "see-through" refers to either transparent (that is, allowing passage of light and permitting a clear view of objects beyond) or translucent (that is, allowing passage of light and not permitting a clear view of objects beyond). The see-through region may be colored or colorless. It should be understood that a "see-through" region is large enough to be seen by the naked eye.

In certain embodiments, the material for the core 110 is selected so that it forms a relative weak bond with either adhesive layer.

In other embodiments, the material or construction of the core is selected so that it delaminates, fails cohesively, or otherwise separates upon application of force generated on the adhesive article during removal.

Even in embodiments featuring a destructible core, the core 110 can still provide sufficient strength along the general plane of its separation so that, depending on the specific application, the structural integrity of the core will not fail based on the use of the adhesive article 100 for mounting an object on a mounting surface. The core 110 can advantageously provide an internal static shear strength in a direction parallel to the core planes 115, 116 sufficient for supporting an object and providing a level of resiliency to the article 100.

Figure 4:
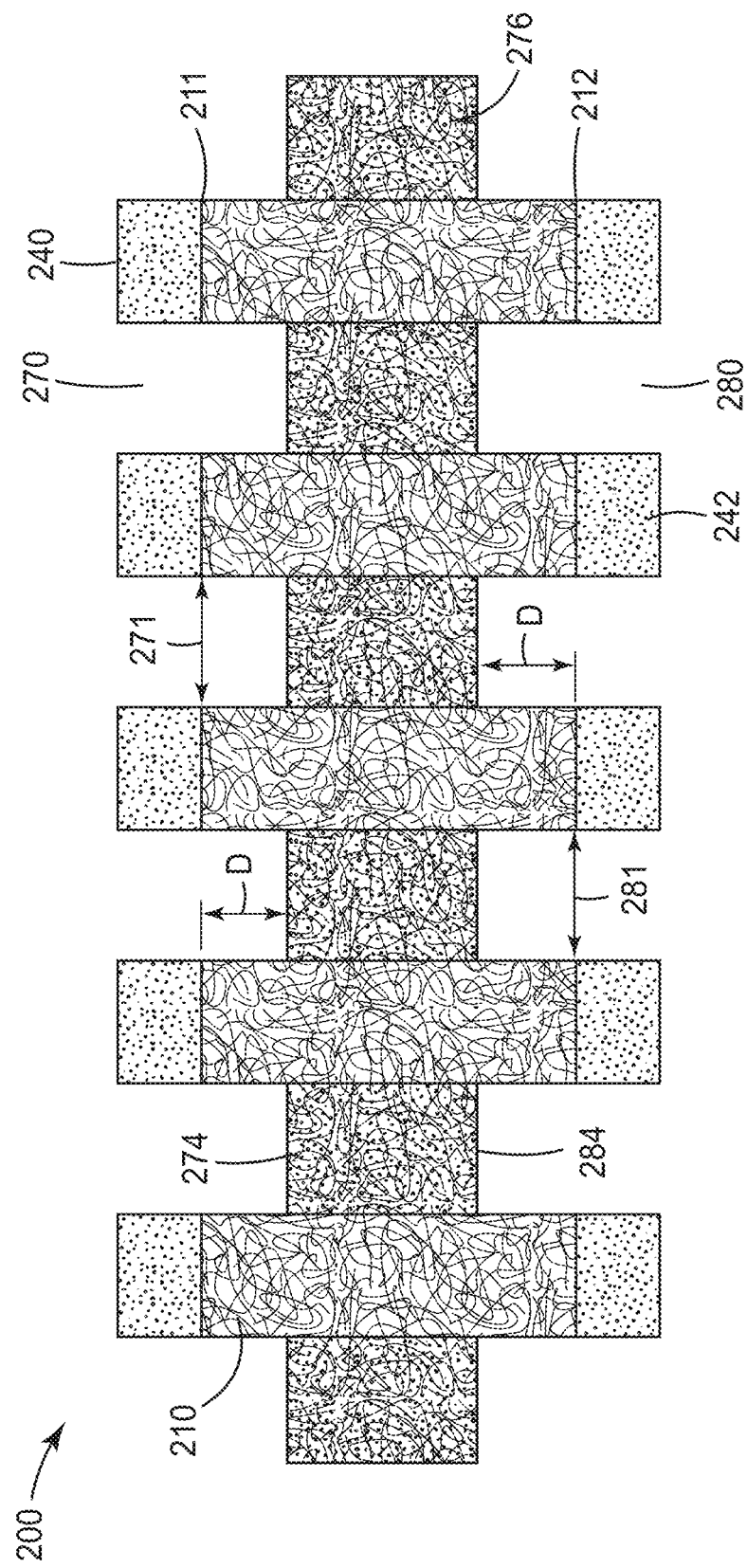
FIG. 4 is a cross-sectional view of one embodiment of an exemplary adhesive article of the type generally described herein.

Another exemplary embodiment of an adhesive article 200 is depicted in FIG. 4. Except as otherwise noted, all other considerations regarding the adhesive article 100 apply equally to adhesive article 200. Like the adhesive article of FIGS. 1 and 2, the adhesive article 200 includes a core 210, a first peelable adhesive layer 240 on a first major surface 211 of the core 210, and a second peelable adhesive layer 242 on a second major surface 212 of the core 210. The core 210 is comprised of one or more porous materials and typically includes a nonwoven web.

The core 210 includes an arranged pattern of recesses 270, 280 on the first major surfaces 211 and second major surface 212, respectively, extending to a depth "D" within the core material. The recesses 270, 280 are typically arranged in the same pattern, with each opposing recess possessing substantially the same geometry. In certain implementations, the recesses 280 on the second major surfaces may be smaller at the base 281 than those on the first major surface 270.

The core 210 adjacent the bottom surface 274, 284 defines a relatively thin membrane 276 of core material. The membranes 276 separate recesses 270 on the first major surface 211 from portions or all of recesses 280 on the second major surface 212. Any given collection of membranes can extend along the same plane within the core 210, such that the depth D is substantially the same for all recesses within the arrangement on one or both of the major surfaces 211, 212. In alternative implementations, the location of the membrane 276 in the z-direction within the core 210 varies along the transverse direction, the longitudinal direction, or both.

Unlike membrane 176, the membrane 276 is at least partially infused with adhesive. In certain presently preferred embodiments, an adhesive article includes a peelable adhesive composition at least partially within the pores of a porous core. For such embodiments, at least 40 volume %, at least 50 volume %, at least 60 volume %, at least 70 volume %, at least 80 volume %, preferably at least 90 volume %, and more preferably 100 volume % of the void volume is filled with the peelable adhesive composition. The amount of adhesive within the pores will depend on, among other things, the modulus of the adhesive, the method used to create the recesses, the thickness of the core, and the porosity of the core material.

Depending on the degree of infiltration of the membrane voids, at least some of the bottom walls 274, 284 and sidewalls 273, 283 of the recesses 270, 280 may include a thin adhesive layer (not shown).

The embodiment of FIG. 4 may be created by methods described above. In presently preferred implementations, the core 210 is pattern embossed, according to procedures well known in the art, such as those described in U.S. Pat. No. 2,464,301 (Francis Jr.), U.S. Pat. No. 3,507,943 (Such et al.), U.S. Pat. No. 3,737,368 (Such et al.), and U.S. Pat. No. 6,383,958 (Swanson et al) and set forth in more detail below. In general, the core and adhesive layer(s) are passed through a metal roll that is patterned (e.g., engraved) with raised and depressed areas, and a solid back-up roll, generally formed of metal or rubber. However, the core can also be fed between two patterned rolls displaying corresponding or alternating engraved areas. In either case, it is typical to supply heat to one or more of the rolls so that the core is thermally bonded along the points of pattern contact.

Figure 5:
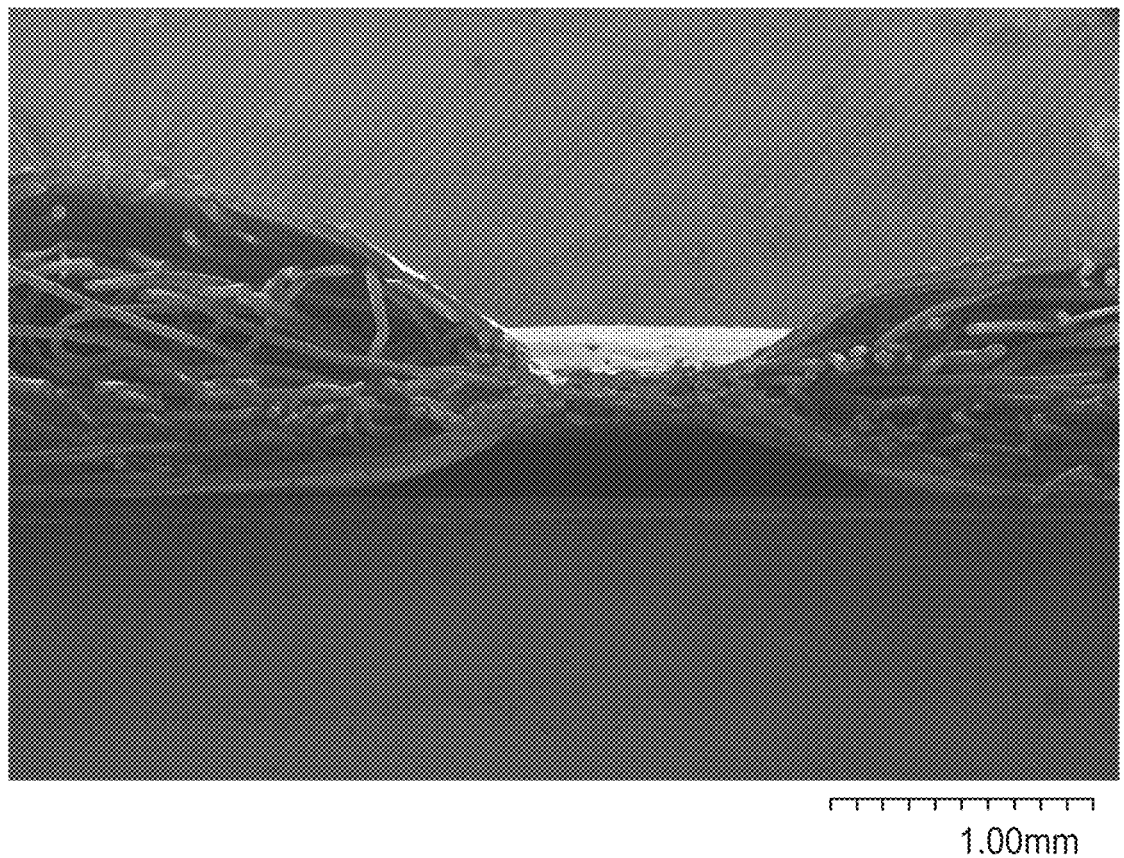
FIG. 5 is a cross-sectional micrograph of an adhesive article featuring an arranged pattern of recesses created by thermal embossing.

While not wishing to be bound by any particular theory, it is believed that the recesses in the embossed pattern are formed by localized melting of the core in the pattern of the raised areas on the patterned embossing roll. The core is not destroyed by the process but, instead, maintains its integrity. Moreover, the heat from the one or more rolls causes the adhesive to flow into at least some of the voids in the core prior to and/or contemporaneous with the creation the recesses through contact pressure, as can be seen in FIG. 5. Typically, the majority of the adhesive will remain within membrane voids, though some volume may flow into the surrounding core as well. As used herein, "embossed pattern" refers to a predetermined configuration of recesses on a surface of the core. An embossed pattern is distinguishable from a "perforated" pattern, which refers to a predetermined configuration of punctures that pass through the entire thickness of the core. For instance, an array of recesses created through heated pattern embossing an adhesive laminated nonwoven will typically include a greater amount of adhesive within the voids in comparison to the same pattern created through ultrasonic welding.

Figure 6:
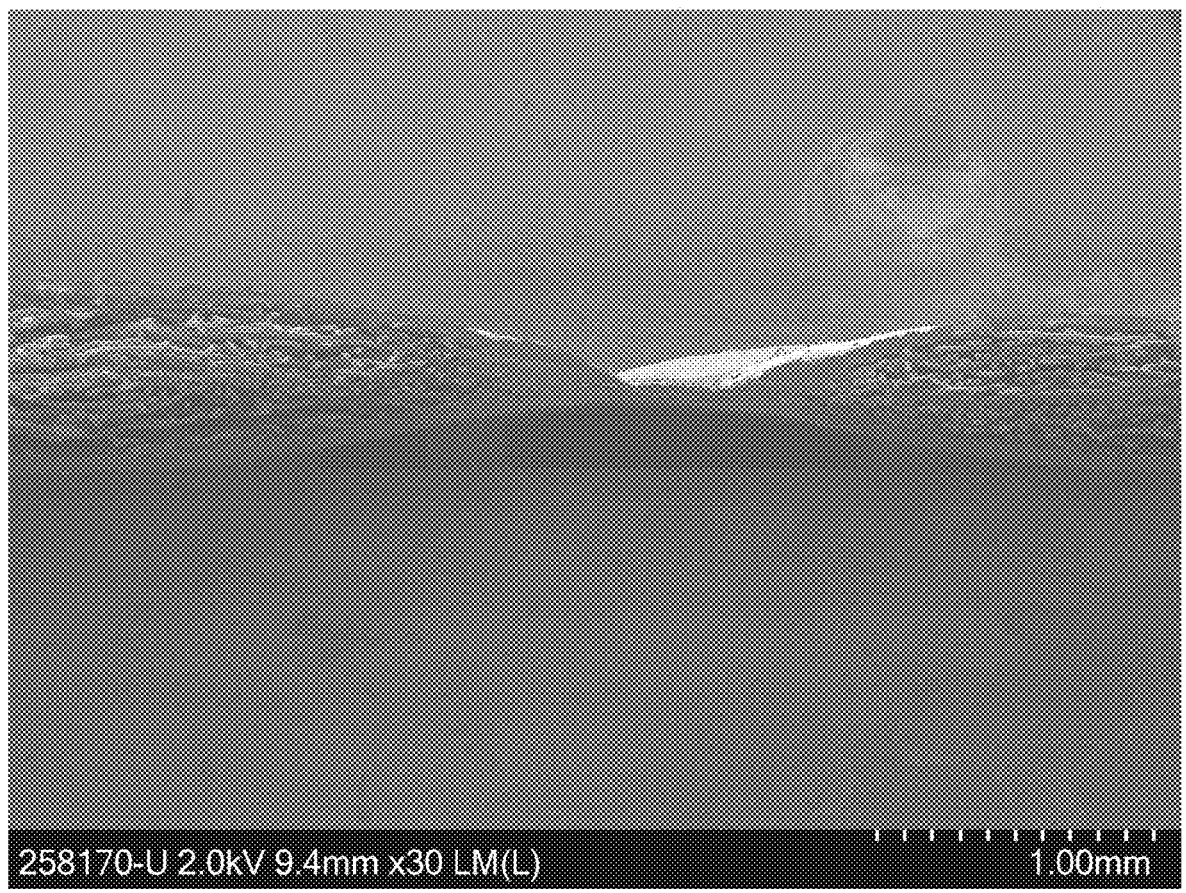
FIG. 6 is a cross-sectional micrograph of an adhesive article featuring an arranged pattern of recesses created by ultrasonic welding.

Under certain conditions, the use of ultrasonic welding can result in little to no adhesive infused in the membrane, with core material itself instead infused into the adjacent voids. A recess and membrane exemplifying this result are shown in FIG. 6 and were created under conditions similar to Example 18 below.

When an array of recesses is created by pattern embossing, the degree of reduction in void volume due to consolidation or densification in a given membrane may be reduced relative to the consolidation resulting from ultrasonic welding. In some embodiments featuring an embossed pattern(s), the void volume (or porosity) of the membrane is no greater than 90 percent, no greater than 70 percent, no greater than 60 percent, no greater than 50 percent, and in some other embodiments no greater than 40 percent the porosity of the non-recessed area of the core.

Figure 7:
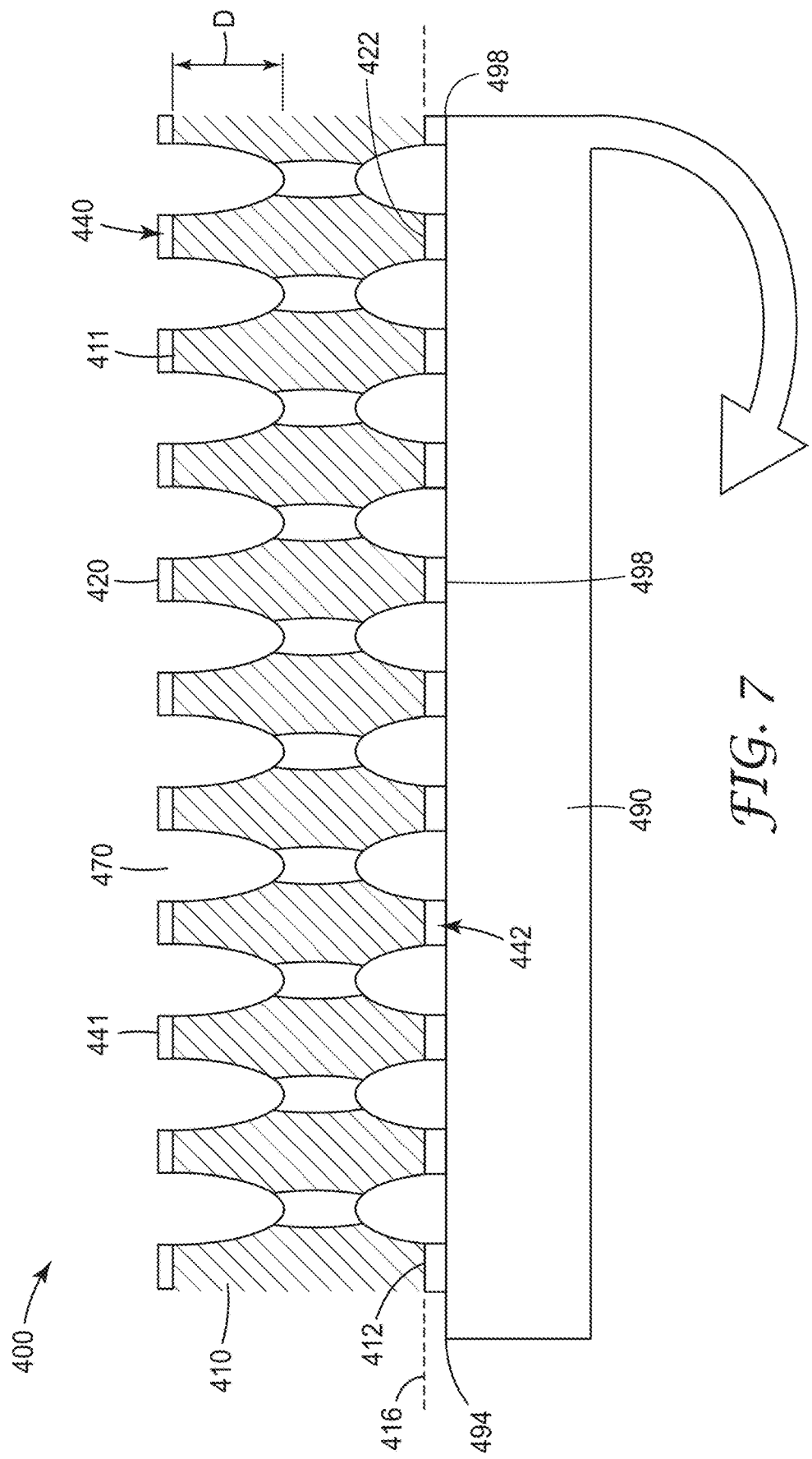
FIG. 7 is a cross-sectional view of one embodiment of another exemplary adhesive article of the type generally described herein.

FIG. 7 depicts another exemplary embodiment of an adhesive article of the type generally described herein including a hardgood 490, a core 410 and first and second peelable adhesive layers 440, 442. The core 410 can be any of the materials and constructions described herein and includes an arranged array of recesses 470, 480 extending to a depth "D" within the core material. A second major surface 494 of hardgood 490 is affixed to the second adhesive layer 442, creating a plurality of hardgood interfaces 498 in a plane generally parallel if not coplanar with core plane 416. Contact between the adhesive layer 440 and first major surface 411 defines a core interface 420 disposed in a plane above the hardgood interfaces 498. The first major surface 441 of the adhesive layer 440 can be used to fix the article 400 to the desired adherend (e.g., wall surface, cabinet surface, etc.). A second core interface 422 is formed by contact between the second major surface 412 of the core 410 and the second adhesive layer 442, and exists in a plane generally parallel to the core plane 416.

In other embodiments (not depicted) the core may be fixed to the hardgood during the selective consolidation of core material to create recesses. Such embodiments may lack a second adhesive layer between the core and the hardgood.

In certain embodiments, the second adhesive layer 442 may be applied at a greater coating weight than the first adhesive layer 440. The disparity in coating weight and/or layer thickness can ensure the core stays with the hardgood when the adhesive article 400 is removed from an adherend.

The adhesive articles of the present disclosure include available bond areas defined by the total area of the unpatterned region of the core (i.e., the area within each recess (aperture or channel) is excluded from the bond area calculation, since the adhesive within the depths of the recesses will not typically contribute as much to the bond of the article to the desired adherend). In some embodiments, the available bond area of the article is at least about 5%; at least about 10%, at least about 25%; at least about 30%; at least about 35%; at least about 40%; at least about 45%; at least about 50%; at least about 55%; at least about 60%; at least about 65%; at least about 70%; at least about 75%; or at least about 80% of an expected surface area of a core material including like dimensions and lacking recesses. In some embodiments, the articles include an available bond area of between about 10% and about 90%. In yet other embodiments, the articles include an available bond area of between about 15% and about 70% of an expected surface area of a core material including like dimensions and lacking recesses.

Constituent elements of the adhesive articles described herein are explored in more detail below.

Core

The core is part of the adhesive construction and interferes with the interfacial bonding of portions of otherwise adjacent adhesive layers. The core can be a single layer or a multilayer construction. More than one core layer can be present in the core. Multiple core layers can be separated by layers of film, which may further contain one or more layers. In some embodiments, the core includes at least one of plastic, metal, paper, nonwoven material, textile, woven material, foam, adhesive, gel, and/or a filament reinforced material. In some embodiments, the core is at least one of a single layer of material or a multilayer film. In other embodiments, the core can be an arrangement of particles disposed between adjacent adhesive layers.

In some embodiments, two or more sub-layers can be co-extruded so as to form the core. In some embodiments, the core is flexible. Some embodiments include dyes or pigments in the core layer. Some embodiments include at least one tackifier in at least one layer of the core. Some embodiments include a plasticizing oil in one or more layers of the core.

The core can be any desired shape including, for example, square, rectangle, triangular, polygon, circular, quadrilateral, trapezoidal, cylindrical, half-circular, star-shaped, half-moon shaped, tetrahedral, etc.

The core can be made of any desired material or materials. Representative examples of materials suitable for the core can include, for example, polyolefins, such as polyethylene, including high density polyethylene, low density polyethylene, linear low density polyethylene, and linear ultralow density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadienestyrene copolymers, and ethylene/propylene copolymers; acrylic polymers and copolymers; polyurethanes; and combinations of the foregoing. Mixtures or blends of any plastic or plastic and elastomeric materials such as polypropylene/polyethylene, polyurethane/polyolefin, polyurethane/polycarbonate, polyurethane/polyester, can also be used.

In some embodiments, the core is or includes a composite foam that includes a flexible polymeric foam layer, a first film laminated to a first major surface of the foam layer, and a second film laminated to a second, opposite major surface of the foam layer. Adhesive(s) can be attached to the films to form a structure of adhesive-film-foam-film-adhesive. The flexible polymeric foam layer can be chosen to optimize conformability and resiliency properties which are helpful when an adhesive article is to be adhered to surfaces having surface irregularities, such as a typical wall surface. An exemplary flexible polymeric foam layer is commercially available under the trade designation "Command" from 3M Company of St. Paul, Minn. In some embodiments, the flexible polymeric foam layer of the core can include polyolefin foams which are available under the trade designations "Volextra" and "Volara" from Voltek, Division of Sekisui America Corporation, Lawrence, Mass. In some embodiments, the core is or includes a metal or is metal-like. In some embodiments, the core is or includes wood or is wood-like.

The core can be or include any of the materials or backings described in any of the following patent applications, all of which are incorporated in their entirety herein, PCT Application No. US2018/024347 and WO Publication Nos. 2015/195344, 2017/136432, and 2018/039584.

In various embodiments, the backing can be fabricated or produced from microstructured tape materials described in, e.g., U.S. Pat. No. 8,530,021 to Bartusiak et al.

The core can be substantially non-stretchable or can be elastic. In some embodiments, the core material has a storage modulus of between about $15 \times 10^3$ Pa and about $2.5 \times 10^6$ Pa at 25 degrees Celsius. In other embodiments including those with glass materials or other ceramics, the core material can have a storage modulus of up $1 \times 10^{10}$ Pa. In some embodiments, the core material has a tan δ (where tan δ is the loss modulus divided by the storage modulus) of between about 0.4 and about 1.2 at 25 degrees Celsius. In some embodiments, the core has a glass transition temperature of between about −125 and about 40 degrees Celsius. In other embodiments, the core material has a stress relaxation between 10% and 100% after 10 seconds.

In some embodiments, the core exhibits an elastic recovery of 1-99% at 10% strain. In some embodiments, the core exhibits an elastic recovery of 1-99% at 20% strain. In some embodiment of the disclosure, the core material has an elongation at break of greater than 50% in at least one direction. In some embodiment of the disclosure, the core material has an elongation at break of between about 50% and about 1200% in at least one direction.

In some embodiments, the core has a Young's modulus of between about 100 psi and about 100,000 psi. In other embodiments featuring glass materials or ceramics, the core may have a Young's modulus of up to 10,000,000 psi. In some embodiments, the core exhibits an elastic recovery of 1-100% at 10% strain as measured by ASTM D5459-95. In some embodiments, the core exhibits an elastic recovery of 1-100% at 20% strain.

In some embodiments, the core has a modulus of elasticity and/or a modulus of secant of between about 100 psi and about 15,000 psi as determined by at least one of ASTM D638-14 and ASTM D412-06a. In some embodiments, the core has a modulus ranging between 100 psi and 15000 psi. In some embodiments the modulus is greater than 100 psi, greater than 500 psi, greater than 1000 psi. In some embodiments the core modulus is less than 15000 psi, less than 10000 psi, less than 8,000 psi, less than 5,000 psi, less than 3,500 psi, less than 2000 psi, and less than 1500 psi.

In some embodiments, the core has a thickness of between about 0.1 mils and about 100 mils. In some embodiments, the core has a thickness of greater than 1 mil, greater than 5 mils, greater than 8 mils, greater than 10 mils, greater than 12 mils, greater than 15 mils, greater than 20 mils, greater than 22 mils, or greater than 24 mils. In some embodiments, the core has a thickness of less than 100 mils, less than 90 mils, less than 80 mils, less than 75 mils, less than 70 mils, less than 65 mils, less than 60 mils, less than 55 mils, less than 50 mils, less than 45 mils, less than 40 mils, less than 38 mils, less than 35 mils, less than 32 mils, less than 30 mils, less than 28 mils, or less than 25 mils.

Nonwovens

In some presently preferred embodiments, the core includes a nonwoven substrate. The nonwoven substrate can be a nonwoven fabric or web manufactured by any of the commonly known processes for producing nonwoven fabric or webs. As used herein, the term "nonwoven" refers to a fabric that has a structure of individual fibers or filaments which are randomly and/or unidirectionally interlaid in a mat-like fashion, but not in an identifiable manner as in a knitted fabric. Nonwoven fabrics or webs can be formed from various processes such as meltblowing processes, spunbonding processes, spunlacing processes, and bonded carded web processes, air laying processes, and wet laying processes. In some embodiments, the core comprises multiple layers of nonwoven materials with, for example, at least one layer of a meltblown nonwoven and at least one layer of a spunbonded nonwoven, or any other suitable combination of nonwoven materials. For example, the core may be a spunbond-meltbond-spunbond, spunbond-spunbond, or spunbond-spunbond-spunbond multilayer material. Or, the core may be a composite web comprising a nonwoven layer and a film layer.

"Meltblowing", as used herein, means a method for forming a nonwoven fibrous web by extruding a molten fiber-forming material through a plurality of orifices in a die to form fibers while contacting the fibers with air or other attenuating fluid to attenuate the fibers into fibers, and thereafter collecting the attenuated fibers. An exemplary meltblowing process is taught in, for example, U.S. Pat. No. 6,607,624 (Berrigan et al.). "Meltblown fibers" means fibers prepared by a meltblowing or meltblown process. "Spunbonding" and "spun bond process" mean a method for forming a nonwoven fibrous web by extruding molten fiber-forming material as continuous or semi-continuous fibers from a plurality of fine capillaries of a spinneret, and thereafter collecting the attenuated fibers. An exemplary spun-bonding process is disclosed in, for example, U.S. Pat. No. 3,802,817 to Matsuki et al. "Spun bond fibers" and "spun-bonded fibers" mean fibers made using spun-bonding or a spun bond process. Such fibers are generally continuous fibers and are entangled or point bonded sufficiently to form a cohesive nonwoven fibrous web such that it is usually not possible to remove one complete spun bond fiber from a mass of such fibers. The fibers may also have shapes such as those described, for example, in U.S. Pat. No. 5,277,976 to Hogle et al, which describes fibers with unconventional shapes. "Carding" and "carding process" mean a method of forming a nonwoven fibrous web webs by processing staple fibers through a combing or carding unit, which separates or breaks apart and aligns the staple fibers in the machine direction to form a generally machine direction oriented fibrous nonwoven web. Exemplary carding processes and carding machines are taught in, for example, U.S. Pat. No. 5,114,787 to Chaplin et al. and U.S. Pat. No. 5,643,397. "Bonded carded web" refers to nonwoven fibrous web formed by a carding process wherein at least a portion of the fibers are bonded together by methods that include for example, thermal point bonding, autogenous bonding, hot air bonding, ultrasonic bonding, needle punching, calendering, application of a spray adhesive, and the like. Further details regarding the production and characteristics of nonwoven webs and laminates including nonwoven webs may be found, for example, in U.S. Pat. No. 9,469,091 (Henke et al.), which is incorporated by reference in its entirety herein. "Air-laying" refers to a process in which bundles of small fibers having typical lengths ranging from about 3 to about 52 millimeters (mm) are separated and entrained in an air supply and then deposited onto a forming screen, usually with the assistance of a vacuum supply. The randomly oriented fibers may then be bonded to one another using, for example, thermal point bonding, autogenous bonding, hot air bonding, needle punching, calendering, a spray adhesive, and the like. An exemplary air-laying process is taught in, for example, U.S. Pat. No. 4,640,810 to Laursen et al. "Wet-laying" refers to a is a process in which bundles of small fibers having typical lengths ranging from about 3 to about 52 millimeters (mm) are separated and entrained in a liquid supply and then deposited onto a forming screen, usually with the assistance of a vacuum supply. Water is typically the preferred liquid. The randomly deposited fibers may by further entangled (e.g., hydro-entangled), or may be bonded to one another using, for example, thermal point bonding, autogeneous bonding, hot air bonding, ultrasonic bonding, needle punching, calendering, application of a spray adhesive, and the like. An exemplary wet-laying and bonding process is taught in, for example, U.S. Pat. No. 5,167,765 to Nielsen et al. Exemplary bonding processes are also disclosed in, for example, U.S. Pat. No. 9,139,940 to Berrigan et al.

Fibrous materials that provide useful nonwoven cores may be made of natural fibers (e.g., wood or cotton fibers), synthetic fibers (e.g., thermoplastic fibers), or a combination of natural and synthetic fibers. Exemplary materials for forming thermoplastic fibers include polyolefins (e.g., polyethylene, polypropylene, polybutylene, ethylene copolymers, propylene copolymers, butylene copolymers, and copolymers and blends of these polymers), polyesters, and polyamides. The nonwoven substrate may be formed from fibers or filaments made of any suitable thermoplastic polymeric material. Suitable polymeric materials include, but are not limited to, polyolefins, poly(isoprenes), poly(butadienes), fluorinated polymers, chlorinated polymers, polyamides, polyimides, polyethers, poly(ether sulfones), poly (sulfones), poly(vinyl acetates), copolymers of vinyl acetate, such as poly(ethylene)-co-poly(vinyl alcohol), poly(phosphazenes), poly(vinyl esters), poly(vinyl ethers), poly(vinyl alcohols), and poly(carbonates). Suitable polyolefins include, but are not limited to, poly(ethylene), poly(propylene), poly(l-butene), copolymers of ethylene and propylene, alpha olefin copolymers (such as copolymers of ethylene or propylene with 1-butene, 1-hexene, 1-octene, and 1-decene), poly(ethylene-co-1-butene) and poly(ethylene-co-1-butene-co-1-hexene). Suitable fluorinated polymers include, but are not limited to, poly(vinyl fluoride), poly(vinylidene fluoride), copolymers of vinylidene fluoride (such as poly(vinylidene fluoride-co-hexafluoropropylene), and copolymers of chlorotrifluoroethylene (such as poly(ethylene-co-chlorotrifluoroethylene). Suitable polyamides include, but are not limited to: poly(iminoadipoyliminohexamethylene), poly (iminoadipoyliminodecamethylene), and polycaprolactam. Suitable polyimides include poly(pyromellitimide). Suitable poly(ether sulfones) include, but are not limited to, poly (diphenylether sulfone) and poly(diphenylsulfone-co-diphenylene oxide sulfone). Suitable copolymers of vinyl acetate include, but are not limited to, poly(ethylene-co-vinyl acetate) and such copolymers in which at least some of the acetate groups have been hydrolyzed to afford various poly(vinyl alcohols) including, poly(ethylene-co-vinyl alcohol).

The fibers may also be multi-component fibers, for example, having a core of one thermoplastic material and a sheath of another thermoplastic material. The sheath may melt at a lower temperature than the core, providing partial, random bonding between the fibers when the mat of fibers is exposed to a sheath melts. A combination of mono-component fibers having different melting points may also be useful for this purpose. In some embodiments, the nonwoven fabric or web useful in the core according to the present disclosure is at least partially elastic. Examples of polymers for making elastic fibers include thermoplastic elastomers such as ABA block copolymers, polyurethane elastomers, polyolefin elastomers (e.g., metallocene poly olefin elastomers), olefin block copolymers, polyamide elastomers, ethylene vinyl acetate elastomers, and polyester elastomers. An ABA block copolymer elastomer generally is one where the A blocks are polystyrenic, and the B blocks are prepared from conjugated dienes (e.g., lower alkylene dienes). The A block is generally formed predominantly of substituted (e.g., alkylated) or unsubstituted styrenic moieties (e.g., polystyrene, poly(alphamethylstyrene), or poly (t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted, and has an average molecular weight from about 5,000 to 500,000 grams per mole. The A and B blocks may be configured, for example, in linear, radial, or star configurations. An ABA block copolymer may contain multiple A and/or B blocks, which blocks may be made from the same or different monomers. A typical block copolymer is a linear ABA block copolymer, where the A blocks may be the same or different, or a block copolymer having more than three blocks, predominantly terminating with A blocks. Multi-block copolymers may contain, for example, a certain proportion of AB diblock copolymer, which tends to form a more tacky elastomeric film segment. Other elastic polymers can be blended with block copolymer elastomers, and various elastic polymers may be blended to have varying degrees of elastic properties. Many types of thermoplastic elastomers are commercially available, including those from BASF, Florham Park, N.J., under the trade designation "STYROFLEX", from Kraton Polymers, Houston, Tex., under the trade designation "KRATON", from Dow Chemical, Midland, Mich., under the trade designation "PELLETHANE", "INFUSE", VERSIFY", or "NORDEL", from DSM, Heerlen, Netherlands, under the trade designation "ARNITEL", from E. I. duPont de Nemours and Company, Wilmington, Del., under the trade designation "HYTREL", from ExxonMobil, Irving, Tex. under the trade designation "VISTAMAXX", and more.

For example, the fibrous nonwoven web can be made by carded, air laid, wet laid, spunlaced, spunbonding, electrospinning or melt-blowing techniques, such as melt-spun or melt-blown, or combinations thereof. Any of the non-woven webs may be made from a single type of fiber or two or more fibers that differ in the type of thermoplastic polymer, shape, and/or thickness; the single fiber type or at least one of the multiple fiber types may each be a multicomponent fiber as described above.

Staple fibers may also be present in the web. The presence of staple fibers generally provides a loftier, less dense web than a web of only melt blown microfibers. A loftier web may have reduced cohesive strength at the core interface or the in bulk of the core itself, leading to easier separation from one or more adhesive layers.

The nonwoven article may optionally further comprise one or more layers of scrim. For example, either or both major surfaces may each optionally further comprise a scrim layer. The scrim, which is typically a woven or nonwoven reinforcement made from fibers, is included to provide strength to the nonwoven article. Suitable scrim materials include, but are not limited to, nylon, polyester, fiberglass, polyethylene, polypropylene, and the like. The average thickness of the scrim can vary. The layer of the scrim may optionally be bonded to the nonwoven substrate. A variety of adhesive materials can be used to bond the scrim to the substrate. Alternatively, the scrim may be heat-bonded to the nonwoven.

Useful nonwoven cores may have any suitable EFD, basis weight or thickness that is desired for a particular application. "Effective Fiber Diameter" or "EFD" is the apparent diameter of the fibers in a fiber web based on an air permeation test in which air at 1 atmosphere and room temperature is passed through a web sample at a specified thickness and face velocity (typically 5.3 cm/sec), and the corresponding pressure drop is measured. Based on the measured pressure drop, the Effective Fiber Diameter is calculated as set forth in Davies, C. N., The Separation of Airborne Dust and Particulates, Institution of Mechanical Engineers, London Proceedings, IB (1952). The fibers of the nonwoven substrate typically have an effective fiber diameter of from at least 0.1, 1, 2, or even 4 micrometers and at most 125, 75, 50, 35, 25, 20, 15, 10, 8, or even 6 micrometers. Spunbond cores typically have an EFD of no greater than 35, while air-laid cores may have a larger EFD on the order of 100 microns. The nonwoven core preferably has a basis weight in the range of at least 5, 10, 20, or even 50 g/m$^2$; and at most 800, 600, 400, 200, or even 100 g/m$^2$. Basis weight is calculated from the weight of a 10 cm×10 cm sample. The minimum tensile strength of the nonwoven web is about 4.0 Newtons in the machine direction. For embodiments featuring a membrane at least partially infused with an adhesive composition, a larger EFD (e.g., at least 45) available in an air-laid or bonded carded web may be desirable in certain circumstances. Without wishing to be bound by theory, the larger EFD and attendant high loft can allow for improved penetration of the adhesive through the membrane.

The loft of core nonwovens can also be characterized in terms of Solidity (as defined herein and as measured by methods reported herein). Solidity is determined by dividing the measured bulk density of a nonwoven fibrous web by the density of the materials making up the solid portion of the web. Bulk density of a web can be determined by first measuring the weight (e.g., of a 10-cm-by-10-cm section) of a web. Dividing the measured weight of the web by the web area provides the basis weight of the web, which is reported in g/m2. The thickness of the web can be measured by obtaining (e.g., by die cutting) a 135 mm diameter disk of the web and measuring the web thickness with a 230 g weight of 100 mm diameter centered atop the web. The bulk density of the web is determined by dividing the basis weight of the web by the thickness of the web and is reported as g/m3. The Solidity is then determined by dividing the bulk density of the nonwoven fibrous web by the density of the material (e.g., polymer) comprising the solid filaments of the web. The density of a bulk polymer can be measured by standard means if the supplier does not specify the material density.

Loft is usually reported as 100% minus the Solidity (e.g., a Solidity of 7% equates to a loft of 93%). A higher loft is particularly advantageous in pattern embossed cores, as the adhesive can infiltrate and flow throughout the void volume with greater relative ease during the application of thermal energy and/or pressure. As such, it may be desirable to couple a high loft nonwoven core with a pattern embossing process to create the requisite arrays of recesses.

As disclosed herein, webs of Solidity from about 2.0% to less than 12.0% (i.e., of loft of from about 98.0% to greater than 88.0%) can be produced. In various embodiments, webs as disclosed herein comprise a Solidity of at most about 7.5%, at most about 7.0%, or at most about 6.5%. In further embodiments, webs as disclosed herein comprise a Solidity of at least about 5.0%, at least about 5.5%, or at least about 6.0%.

Polymeric Films

In many embodiments of the present disclosure, the core may include or consist of a polymeric film. Polymeric film core layers can be in a variety of forms including, for example, a single-layer or multi-layer film, a porous film, and combinations thereof. The polymeric film may contain one or more fillers (e.g., calcium carbonate). The polymer film can be a continuous layer or a discontinuous layer. Multi-layer polymer films are preferably integrally bonded to one another in the form of a composite film, a laminate film, and combinations thereof. Multilayer polymeric films can be prepared using any suitable method including, for example, co-molding, coextruding, extrusion coating, joining through an adhesive, joining under pressure, joining under heat, and combinations thereof.

The film may comprise a single polymeric material or may be prepared from a mixture of polymeric materials. Examples of suitable materials include polyesters such as polyethylene terephthalate, polyethylene naphthalate, copolyesters or polyester blends based on naphthalene dicarboxylic acids; polycarbonates; polystyrenes; styrene-acrylonitriles; cellulose acetates; polyether sulfones; poly(meth)acrylates such as polymethylmethacrylate; polyurethanes; polyvinyl chloride; polycyclo-olefins; polyimides; or combinations or blends thereof.

Examples of materials that can be included in the core include polyolefins such as polyethylene, polypropylene (including isotactic polypropylene), polystyrene, polyester, polyvinyl alcohol, poly(ethylene terephthalate), poly(butylene terephthalate), polyimide, poly(caprolactam), poly(vinylidene fluoride), polylactides, cellulose acetate, and ethyl cellulose and the like.

The polymeric film layer can be a single layer or a multilayer construction. More than one polymeric film layer can be present. The polymeric film layers can be comprised of any film-forming polymers.

In some embodiments, the polymeric film layer(s) includes at least one of a vinylaromatic copolymer, a linear low density polyethylene, a low density polyethylene, a high density polyethylene, a copolymer of ethylene and (meth)acrylate monomers, a copolymer of ethylene and (meth)acrylate monomers containing acid modifications, a copolymer of ethylene and vinyl acetate, a copolymer of ethylene and vinyl acetate containing acrylate, and/or acid modifications. In some embodiments, the film contains polymers from olefin monomers with between 2 and 16 carbons. In some embodiments, the film is a copolymer of two or more olefin monomers. In some embodiments, the film contains polymers from olefin monomers with atactic, syndiotactic, or isotactic stereochemistry. In some embodiments, the film is a copolymer of one or more olefin monomers polymerized using a metallocene catalyst. In some embodiments, the film is comprised of vinyl copolymers such as poly(vinyl chloride), poly(vinyl acetate), and the like. In some embodiments, the film is a blend comprised of any of the polymers listed above.

Exemplary suitable film materials can include SEBS, SEPS, SIS, SBS, polyurethane, ethyl vinylacetate (EVA), ultra low linear density polyethylene (ULLDPE), hydrogenated polypropylene, ethyl methyl acrylate (EMA), ultra low linear density polyethylene (ULLDPE), hydrogenated polypropylene, high density polyethylene (HDPE), low density polyethylene (LDPE), linear low density polyethylene (LLDPE, polyesters including polyethylene terephthalate (PET), and combinations or blends thereof. In some embodiments, the polymeric film consists of multiple layers of any of the polymers listed above. In particular embodiments, the multiple layers include a core layer and one or more skin layers, as described in PCT Application No. US2017/016039 (Runge et al.), incorporated herein by reference in its entirety.

The polymer films described herein can be produced using any method known in the art.

Particles

In some embodiments, the core layer consists of an assortment of particles. The particles can be distributed in one or more core layers. In general, the particles may be solid, hollow or porous and rigid or non-rigid. The particles may be made of any suitable material including wood, glass, ceramics, polymers, metals, metal oxides, and carbon materials. The particles of the core layer are generally in the size range of from about 1 microns to about 100 mils. Different particles can be distributed in different core layers. One core layer can also contain multiple compositions, types, or sizes of particles. The particles in one core layer may be of the same or different composition and surface treatment. The particles can be arranged in a particular shape or can be distributed unevenly. The surface of the particles may be treated or functionalized to be hydrophobic or to be hydrophilic. The particles can be agglomerated or non-agglomerated and aggregated or non-aggregated. "Agglomerate" refers to a weak association between primary particles which may be held together by charge or polarity and can be broken down into smaller entities. "Aggregate" refers to strongly bonded or fused particles where the resulting external surface area may be significantly smaller than the sum of calculated surface areas of the individual components. The forces holding an aggregate together can include strong forces, for example, covalent bonds, or those resulting from sintering or complex physical entanglement. An aggregate may also be held together by reversible or temperature dependent bonds (e.g., ionic bonds).

In some embodiments, the core includes inorganic particles. The inorganic particles can be natural or synthetic. The term "synthetic inorganic particles" as used herein includes any particles that has been transformed, regenerated, recrystallized, reconstituted, etc., from an original state which may be its naturally occurring, mined state into its current state by a chemical synthesis process (e.g., precipitated from solution, generated by flame hydrolysis, etc.) or by a physical synthesis process (e.g., precipitated from a gaseous phase, solidified by way of a sol-gel process, etc.). The term "synthetic inorganic filler" as used herein also includes any filler that has been substantially transformed from an original state (which may be its naturally occurring, mined state) into its current state by a physical synthesis process of being brought into an at least partially softened or molten state and then solidified by cooling, such that any substantially crystalline structure that may have existed in the natural state is substantially erased such that the material is now in a substantially amorphous form (e.g., comprising less than about 0.5 percent crystallinity by weight). Such processes may include, for example, melt processing, flame-fusion and the like. Conversely, "natural inorganic particles" is defined as a mineral that has been extracted from the earth in its naturally occurring form, and, while possibly being subjected to purification and/or modification processes is used while still substantially in its naturally occurring form.

Using the definitions provided above, synthetic inorganic particles include, for example, so-called glass bubbles or microspheres (such as those available from 3M Company of St. Paul, Minn., under the trade designation 3M Glass Bubbles), ceramic microspheres (such as those available from 3M Company under the trade designation 3M Ceramic Microspheres), synthetic clays (e.g., synthetic silicate clays such as those available under the trade designation Laponite from Southern Clay Products of Gonzales, Tex.), precipitated silica, fumed silica, vitreous silica, synthetic titanium dioxide (as made, for example, by the sulfate process or the chloride process), synthetic (precipitated) calcium carbonate (as made, for example, by passing carbon dioxide through a solution of calcium hydroxide), and the like.

Suitable natural inorganic particles include calcite, witherite, rutile, anatase, ilmenite, mica, sericite, perlite, talc, limestone, silica, barite, gypsum, calcined gypsum, kaolinite, montmorillonite, attapulgite, illite, saponite, hectorite, beidellite, stevensite, sepiolite, bentonite, pyrophyllite, diatomaceous earth, and the like, as well as mixtures thereof.

If used in the core, polymeric particles may be made of any suitable polymeric material. Polymeric particles may be made of rigid materials or elastomeric materials. Suitable rigid polymeric materials include thermosetting polymers, e.g., phenolic polymers, or thermoplastic polymers, e. g., polyvinylidene chloride acrylonitrile copolymers (PVDC copolymers). Exemplary elastomeric microspheres are described in U.S. Pat. No. 3,691,140 to Silver, U.S. Pat. Nos. 3,857,731 and 4,166,152 to Baker et al. Other suitable polymeric particles include fluid-filled microspheres comprising an acrylonitrile/methyl methacrylate thermoplastic copolymer, such as those sold under the tradename EXPANCEL® by Akzo Nobel. In another aspect, the polymeric particles can include a shell consisting of either acrylonitrile copolymer or polyvinylidene chloride copolymer with a calcium carbonate coating, such as those sold under the tradename DUALITE® by Henkel.

Other exemplary particles include fused aluminum oxide, heat treated aluminum oxide, white fused aluminum oxide, black silicon carbide, green silicon carbide, titanium diboride, boron carbide, tungsten carbide, titanium carbide, diamond (both natural and synthetic), silica, iron oxide, chromia, ceria, zirconia, titania, silicates, tin oxide, cubic boron nitride, garnet, fused alumina zirconia, sol gel particles, and the like, as well as mixtures thereof.

Typically, the particles used in the core have an average primary (in some embodiments, average primary and agglomerate) particle size (e.g., diameter) of no greater than 1 micron. "Primary particle size" refers to the largest dimension (e.g., the diameter of a spherical particle) of a single (non-aggregated, non-agglomerated) particle. In some embodiments, the particles have an average primary (in some embodiments, average primary and agglomerate) particle size of no greater than 0.1 micron.

The particles can be substantially spherical in shape. However, other shapes such as elongated shapes may alternatively be employed. Examples of such shapes include rods, triangles, platelets, pyramids, cones, solid spheres, hollow spheres and the like. Also, the particles may be randomly shaped.

Adhesive

In some embodiments, the core includes an adhesive. In some embodiments, the core is a pressure-sensitive adhesive. A general description of useful pressure sensitive adhesives may be found in the Encyclopedia of Polymer Science and Engineering, Vol. 13, Wiley-Interscience Publishers (New York, 1988). Additional description of useful pressure-sensitive adhesives may be found in the Encyclopedia of Polymer Science and Technology, Vol. 1, Interscience Publishers (New York, 1964). Pressure sensitive adhesive compositions are well known to those of ordinary skill in the art to possess properties including the following: (1) tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Suitable PSAs may be based on crosslinked or non-crosslinked (meth)acrylics, rubbers, thermoplastic elastomers, silicones, polyurethanes, and the like, and may include tackifiers in order to provide the desired tac, as well as other additives. In some embodiments, the PSA is based on a (meth)acrylic PSA or at least one poly(meth)acrylate, where (meth)acrylate refers to both acrylate and methacrylate groups. In some embodiments, the PSA is an olefin block copolymer based adhesive. Acrylic based pressure sensitive adhesives are described in U.S. Pat. No. 4,726,982 (Traynor et al.) and in U.S. Pat. No. 5,965,256 (Barrera), for example. Silicone based pressure sensitive adhesives are described in U.S. Pat. No. 6,730,397 (Melancon et al.) and U.S. Pat. No. 5,082,706 (Tangney), for example. Polyurethane based pressure sensitive adhesives are described in U.S. Pat. Appl. Pub. No. 2005/0137375 (Hansen et al.), for example. Olefin block copolymer based pressure sensitive adhesives are described in U.S. Pat. Appl. Pub. No. 2014/0335299 (Wang et al.), for example.

The core may include a plurality of adhesive layers. For example, the core may include a relatively stiff rubber based adhesive as an inner layer, with a softer acrylic based PSA disposed between the inner core layer and the peelable adhesive layer(s). As another example, the core may include a relatively soft acrylic based adhesive as an inner layer, with a relatively stiffer rubber based adhesive disposed between the inner core layer and the peelable adhesive layer(s). The characteristics of the adhesive in the core may be selected or modified to achieve the desired properties.

If used in the core, an adhesive can be of a different composition from the peelable adhesive layer(s) to avoid an increase in cohesive strength at any core-adhesive interface. Alternatively, the surface of the adhesive can be modified by release materials or deadening layer(s), as described above.

Gels

If used in the core, a gel typically has a viscosity (to the extent one is measurable) of at least 100,000 Centipoise (cps), at least 500,000 cps, at least 600,000 cps and in yet other embodiments at least 700,000 cps when measured at 23° C. using a Brookfield LVT viscometer. In some embodiments, the core can have a gel content (i.e., gel fraction) of greater than 25%, or greater than 50%, or greater than 80%, when measured by extraction of soluble polymer in a suitable solvent (e.g., heated tetrahydrofuran or toluene). In some embodiments, the gel is an adhesive as described above. The bonds or other attractive forces in certain gels may be reconstitutable after separation, allowing a gel core to be reused even after an adhesive article has been removed from an adherend.

Thixotropic gels are particularly useful for inclusion in the core because they are less likely to flow under forces typically experienced during use of the adhesive articles of the present disclosure. Suitable gels include gels containing glycerine (see, for example, U.S. Pat. No. 3,780,537 (Spencer) and U.S. Patent Application Pub. No. US 2010/0274333 (Dunshee et al.)); gels containing silicone and siloxy-containing compounds (see, for example, U.S. Pat. No. 7,795,326 (Salamone et al.)); gels containing propylene glycol (see, for example, U.S. Pat. No. 5,843,145 (Brink)); gels containing a crosslinked, water-absorbing polymer such as crosslinked polyacrylamide and sodium polyacrylate (see, for example, U.S. Pat. No. 5,697,961 (Kiamil); and hydrophilic gels prepared from starting materials such as poly(ethylene oxide), polyvinyl pyrrolidone, polyacrylamide, anionic polyacrylamide, polyvinyl alcohol, maleic anhydride-vinylether copolymers, polyacrylic acid, ethylene-maleic anhydride copolymers, polyvinylether, dextran, gelatin, hydroxyl propyl cellulose, methyl cellulose, carboxymethyl cellulose, hydroxyethyl-carboxymethyl cellulose, hydroxyethyl cellulose, propylene glycol alginate, sodium alginate, polyethyleneimine, polyvinyl alkyl pyridinium halides, polyproline, natural starches, casein, proteins, polymethacrylic acid, polyvinylsulfonic acid, polystyrene sulfonic acid, polyvinylamine, poly-4-vinylpyridine, polymerized monoesters of olefinic acids, polymerized diesters of olefinic acids, acrylamide and difunctional polymerizable materials (e.g., diacids, diesters or diamides), and the like.

Exemplary suitable gels are commercially available as NICKELODEON GAK (from NSI International).

Peelable Adhesive Layer(s)

The adhesives used in the adhesive articles described herein can include any adhesive having the desired properties. In some embodiments, the adhesive is peelable. In some embodiments, the adhesive releases cleanly from the surface of an adherend when the adhesive article is peeled at an angle of about 35° or less from a surface of the adherend. In some embodiments, the peelable adhesive releases from a surface of an adherend when an article is peeled at an angle of about 35° or greater from the adherend surface such that there are substantially no traces of the adhesive left behind on the surface of the adherend.

The adhesive can be, for example, any of the adhesives described in any of the following patent applications, all of which are incorporated by reference herein: International Publication Nos. WO/2015/035556, WO/2015/035960, WO/2017/136219, WO/2017/136188 and U.S. Patent Application No. 2015/034104, all of which are incorporated herein in their entirety.

In some embodiments, the peelable adhesive is a pressure sensitive adhesive. Any suitable composition, material or ingredient can be used in the pressure sensitive adhesive. Exemplary pressure sensitive adhesives utilize one or more thermoplastic elastomers, e.g., in combination with one or more tackifying resins. In some embodiments, the adhesive is not a pressure sensitive adhesive.

In some embodiments, the peelable adhesive layer can include at least one of rubber, silicone, or acrylic based adhesives. In some embodiments, the peelable adhesive layer can include a pressure-sensitive adhesive (PSA). In some embodiments, the peelable adhesive can include tackified rubber adhesives, such as natural rubber; olefins; silicones, such as silicone polyureas or silicone block copolymers; synthetic rubber adhesives such as polyisoprene, polybutadiene, and styrene-isoprene-styrene, styrene-ethylene-butylene-styrene and styrene-butadiene-styrene block copolymers, and other synthetic elastomers; and tackified or untackified acrylic adhesives such as copolymers of isooctylacrylate and acrylic acid, which can be polymerized by radiation, solution, suspension, or emulsion techniques; polyurethanes; silicone block copolymers; and combinations of the above.

Generally, any known additives useful in the formulation of adhesives may also be included. Additives include plasticizers, anti-aging agents, ultraviolet stabilizers, colorants, thermal stabilizers, anti-infective agents, fillers, crosslinkers, as well as mixtures and combinations thereof. In certain embodiments, the adhesive can be reinforced with fibers or a fiber scrim which may include inorganic and/or organic fibers. Suitable fiber scrims may include woven-, non-woven or knit webs or scrims. For example, the fibers in the scrim may include wire, ceramic fiber, glass fiber (for example, fiberglass), and organic fibers (for example, natural and/or synthetic organic fibers).

In some embodiments, the adhesive includes a tackifier. Some exemplary tackifiers include at least one of polyterpene, terpene phenol, rosin esters, and/or rosin acids.

In some embodiments, the peelable adhesive is a flowable adhesive that can be coated onto the backing. In some embodiments, the peelable adhesive is a more solid adhesive as is generally described in, for example, German Patent No. 33 31 016.

In some embodiments, the peelable adhesive has a Tg of between about −125 degrees Celsius and about 20 degrees Celsius, as determined by dynamic mechanical analysis of the tan δ peak value. In some embodiments, the peelable adhesive has a Tg of between about −70 degrees Celsius and about 0 degrees Celsius. In some embodiments, the peelable adhesive has a Tg of between about −60 degrees Celsius and about −20 degrees Celsius. In some embodiments, the peelable adhesive has a Tg of greater than −80 degrees Celsius, greater than −70 degrees Celsius, greater than −60 degrees Celsius, greater than −50 degrees Celsius, greater than −40 degrees Celsius, or great than −30 degrees Celsius. In some embodiments, the peelable adhesive has a Tg of less than 20 degrees Celsius, 10 degrees Celsius, 0 degrees Celsius, −10 degrees Celsius, −20 degrees Celsius, or −30 degrees Celsius.

Some peelable adhesives that can be used in the adhesive articles of the present disclosure have a storage modulus of about 300,000 Pa or greater, about 400,000 Pa or greater, about 500,000 Pa or greater, about 1,000,000 Pa or greater at 25° C., as determined by dynamic mechanical analysis. In other embodiments, the adhesive has a storage modulus of 750,000 Pa or less, 500,000 Pa or less, 400,000 Pa or less, 300,000 Pa or less, or 250,000 Pa or less at 25° C., as determined by dynamic mechanical analysis.

In some embodiments, the thickness of the peelable adhesive on at least one of the first or second major surfaces of the core is about 1 μm to about 1 mm.

In some embodiments, adhesion properties of the adhesive can range from 0.1 N/dm to 25 N/dm. In some embodiments, adhesion properties of the adhesive can range from 0.5 N/dm to 10 N/dm. In some embodiments, adhesion properties of the adhesive can range from 1 N/dm to 5 N/dm.

In some embodiments, the peelable adhesive can provide a shear strength of, for example, 1-20 pounds per square inch as measured by ASTM Test Method D3654M-06.

In some embodiments, the peelable adhesives are tailored to achieve peel with no or minimal damage. Exemplary methods and articles for doing so are described in, for example, U.S. Pat. No. 6,835,452, International Publication Nos. WO/2018/039584 and WO/2017/136188, each incorporated herein in their entirety.

Adhesive Article(s)

In some embodiments, the adhesive article further includes a tab. The tab is an area that can be easily accessed by the user to assist in or begin to release the adhesive article from the adherend. The removal tab can be tacky from the outermost adhesive layer or non-tacky by being covered by layers of stretch film, non-stretch film, release liner, or from detackified adhesive. The tab may be created by assembling all components of the article and using, for example, die-cutting, laser-cutting, or crimping methods to define the tab periphery.

In some embodiments, the adhesive article further includes one or more release liners. The release liner can be, for example, on either or both of the major surfaces of the adhesive layers. The release liner protects the adhesive during manufacturing, transit, and before use. When the user desires to use the adhesive article, the user can peel or remove the release liner to expose the adhesive. Examples of suitable liners include paper, e.g., kraft paper, or polymeric films, e.g., polyethylene, polypropylene or polyester. At least one surface of the liner can be treated with a release agent such as silicone, a fluorochemical, or other low surface energy based release material to provide a release liner. Suitable release liners and methods for treating liners are described in, e.g., U.S. Pat. Nos. 4,472,480, 4,980,443 and 4,736,048, and incorporated herein. Preferred release liners are fluoroalkyl silicone polycoated paper. The release liners can be printed with lines, brand indicia, or other information.

In some embodiments, the adhesive articles of the present disclosure can be removed from a substrate or surface without damage. In particularly advantageous embodiments, the adhesive articles can be removed from at least one of painted drywall and wallpaper without damage.

Some adhesive articles of the present disclosure have excellent shear strength. Some embodiments of the present disclosure have a shear strength of greater than 1600 minutes as measured according to ASTM D3654-82. Some embodiments of the present disclosure have shear strength of greater than 10,000 minutes as measured according to ASTM D3654-82. Some other embodiments of the present disclosure have shear strength of greater than 100,000 minutes as measured according to ASTM D3654-82.

Some adhesive articles of the present disclosure demonstrate a lower 90° Peel Adhesion Strength to make the adhesive article easier to remove. Others demonstrate a higher 90° Peel Adhesion Strength, yet still provide for damage free removal. Some adhesive articles of the present disclosure can have a higher 90° Peel Adhesion Strength as to permit handling of the adhesive article by the user without accidental separation. Some embodiments of the present disclosure have a 90° Peel Adhesion Strength between about 50 oz/in$^2$ to 400 oz/in$^2$. Some embodiments of the present disclosure have a 90° Peel Adhesion Strength between about 100 oz/in$^2$ to 300 oz/in$^2$. Some embodiments of the present disclosure have a 90° Peel Adhesion Strength between about 150 oz/in$^2$ to 250 oz/in$^2$.

Some adhesive articles of the present disclosure demonstrate improved weight bearing capacity, holding a 2 lbs weight for at least 48 hours according to the Weight Hanging test. In presently preferred embodiments, the adhesive articles of the present disclosure demonstrate improved weight bearing capacity, holding a 2 lbs weight for at least 72 hours according to the Weight Hanging test.

Some adhesive articles of the present disclosure have an elongation at break of greater than 50% in at least one direction. Some adhesive articles of the present disclosure have an elongation at break of between about 50% and about 1200% in at least one direction.

Some adhesive articles of the present disclosure have a tensile strength at break sufficiently high so that the adhesive article will not rupture prior to being removed from an adherend at an angle of 35° or greater. In some embodiments, the adhesive articles of the present disclosure exhibit enhanced conformability to a substrate or surface than prior art adhesive mounting articles. In some embodiments, the adhesive articles of the present disclosure hold more weight when adhered or attached to a substrate or surface than prior art adhesive mounting articles. In some embodiments, the adhesive articles of the present disclosure hold more weight for a longer period of time when adhered or attached to a substrate or surface than prior art adhesive mounting articles. In some embodiments, the adhesive articles of the present disclosure remain adhered to a textured, rough, or irregular surface for a longer period of time than prior art adhesive mounting articles. In some embodiments, the adhesive articles of the present disclosure hold a higher amount of weight when adhered to a textured, rough, or irregular surface than prior art adhesive mounting articles.

In some embodiments, the adhesive article is substantially optically clear. Some embodiments have a light transmission of at least about 50%. Some embodiments have a light transmission of at least about 75%. Some embodiments have a haze of no greater than 40%. Some embodiments, have a haze of no greater than 20%. Both the light transmission and the haze of the adhesive article can be determined using, for example, ASTM D1003-95.

In some embodiments, the adhesive article exhibits an elastic recovery of greater than 70% or greater than 80% or greater than 95% at 10% strain. In some embodiments, the adhesive article exhibits an elastic recovery of greater than 70% or greater than 80% or greater than 90% at 25% strain. In some embodiments, the adhesive article exhibits an elastic recovery of greater than 70% or greater than 80% or greater than 90% or greater than 95% at 50% strain. In some embodiments, the adhesive article exhibits an elastic recovery of greater than 50% or greater than 70% or greater than 95% at 100% strain.

In some embodiments, the core can prevent or minimize substrate damage by reducing, minimizing, or eliminating the core material's contribution to the peel force, which aids in damage-free adhesive removal. In some embodiments, this can occur at peel angles ranging from 0-180 degrees. In some embodiments, when the final adhesive article construction is peeled from the adherend at 90-180 degrees the core elongates less than 1% during peeling. In some embodiments, when the adhesive article construction is peeled from the adherend at 90-180 degrees the core elongates less than 5% during peeling. In some embodiments, when the construction is peeled from the adherend at 90-180 degrees the core elongates less than 10% during peeling. In some embodiments, when the article is peeled from an adherend at 90-180 degrees the core elongates more than 10% strain, and elastically recovers more 80% of that deformation. In some embodiments, when the adhesive is peeled from an adherend at 90-180 degrees the core elongates more than 10% strain, and elastically recovers more 90% of that deformation. In some embodiments, when the adhesive article is peeled from an adherend at 90-180 degrees the core elongates more than 10% strain, and elastically recovers more 95% of that deformation. In some embodiments, when the adhesive article is peeled from an adherend at 90-180 degrees the core elongates more than 10% strain, and elastically recovers more 99% of that deformation.

Adhesive articles of the present disclosure can advantageously provide enhanced weight bearing capability with a reduction or elimination of substrate damage on removal. Accordingly, presently preferred embodiments of the present disclosure demonstrate effective weight bearing capacity, a stronger adhesion per square inch of available adhesive area, and peel-removability from a painted drywall substrate without damage, Hardgoods Some embodiments further include a hardgood or mounting device. Exemplary hardgoods or mounting devices include, for example, hooks, knobs, clips, and loops. In some embodiments, the hardgood resembles a nail. In some embodiments, the hardgood has a single outward projection to act as a hanging surface. In some embodiments, the hardgood has multiple outward projections to act as a hanging surface. In some embodiments, the hardgood has is molded into a shape that can hold one or more items within such as but not limited to a box or caddy. In some embodiments, the hardgood is a shelf, ledge, or rack. In some embodiments, the hardgood is a bar wherein the bar can be straight or curved or substantially a ring wherein the bar can be mounted parallel or normal to the substrate surface. In some embodiments, the hardgood uses multiple methods for mounting or hanging items. Any of the following mounting devices can be used with the adhesive article of the present disclosure: Application Matter No. 77486US002 (assigned to the present assignee), U.S. Pat. No. 5,409,189 (Luhmann), U.S. Pat. No. 5,989,708 (Kreckel), U.S. Pat. No. 8,708,305 (McGreevy), U.S. Pat. No. 5,507,464 (Hamerski et al.), U.S. Pat. No. 5,967,474 (doCanto et al.), U.S. Pat. No. 6,082,686 (Schumann), U.S. Pat. No. 6,131,864 (Schumann), U.S. Pat. No. 6,811,126 (Johansson, et al.), U.S. Pat. No. D665,653, and U.S. Pat. No. 7,028,958 (Pitzen, et al.), all of which are incorporated by reference in their entirety herein. The hardgood may be any object to be mounted to a substrate.

In some embodiments, the hardgood is mounted to the substrate in one or more places wherein one or more of the mounting locations contain an adhesive article described in this invention. In some embodiments, the hardgood is mounted using a combination of removable article(s) and conventional mechanical fasteners including but not limited to nails, screws, bolts, and rivets.

In some embodiments, the hardgood is made from of thermoplastic polymers. In some embodiments, the hardgood is made from thermoset polymers. In some embodiments, the hardgood is made using polyolefin materials. In some embodiments, the hardgood is made using polycarbonate materials. In some embodiments, the hardgood is made using high-impact polystyrene. In some embodiments, the hardgood is made using acrylonitrile-butadiene-styrene (ABS) terpolymers. In some embodiments, the hardgood is made using two or more polymeric materials. In some embodiments, the hardgood is made from metal. In some embodiments, the hardgood is made from stainless steel. In some embodiments, the metal is painted, glazed, stained, brushed, or coated to alter its appearance. In some embodiments the hardgood is made from ceramic. In some embodiments, the hardgood is made from glazed ceramic. In some embodiments, the hardgood is made from unglazed ceramic. In some embodiments, the hardgood is comprised of naturally-based materials such as wood, bamboo, particle board, cloth, canvas, or derived from biological sources, and the like. In some embodiments, the naturally-based materials may be painted, glazed, stained, or coated to change their appearance. In some embodiments, the hardgood is made using two or more materials from the list above. In some embodiments, the hardgood is made from two pieces that are reversibly or irreversibly attached, joined, or welded together.

In some embodiments, the hardgood comprises two pieces wherein the first piece acts as a mounting surface for attaching the adhesive article to a substrate, and the second piece acts as a hanging member which may be used for hanging or mounting objects to the substrate. The two pieces may be reversibly attached using mechanical fasteners, hook and loop materials, or an additional adhesive layer.

The hardgood can be made using any method known in the art.

In some embodiments, the peelable adhesive layer(s) and core may be attached to the hardgood using a lamination process. In some embodiments, the peelable adhesive layer(s) and core may be attached to the hardgood using multiple lamination processes.

In some embodiments, the core may be attached to the hardgood using two or more injection molding steps in using one or more molds.

In some embodiments, the core and/or the peelable adhesive layer(s) may be attached manually by the end user.

Method of Making the Adhesive Articles Described Herein

The adhesive articles described herein can be made in various ways. One embodiment involves disposing an adhesive onto or adjacent to a major surface of a core. In some embodiments, a second adhesive is disposed onto the other major surface of the core.

The adhesive can be disposed on the core in any known way, including, for example, the pressure sensitive adhesive composition can be coated onto a release liner, coated directly onto a core, or formed as a separate layer (e.g., coated onto a release liner) and then laminated to a core. An adhesive can be deposited onto a core with a known deposition method, including, e.g., solvent coating methods, water-borne coating methods, or hot melt coating methods, e.g., knife coating, roll coating, reverse roll coating, gravure coating, wire wound rod coating, slot orifice coating, slot die coating, extrusion coating, or the like.

The core may be selectively consolidated, thinned, or densified using methods described above. The core may be consolidated (e.g., condensed) before, during, or after the adhesive has been disposed on one or both major surfaces. In presently preferred implementations, the consolidation occurs as (i.e., simultaneously or near simultaneously) the adhesive is being been deposited.

In certain implementations, the core is selectively consolidated (i.e., an arranged pattern of recesses is created) using ultrasonic welding. In ultrasonic welding (sometimes referred to as "acoustic welding" or "sonic welding"), two parts to be joined are placed proximate a tool called an ultrasonic "horn" for delivering vibratory energy. These parts (or "workpieces") are constrained between the horn and an anvil. Oftentimes, the horn is positioned vertically above the workpiece and the anvil. The horn vibrates, typically at 20,000 Hz to 40,000 Hz, transferring energy, typically in the form of frictional heat, under pressure, to the parts. Due to the frictional heat and pressure, a portion of at least one of the parts softens or is melted, thus joining the parts or creating an embossed pattern on the part transferred from either the horn or the anvil.

During the welding process, an alternating current (AC) signal is supplied to a horn stack, which includes a converter, booster, and horn. The converter (also referred to as a "transducer") receives the AC signal and responds thereto by compressing and expanding at a frequency equal to that of the AC signal. Therefore, acoustic waves travel through the converter to the booster. As the acoustic wavefront propagates through the booster, it is amplified, and is received by the horn. Finally, the wavefront propagates through the horn, and is imparted upon the workpieces, thereby welding them together or creating an embossed pattern on the part, as previously described.

Another type of ultrasonic welding is "continuous ultrasonic welding". This type of ultrasonic welding is typically used for sealing fabrics and films, or other "web" workpieces, which can be fed through the welding apparatus in a generally continuous manner. In continuous welding, the ultrasonic horn is typically stationary and the part to be welded is moved beneath it. One type of continuous ultrasonic welding uses a rotationally fixed bar horn and a rotating anvil. The workpiece is fed between the bar horn and the anvil. The horn typically extends longitudinally towards the workpiece and the vibrations travel axially along the horn into the workpiece. In another type of continuous ultrasonic welding, the horn is a rotary type, which is cylindrical and rotates about a longitudinal axis. The input vibration is in the axial direction of the horn and the output vibration is in the radial direction of the horn. The horn is placed close to an anvil, which typically is also able to rotate so that the workpiece to be welded passes between the cylindrical surfaces at a linear velocity, which substantially equals the tangential velocity of the cylindrical surfaces. Ultrasonic welding systems are described in U.S. Pat. Nos. 5,976,316 and 7,690,548, each incorporated by reference in their entirety herein.

In other presently preferred implementations, the core is consolidated by pattern embossing. In general, the core is passed through a metal roll that is patterned (e.g., engraved) with raised and depressed areas corresponding to the desired arrangement of recesses, and a solid back-up roll, generally formed of metal or rubber. However, the core can also be fed between two patterned rolls displaying corresponding or alternating engraved areas, as described in U.S. Pat. No. 5,256,231 (Gorman et al.). In either case, it is typical to supply heat to one or more of the rolls so that the core is thermally bonded along the points of pattern contact.

In a presently preferred embodiment, the fibrous webs according to the present invention are thermally embossed with a pattern roll and a patterned back-up roll. In general, the temperature must be such that the fibers of the core are thermally fused at the points of contact without fracturing, or otherwise seriously weakening the core below a useable strength level. In this regard, it is typical to maintain the temperature of the pattern rolls between about 70° C. and 220° C., or between about 85° C. and 180° C. The pattern rolls may be maintained at the same or different temperatures. In addition, the pattern rolls typically contact the nonwoven sheet material at a pressure of from about 17 N/mm to about 150 N/mm, or about 35 N/mm to about 90 N/mm.

Figure 8:
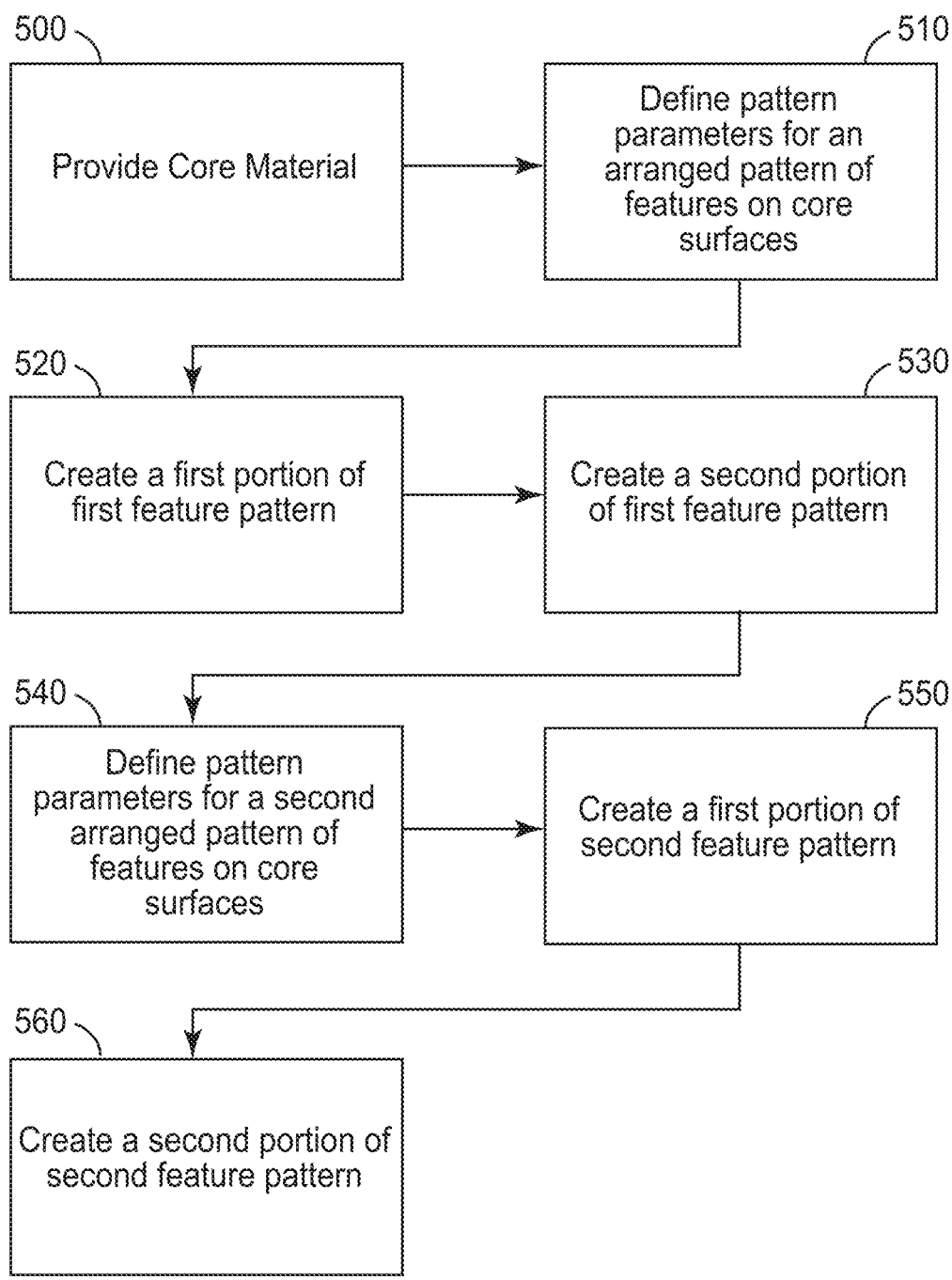
FIG. 8 is a block diagram detailing a method of creating arranged patterns of recesses on one or more surfaces of a core.

In another aspect, the present disclosure provides a method for creating one or more arranged patterns of recesses in a surface. A flow diagram for this process is depicted in FIG. 8. In step 500, a core material (i.e., backing) is provided. The core material can be provided in discrete form or as part of a continuous web of material. In step 510, pattern parameters relating to a first feature pattern are defined to control the initial location, spacing, and size of the recesses on the surface. The first feature pattern can include, but is not limited to, Cartesian grid arrays, hexagonal arrays, and other structured and unstructured arrays. Next, in step 520 the bonding apparatus is moved relative to a first surface of the core along a predetermined path of travel to consolidate the material and create a first portion of the first feature pattern. In other implementations, including those featuring continuous welding or pattern embossing, the surface of the core may be moved relative to the bonding apparatus. The first portion may be a generally horizontal, vertical, diagonal, sinusoidal, spiral or other linear or non-linear series of features, depending on the first feature pattern and the desired orientation of the first feature pattern on the core surface.

This process of creating pattern portions is repeated in Step 530 until the entire first arranged pattern of recesses is created on the desired portion of the core surface. For certain embodiments, the bonding apparatus is offset from the first series according to the first pattern parameters (e.g., pitch) and proceeds to traverse the surface again at the same relative orientation between the apparatus and the core surface to create a second, subsequent portion of the first arranged pattern. For processes relying on continuous web consolidation such as embossing with patterned rolls, the core may continue to be fed through the rolls so that the first pattern portion is continuously created on the desired portion of the entire web. Alternatively, the process 500 may stop at step 520 if a) the pattern is complete and/or; b) no further core material need be consolidated.

Optionally, the process outlined in steps 500-530 may be used to create additional patterns that at least partially overlap with the first arranged pattern, as set out in steps 540-560. The orientation and character of the arranged pattern relative to the surface can be modified, however, between or amongst first and second patterns. For example, the second pattern may consist of channels or recesses having larger dimensions. The modification in the pitch or other parameters between the first and second patterns can cause significant disruption of the recesses created in steps 500-530. In certain implementations, this disruption is caused by overlapping boundary regions of features that exceed an expected cross-sectional dimension (typically diameter). Disruption via substantial overlap between adjacent recesses can modify one or more characteristics of the features including, but not limited to depth, volume, curvature, and cross-sectional dimensions at the base and/or bottom surface. In typical implementations, the core material will take on the appearance of the second arranged pattern.

Though the process illustrated in FIG. 8 only outlines the creation of two overlapping feature patterns, one skilled in the art will appreciate that any number of overlapping patterns may be created. For example, it is possible to create of the surface with three, four, six, and eight overlapping arrays and patterns of recesses. In presently preferred circumstances, the orientation of the pattern relative to the surface is modified (e.g., rotated) after the creation of each pattern.

In another aspect, the present disclosure provides a method for creating an adhesive article in a core material already possessing a first arranged pattern of intrusive features. First, a core material including a first arranged pattern of recesses and two major surfaces is provided. The core may be, for example, the point-bonded film Unipro 275, a spunbond/meltblown/spunbond nonwoven web available from Midwest Filtration LLC (West Chester Township, Ohio). Next, an adhesive can be deposited onto one or both major surfaces of the core. As the adhesive-core interface is being created, the process outlined in steps 500-530 of the method of FIG. 8 may be used to create additional patterns that at least partially overlap with the first arranged pattern as set. The orientation and character of the arranged pattern relative to the surface can be modified between or amongst first and second patterns. For example, the second pattern may consist of channels or recesses having larger dimensions than those elements of the first pattern.

The use of two or more arranged patterns can provide certain advantages to adhesive articles of the present disclosure. For instance, a first arranged pattern may be selected to improve the shear holding capability of the article. A second arranged pattern, different from the first pattern, can be selected to improve the performance during peel (e.g., damage reduction and peel force). In one exemplary embodiment, the first arranged pattern comprises discrete circular recesses, and a second pattern includes a plurality of channels extending across the major surfaces of the core.

Discrete adhesive articles can be formed from a continuous web of core or adhesive laminated core by a cutting process such as, for example, laser cutting, die cutting, stamping, crimping, or a combination thereof Methods of Using the Adhesive Articles Described Herein The peelable articles of the present disclosure can be used in various ways. In some embodiments, the adhesive article is applied, attached to, or pressed into an adherend. In this way, the adhesive article contacts the adherend. Where a release liner is present, the release liner is removed before the adhesive article is applied, attached to, or pressed into an adherend. In some embodiments, at least a portion of the adherend is wiped with alcohol before the adhesive article is applied, attached to, or pressed into an adherend.

To remove the adhesive article from the adherend, at least a portion of the adhesive article is peeled or stretched away from the adherend. In some embodiments, the angle of stretch is 35° or less. In embodiments where a tab is present, the user can grip the tab and use it to release or remove the adhesive article from the adherend.

The adhesive articles can be used in isolation, as one of many articles attached to a surface, or as part of a stack of adhesive articles. In the latter implementation, the resulting construction would include a plurality of adhesive articles disposed in vertical relation to one another.

Uses

The adhesive articles may be used in wet or high humidity environments such as those found in bathrooms. For example, they can be adhered to toilets (e.g., toilet tanks), bathtubs, sinks, and walls. The adhesive article may be used in showers, locker rooms, steam rooms, pools, hot tubs, and kitchens (e.g., kitchen sinks, dishwashers and back splash areas, refrigerators and coolers). The adhesive article may also be used in low temperatures applications including outdoor applications and refrigerators. Useful outdoor applications include bonding articles such as signage to outdoor surfaces such as windows, doors and vehicles.

The adhesive articles may be used to mount various items and objects to surfaces such as painted drywall, plaster, concrete, glass, ceramic, fiberglass, metal or plastic. Items that can be mounted include, but are not limited to, wall hangings, organizers, holders, baskets, containers, decorations (e.g., holiday decorations), calendars, posters, dispensers, wire clips, body side molding on vehicles, carrying handles, signage applications such as road signs, vehicle markings, transportation markings, and reflective sheeting.

The adhesive articles may be used to mount items and materials, such as anti-slip mats or anti-fatigue mats, to a floor surface or the bottom of a tub or shower, or to secure items, such as area rugs, to a floor. The adhesive article can be used in various joining and assembling applications including such as adhering at least two containers (e.g., boxes) for later separation. The adhesive article can be used in various cushioning and sound deadening applications such as, for example, cushioning materials for placement beneath objects, sound insulating sheet materials, vibration dampening, and combinations thereof. The adhesive article can be used in various closure applications including container closures (e.g., box closures, closures for food containers, and closures for beverage containers), diaper closures, and surgical drape closures. The adhesive article can be used in various thermal insulation applications. The adhesive article can be used in various sealing applications such as in gaskets for liquids, vapors (e.g., moisture), and dust. The adhesive article can be used in various labels such as removable labels (e.g., notes, price tags, and identification labels on containers), and in signage. The adhesive article can be used in various medical applications (e.g., bandages, wound care, and medical device labeling such as in a hospital setting). The adhesive article can be used in various fastening applications such as fastening one object (e.g., a vase or other fragile object) to another object (e.g., a table or a book shelf). The adhesive article can be used in various securing applications such as fastening one or more components of a locking mechanism to a substrate (e.g., a child safety lock can be adhered to a cabinet or cupboard). The adhesive article can be used in various tamper indicating applications (e.g., tamper indicating articles). The adhesive article can also be incorporated in a variety of other constructions including, but not limited to, abrasive articles (e.g., for sanding), articles for sanding and polishing applications (e.g., buffing pads, disc pads, hand pads, and polishing pads), pavement marking articles, carpeting (e.g., backing for carpeting), and electronic devices (e.g., securing a battery within a housing in a cell phone or PDA (personal digital assistant) to prevent unwanted movement).

The adhesive article (i.e., those in adhesive tapes or single article) can be provided in any useful form including, e.g., tape, strip, sheet (e.g., perforated sheet), label, roll, web, disc, and kit (e.g., an object for mounting and the adhesive tape used to mount the object). Likewise, multiple adhesive articles can be provided in any suitable form including, e.g., tape, strip, sheet (e.g., perforated sheet), label, roll, web, disc, kit, stack, tablet, and combinations thereof in any suitable package including, for example, dispenser, bag, box, and carton. The adhesive articles are particularly well suited to being provided in roll form, as the size of the active adhesive areas can be essentially unlimited.

The need also exists for an adhesive article with desirable optical properties that allow it to be used to affix a substrate, such as an optical lens or cover, to an optical display device, such as a cellular telephone or portable music player (e.g., MP3 players). In such end use applications, it can be desirable that the adhesive article be optically clear.

Adhesive articles can also be initially repositionable and may even be reusable in some core iterations until one of the adhesive layers loses tack. As used herein, "repositionable" means an adhesive article that can be applied to a substrate and then removed and reapplied without distorting, defacing, or destroying the adhesive article, or substrate.

EMBODIMENTS

1. An adhesive article for mounting an object to a surface, the article comprising: a first adhesive layer; a core adjacent the first adhesive layer and defining a perimeter, the core comprising core material and including first and second major surfaces; and a first arranged pattern of recesses on at least the first major surface of the core, each recess terminating in a membrane comprising core material; and an adhesive interface at the bottom wall surface, wherein the adhesive interface comprises contact between the first adhesive layer and the membrane.

2. The adhesive article of embodiment 1, wherein the core comprises a non-woven material.

3. The adhesive article of embodiment 2, wherein the membrane comprises consolidated non-woven material.

4. The adhesive article of embodiment 3, wherein the core material has a void volume, and wherein the void volume of the membrane is substantially less than a void volume of the core material in interstitial spaces between adjacent recesses, including up to no void volume.

5. The adhesive article of embodiment 1, wherein the membrane comprises a film of core material.

6. The adhesive of embodiments 1-5, wherein the membranes reside in one more planes parallel to a plane coincident with the first major surface.

7. The adhesive article of embodiments 1-6, and further comprising a hardgood adjacent the first or second adhesive layer.

8. The adhesive article of embodiments 1-7, wherein the first major surface includes interstitial spaces between recesses, wherein contact between the interstitial spaces and the first adhesive layer defines a first core interface, and wherein a Peel Ratio between the recess interface and the first core interface is at least 1.15:1.

9. The adhesive article of embodiments 1-8, wherein the 90° Degree Adhesion Strength of the article is at least 40 oz/in$^2$.

10. The adhesive article of embodiments 1-9, wherein the 90° Degree Adhesion Strength of the article is at least 100 oz/in$^2$.

11. The adhesive article of embodiments 1-10, further comprising a second adhesive layer adjacent the second major surface.

12. The adhesive article of embodiment 11, wherein contact between the second adhesive layer and second major surfaces forms a second core interface, and wherein a Peel Ratio between the recess interface and the second core interface is at least 1.15:1.

13. The adhesive article of embodiments 1-11, wherein the arranged pattern of recesses has a density of at least 20 recesses per square centimeter.

14. The adhesive article of embodiments 1-13, wherein each recess in the arranged pattern of recesses has a largest cross-sectional dimension of at least 0.5 mm.

15. The adhesive article of embodiments 1-14, wherein the core includes a thickness, and wherein the membrane has a membrane thickness of at least 5% of the core thickness.

16. The adhesive article of embodiments 1-15, and further comprising a second adhesive layer on the second major surface.

17. The adhesive article of embodiments 1-16, wherein any adhesive layer is a peelable adhesive.

18. The adhesive article of any of the preceding embodiments, wherein the adhesive is ultrasonically bonded to the membrane.

19. The adhesive article of any of the preceding embodiments, wherein the adhesive article removes from an adherend damage-free.

20. The adhesive article of embodiment 16, wherein the adherend is painted drywall having a sheen ranging from flat or matte to glossy.

21. The adhesive article of any of the previous embodiments, wherein the application of force in a direction normal to the core plane results in a loss of structural integrity within a portion of the core.

22. A method for making an adhesive article, the method comprising: providing a core having first and second opposing major surfaces and including a consolidatable core material; laminating a peelable adhesive on at least one of the major surfaces; and consolidating a plurality of discrete regions of the core material to form an arranged pattern of recesses; and creating a plurality of adhesive interfaces between the peelable adhesive and each consolidated region of the backing.

23. The method of embodiment 22, wherein the laminating step occurs prior to the condensing step.

24. The method of embodiment 22, wherein the laminating step occurs after the condensing step.

25. The method of embodiments 23 or 24, wherein the condensing step comprising ultrasonically bonding at least the backing material at a plurality of discrete regions.

26. The method of embodiment 25, wherein the bonding comprises ultrasonic point bonding.

27. The method of embodiment 23 or 24; wherein the laminating step forms a core-adhesive interface on a major surface.

28. The method of embodiment 23, wherein the condensing step creates interstitial space between the recesses, and wherein contact between the peelable adhesive layer and the interstitial spaces forms a first core interface.

29. The method of embodiments 23-28, and further comprising bonding the second major surface of the backing to a hardgood.

30. The method of embodiment 29, wherein the bonding step occurs after the condensing step.

31. The method of embodiment 23, wherein providing a backing having first and second opposing major surfaces comprises providing a backing having an arranged pattern of recesses on at least one of the major surfaces.

32. The method of embodiment 31, wherein providing a backing having an arranged pattern of recesses on at least one of the major surfaces includes the step of creating an arranged pattern of recesses on the at least one of the major surfaces.

33. The method of embodiment 31, wherein the arranged pattern on the provided backing includes an array of discrete recesses.

34. The method of embodiment 31, wherein consolidating a plurality of discrete regions of the backing material to form an arranged pattern of recesses comprises creating an arranged pattern of channels across at least one of the first and second major surfaces.

35. An adhesive article for mounting an object to a surface, the article comprising: a first adhesive layer comprising a first peelable adhesive composition: a core adjacent the first adhesive layer and defining a perimeter, the core comprising porous core material and including first and second major surfaces; and a first arranged pattern of recesses on at least the first major surface of the core, each recess terminating in a membrane comprising core material, wherein the first peelable adhesive composition is at least partially within the pores of each membrane.

36. The adhesive article of embodiment 35, wherein the core comprises a non-woven fabric.

37. The adhesive article of embodiment 36, wherein the core comprises at least one of an air-laid nonwoven and a bonded carded web.

38. The adhesive article of embodiment 35, wherein the core material has a void volume, and wherein the first adhesive composition at least partially infiltrates the void volume of the membrane.

39. The adhesive article of embodiment 35, wherein the article includes an available bond area on a major surface of the first adhesive layer of between about 10% and about 90%.

40. The adhesive article of embodiment 39, wherein the article includes an available bond area on a major surface of the first adhesive layer of between about 15% and about 60%.

The following examples describe some exemplary constructions and methods of constructing various embodiments within the scope of the present application. The following examples are intended to be illustrative, but the particular materials and amounts thereof recited in these examples, as well as other conditions and details, should not be construed to unduly limit this disclosure.

EXAMPLES

TABLE 1

Material and supplier information

| | Material | Description | Supplier |
|---|---|---|---|
| Core Materials | UNIPRO 275 | S/M/S Nonwoven Web | Midwest Filtration LLC, West Chester Township, OH |
| | UNIPRO 150 | S/M/S Nonwoven Web | Midwest Filtration LLC, West Chester Township, OH |
| | Nonwoven Web 1 | Spun-bond Polypropylene Nonwoven | 3M Company, St. Paul, MN |
| | Nonwoven Web 2 | Carded Polyethylene terephthalate Nonwoven | 3M Company, St. Paul, MN |
| | Nonwoven Web 3 | Carded Nylon Nonwoven | 3M Company, St. Paul, MN |
| | Nonwoven Web 4 | Carded Polyethylene terephthalate Nonwoven | 3M Company, St. Paul, MN |
| Rubber-based Adhesive | KRATON D1184 | Radial Styrene-Butadiene Block Copolymer (SBS) | KRATON Performance Polymers, Inc., Houston, TX |
| | SOLPRENE 1205 | Styrene-Butadiene Rubber (SBR) | Dynasol Elastomers, Houston, TX |
| | POLYSTER T160 (YS T160) | Terpene phenolic resin | Yasuhara Chemical Company, Ltd., Fuchu-city, Hiroshima, Japan |

Test Methods

Lap Shear (0° Peel) Adhesion Strength Test

The peel adhesion strength and removability were evaluated by the following method. Test constructions were applied to adherends by hand under moderate pressure (roughly 5 pounds) for 5 seconds. Adhered samples were aged at 72° F. (22° C.), 50% relative humidity for 3 days before testing. Immediately preceding the test, the adhesive construction's remaining liner was removed and a stainless steel shim (6"×2"×0.031", obtained from ChemInstruments, West Chester Township, Ohio) was applied to the top adhesive surface with moderate pressure (roughly 5 pounds) for 5 seconds. Exposed edges of the adherend and stainless steels him were placed in opposing clamps on the INSTRON universal testing machine. The shear tests were conducted with an INSTRON universal testing machine with a crosshead speed of 12 in/min (30.5 cm/min) until the construction removed from the adherend surface. The load cell force was recorded as a function of crosshead displacement. Four replicates were tested for each sample.

90° Peel Adhesion Strength Test

The peel adhesion strength and removability were evaluated by the following method. Test constructions were applied to adherends by hand under moderate pressure (roughly 5 pounds) for 5 seconds. Adhered samples were aged at 72° F. (22° C.), 50% relative humidity for 3 days before testing. Immediately preceding the test, the adhesive construction's remaining liner was removed and an aluminum t-bar (Aluminum 6061-T6 bare t-bar 1.5"×1.5"×0.25" cut to 1.5", OnlineMetals, Seattle Wash.) was applied to the top adhesive surface with moderate pressure (roughly 5 pounds) for 5 seconds. The adherend was clamped to a flat surface and the aluminum t-bar was placed in the top clamp of an INSTRON universal testing machine. The peel tests were conducted with an INSTRON universal testing machine with a crosshead speed of 12 in/min (30.5 cm/min) until the construction removed from the adherend surface. The load cell force was recorded as a function of crosshead displacement. If any adhesive remained on the adherend, it was removed by hand to better observe damage level. Four replicates were tested for each sample. The damage visual evaluation was as follows: 0-no damage, 1-small paint bubble (less than 10% of surface area), 2-large paint bubble (great than 10% of surface area), 3-small paper tear, 4-Paper tear/damage (<50%), 5-Paper tear damage (>50%). Two replicates were tested for each sample.

Weight Hanging Test

Figure 9:
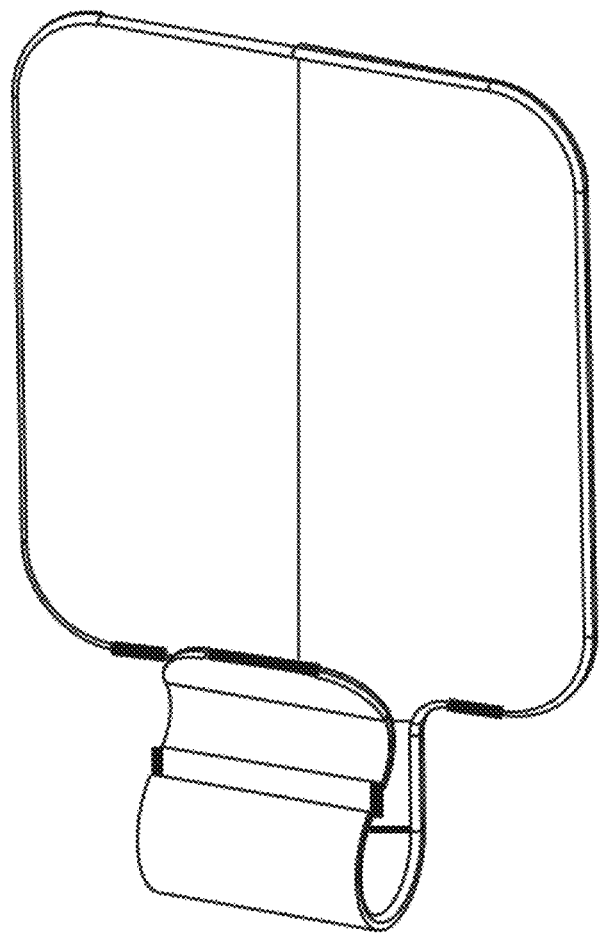
FIG. 9 is a perspective view of a hook used to conduct the Weight Hanging Test on Exemplary adhesive articles of the present disclosure.

Test constructions were applied first to 1.25 inch by 1.35 inch injection molded polycarbonate hooks, each hook having a thickness of 30 mils and of the type depicted in FIG. 9, by hand under moderate pressure (roughly 5 pounds) for 5 seconds. The hook and adhesive construction was then applied to adherend by hand under moderate pressure (roughly 5 pounds for 5 seconds) such that the hook was positioned at the bottom of the construction allow the hanging of weights. A plastic bag containing steel shot (2.0 pounds for examples 1-11 and 1.0 pounds for examples 12-21) was suspended from the hook immediately after application to the wallboard adherend. Samples were observed after 1, 24, 48, and 72 hours of hanging and failures were recorded at each time point. All samples were tested in 3 replicates except Example 9 which had 2 replicates. The performance value is an average of the hang time for all replicates of a given example such that the maximum performance value would be 72 hours and the minimum would be 0 hours.

Repositioning Test

Test constructions were applied first to 1.25 inch by 1.35 inch injection molded polycarbonate hooks, each hook having a thickness of 30 mils and of the type depicted in FIG. 9, by hand under moderate pressure (roughly 5 pounds) for 5 seconds. The hook and adhesive construction was then applied to the adherend by hand under moderate pressure (roughly 5 pounds) for 5 seconds. A plastic bag containing steel shot (1.0 pounds) was suspended from the hook immediately. After waiting approximately one minute, the weight was removed. The hook and adhesive construction was then removed and reapplied by hand under moderate pressure to a separate section of the adherend and the weight immediately reapplied. This removal and reapplication process is repeated twice more before allowing the weight to hang in the final hook position for 72 hours. Samples were observed after 1, 24, 48, and 72 hours of hanging and failures were recorded at each time point. All samples were tested in 3 replicates. The performance value is an average of the hang time for all replicates of a given example such that the maximum performance value would be 72 hours and the minimum would be 0 hours.

Determination of Peak Force

The peak force for each of the adhesion strength tests was determined from the raw data output from INSTRON Bluehill 3 software, which recorded crosshead displacement and force (oz). The peak force was then divided by the active adhesive area to obtain a force (ounces) per unite area (square inches).

Test Adherends

Drywall panels (obtained from Materials Company, Metzger Building, St. Paul, Minn.) were painted Sherwin-Williams DURATION Interior Acrylic Latex Ben Bone White Paint (Sherwin-Williams Company, Cleveland, Ohio) for peel tests and Behr Premium Plus Ultra Flat Egyptian Nile Paint & Primer in One Interior Paint (Behr Process Corporation, Santa Ana, Calif.) for weight hanging tests. Procedure for painting: a first coat of paint was applied to a panel by paint roller, followed by air drying for approximately 1 hour at ambient conditions. A second coat of paint was applied and dried at ambient conditions for at least 7 days before use.

Examples 1-11 and Comparative Examples 1-4 and Controls 1-2

TABLE 2

Example Constructions

| Example | Adhesive | Adhesive Geometry | Core | Point Bond Geometry | Active Adhesive Area | FIG. |
|---|---|---|---|---|---|---|
| Control 1 | Adhesive 1 | 1" × 1" | 3M Nonwoven 1 | None | 1" | — |
| Control 2 | Adhesive 1 | 1" × 1" | None | Continuous, Planar | 1" | — |
| Example 1 | Adhesive 1 | 1" × 1" | UNIPRO 150 | Pre-Welded Only | 1" | 3A |

TABLE 2-continued

Example Constructions

| Example | Adhesive | Adhesive Geometry | Core | Point Bond Geometry | Active Adhesive Area | FIG. |
|---|---|---|---|---|---|---|
| Example 2 | Adhesive 1 | 1" × 1" | UNIPRO 275 | Pre-Welded Only | 1" | 3B |
| Example 3 | Adhesive 1 | 1" × 1" | UNIPRO 150 | Pre-welded and Post-welded with lines | 1" | 3C |
| Example 4 | Adhesive 1 | 1" × 1" | UNIPRO 275 | Pre-welded and Post-welded with lines | 1" | 3D |
| Example 5 | Adhesive 1 | 1" × 1" | 3M Nonwoven 1 | Post-welded with low density Circles | 1" | 3E |
| Example 6 | Adhesive 1 | 1" × 1" | 3M Nonwoven 1 | Post-welded with medium Density Circles | 1" | 3F |
| Example 7 | Adhesive 1 | 1" × 1" | 3M Nonwoven 1 | Post-welded with high density circles | 1" | 3G |
| Example 8 | Adhesive 1 | 1" × 1" | 3M Nonwoven 1 | Post-welded with mesh | 1" | 3H |
| Example 9 | Adhesive 2 | 1" × 1" | 3M Nonwoven 1 | Post-welded with low density circles | 1" | 3I |
| Example 10 | Adhesive 2 | 1" × 1" | 3M Nonwoven 1 | Post-welded with medium density circles | 1" | 3J |
| Example 11 | Adhesive 2 | 1" × 1" | 3M Nonwoven 1 | Post-welded with high density circles | 1" | 3K |
| Comp. Example 1 | GLU DOTS Removable Dot N' Go Dispenser ⅜" Diameter Circles | | | | 0.44" | — |
| Comp. Example 2 | VELCRO Hanging Strip, Die Cut 1" × 1 Tape with ⅞" Coin | | | | 0.60" | — |
| Comp. Example 3 | FOREVER IN TIME 3D Pop Dots, ½" Circles | | | | 0.785" | — |
| Comp. Example 4 | UGLU Glue Strips, Die Cut to 1" × 1" Tape | | | | 1" | — |

Nonwoven Webs

Nonwoven web 1 was obtained from 3M Company, St. Paul Minn., of the general type described in U.S. Pat. No. 8,162,153. The web was a spunbond web with a basis weight of 65 grams per square meter and an Effective Fiber Diameter (as defined and described in the '153 patent) of 18.40 μm. The web possesses a solidity of 11.9%.

Nonwoven web 2 was obtained by using a typical carding machine (as described in U.S. Pat. No. 4,599,766) to produce a nonwoven web with a basis weight of 106 grams per square meter, an Effective Fiber Diameter (as defined and described in the '153 patent) of 42.3 μm, and a solidity of 2.5%. The fibers used in the web were; 70% 15 denier Type 295™ Polyester Staple fiber (available from Indoroma Ventures PCL, of Bangkok, Thailand) and 30% 4 denier PE/PET bicomponent fibers (available from Kilop USA, Inc., High Point, N.C.). The carded web was then passed through a typical forced air oven at 280° F. (138° C.) to thermally bond the fibers within the web.

Nonwoven web 3 was obtained by using a typical carding machine (as described in U.S. Pat. No. 4,599,766) to produce a nonwoven web with a basis weight of 70 grams per square meter, an Effective Fiber Diameter (as defined and described in the '153 patent) of 31.4 μm, and a solidity of 1.2%. The fibers used in the web were; 70% 70 denier nylon Staple (made by a process similar to that described in U.S. Pat. No. 2,679,072) and 30% 15 PE/PET bicomponent fibers (available from Kilop USA, Inc., High Point, N.C.). The carded web was then passed through a typical forced air oven at 280° F. (138° C.) to thermally bond the fibers within the web.

Nonwoven web 4 was obtained by using a typical carding machine (as described in U.S. Pat. No. 4,599,766) to produce a nonwoven web with a basis weight of 26 grams per square meter, an Effective Fiber Diameter (as defined and described in the '153 patent) of 54.8 μm, and a solidity of 1.5%. The fibers used in the web were; 70% 6 denier polyester staple fibers (as described in U.S. Pat. No. 2,679,072) and 30% 4 denier PE/PET bicomponent fibers (available from Kilop USA, Inc., High Point, N.C.). The carded web was then passed through a typical forced air oven at 280° F. (138° C.) to thermally bond the fibers within the web.

UNIPRO 150 and UNIPRO 275 were obtained from Midwest Filtration LLC and used as received.

Pressure Sensitive Adhesive Compositions

Adhesive 1: A pressure-sensitive adhesive composition was prepared having an 85:15 ratio of KRATON D1184 to SOLPRENE 1205 as the elastomer component and 35 parts of total tackifier component based on 100 parts of total elastomer. All of the components were added to a glass jar along with toluene to make a solution of approximately 30% solids. The jar was sealed and the contents thoroughly mixed by placing the jar on a roller at about 2-6 rpm for at least 24 hours prior to coating.

Adhesive 2: A silicone polyurea block copolymer based pressure-sensitive adhesive composition was prepared according to the method described for Example 28 in U.S. Pat. No. 6,569,521, except that the composition was prepared to have the weight % MQ resin amount of 50.

Preparation of Transfer Adhesives

Adhesive 1: The pressure sensitive adhesive compositions above were knife-coated onto a paper liner web having a silicone release surface. The paper liner web speed was 2.75 meter/min. After coating, the web was passed through an oven 11 meters long (residence time 4 minutes total) having three temperature zones. The temperature in zone 1 (2.75 meter) was 57° C.; temperature in zone 2 (2.75 meter) was 71° C.; temperature in zone 3 (about 5.5 meter) was 82° C. The caliper of the dried adhesive was approximately 2.0 mils thick. Transfer adhesives were then stored at ambient conditions.

Adhesive 2: Pressure sensitive adhesive compositions were knife-coated onto a paper liner web having a silicone release surface. The paper liner web speed was 2.75 meter/min. After coating, the web was passed through an oven 11 meters long (residence time 4 minutes total) having three temperature zones. The temperature in zone 1 (2.75 meter) was 57° C.; temperature in zone 2 (2.75 meter) was 80° C.; temperature in zone 3 (about 5.5 meter) was 93° C. The caliper of the dried adhesive was approximately 2.5-3.0 mils thick. The transfer adhesives were then stored at ambient conditions.

Ultrasonic welding and embossing of the article construction described previously was conducted with a Branson 2000X ULTRASONIC WELDER. The ultrasonic welder had a rectangular titanium horn with a gain of 1:2. The welding surface of the horn had dimensions of 1.5"×4". The ultrasonic welds were conducted against a patterned aluminum plates. Examples of the patterns are shown in FIGS. 3A-3K. The ultrasonic welding conditions used a 1:1 gain booster, 80-90 psi (0.55-0.62 MPa), force trigger of 50 pounds (23 kg), welding amplitude of 100% with an end of weld hold time of 1 second. The ultrasonic welds were performed with a peak power mode where the peak power was set to 20-40% (800-1600 W). The article construction to be welded/embossed is placed between the horn and patterned plate (anvil); the horn then descended to compress the structure and when the trigger force was met, the ultrasonic vibrations were started. The ultrasonication was stopped at the target peak power setting, and the ultrasonicated sample was contained between the horn and the anvil during the set hold time.

TABLE 3

Post Weld Patterns and Conditions

| | Gain | Peak Power (%) | Duration (s) | Amplitude (%) | Pressure (PSI) | FIG. |
|---|---|---|---|---|---|---|
| Example 3 | 1 | 20 | 1 | 100 | 90 | 3C |
| Example 4 | 1 | 20 | 1 | 100 | 90 | 3D |
| Example 5 | 1 | 25 | 1 | 100 | 90 | 3E |
| Example 6 | 1 | 20 | 1 | 100 | 80 | 3F |
| Example 7 | 1 | 50 | 1 | 100 | 90 | 3G |
| Example 8 | 1 | 40 | 1 | 100 | 90 | 3H |
| Example 9 | 1 | 25 | 1 | 100 | 90 | 3I |
| Example 10 | 1 | 28 | 1 | 100 | 90 | 3J |
| Example 11 | 1 | 50 | 1 | 100 | 90 | 3K |

TABLE 4

Lap Shear (0° Peel) Adhesion Strength Test Data

| Example | Average of Max Load (oz/in$^2$) |
|---|---|
| Control 1 | 11.7 |
| Control 2 | 181.2 |
| 1 | 102.8 |
| 2 | 104.6 |
| 3 | 141.2 |
| 4 | 146.3 |
| 5 | 35.6 |
| 6 | 63.1 |
| 7 | 157.5 |
| 8 | 79.3 |
| 9 | 34.6 |
| 10 | 109.1 |
| 11 | 172.9 |
| Comparative Example 1 | 49.6 |
| Comparative Example 2 | 242.7 |
| Comparative Example 3 | 419.5 |
| Comparative Example 4 | 62.6 |

TABLE 5

90° Peel Adhesion Strength Test Data

| Example | Average of Max Load (oz/in$^2$) | Average of Damage Visual rating (0 to 5) | Ratio Lap Shear:90° Peel |
|---|---|---|---|
| Control 1 | 15.1 | 0 | 0.77 |
| Control 2 | 296.5 | 3 | 0.61 |
| 1 | 169.3 | 0.0 | 0.61 |
| 2 | 152.4 | 0.0 | 0.69 |
| 3 | 198.9 | 0.0 | 0.71 |
| 4 | 180.0 | 0.0 | 0.81 |
| 5 | 65.8 | 0.0 | 0.54 |
| 6 | 146.9 | 0.0 | 0.43 |
| 7 | 286.3 | 1.3 | 0.55 |
| 8 | 147.9 | 1.3 | 0.54 |
| 9 | 90.1 | 0.0 | 0.38 |
| 10 | 284.1 | 0.0 | 0.38 |
| 11 | 373.0 | 0.0 | 0.46 |
| Comparative Example 1 | 231.7 | 3.25 | 0.21 |
| Comparative Example 2 | 103.3 | 2 | 2.35 |
| Comparative Example 3 | 525.7 | 1.75 | 0.80 |
| Comparative Example 4 | 576.5 | 5 | 0.11 |

TABLE 6

Weight Hanging Test Data

| Example | Average Time Hanging 2 lbs (hours) |
|---|---|
| Control 1 | 0 |
| Control 2 | 72 |
| 1 | 72 |
| 2 | 72 |
| 3 | 72 |
| 4 | 72 |
| 5 | 72 |
| 6 | 72 |
| 7 | 48 |
| 8 | 36 |
| 9 | 9 |
| 10 | 72 |
| 11 | 64 |
| Comparative Example 1 | 0 |
| Comparative Example 2 | 72 |
| Comparative Example 3 | 0 |

TABLE 6-continued

Weight Hanging Test Data

| Example | Average Time Hanging 2 lbs (hours) |
|---|---|
| Comparative Example 4 | 56 |

Lap shear gives an indication of the force required for an article to fail in shear. The data shows that a solid slab of adhesive (Control 2) gives the highest values for a given adhesive composition, but causes damage. The presence of a core as described in the invention provides a damage-free release but at the expense of shear strength (Control 1). The introduction of ultrasonic welds or point bonds to an adhesive construction of the present disclosure results in a shear peel strength comparable to a solid slab of adhesive but with the added benefit of a damage-free peel. It was also demonstrated that the format (shape) and density of the ultrasonic weld pattern affects adhesion performance. By contrast, the Comparative Examples each cause damage while showing varying degrees of shear performance.

The weight hanging test data shows clearly that point bonding dramatically improves the weight bearing capacity of the adhesive constructions.

Examples 12-21

TABLE 7

Example Constructions

| Example | Adhesive | Adhesive Geometry | Core | Pattern Geometry | Active Adhesive Area | FIG. |
|---|---|---|---|---|---|---|
| Example 12 | Adhesive 1 | 1" × 1" | Unipro 275 | Embossed Waves | 1" | 3O |
| Example 13 | Adhesive 1 | 1" × 1" | Unipro 275 | Embossed Stars | 1" | 3P |
| Example 14 | Adhesive 1 | 1" × 1" | Unipro 150 × 2 | Embossed Footballs | 1" | 3Q |
| Example 15 | Adhesive 1 | 1" × 1" | Unipro 275 | Embossed Footballs | 1" | 3R |
| Example 16 | Adhesive 1 | 1" × 1" | 3M Nonwoven 1 | Embossed Footballs | 1" | 3S |
| Example 17 | Adhesive 1 | 1" × 1" | 3M Nonwoven 2 | Embossed Footballs | 1" | 3T |
| Example 18 | Adhesive 1 | 1" × 1" | 3M Nonwoven 2 | Embossed Hexagons | 1" | 3U |
| Example 19 | Adhesive 1 | 1" × 1" | 3M Nonwoven 3 | Embossed Hexagons | 1" | 3V |
| Example 20 | Adhesive 1 | 1" × 1" | 3M Nonwoven 4 | Embossed Hexagons | 1" | 3W |
| Example 21 | Adhesive 3 | 1" × 1" | 3M Nonwoven 2 | Embossed Hexagons | 1" | 3X |

Adhesive 3 Composition

The polydisiloxane polyoxamide elastomer (PDMS Elastomer I) used in the adhesive article of Example 21 was like that of Example 12 of U.S. Pat. No. 8,765,881. Example 12 refers to an amine equivalent weight of 10,174 g/mol, or a molecular weight of about 20,000 g/mol. The MQ resin tackifier resin used in the pressure-sensitive adhesive compositions was SR545 (61% solids in toluene) (available from GE Silicones, Waterford, N.Y.).

Adhesive 3 was prepared by adding all indicated components to glass jars in the indicated proportions at 30 weight % solids in ethyl acetate. The jars were sealed and the contents thoroughly mixed by placing the jars on a roller at about 2-6 rpm for at least 24 hours prior to coating.

Preparation of Transfer Adhesive Films

Adhesive 3 was knife-coated onto a paper liner web having a silicone release surface. The paper liner web speed was 2.75 meter/min. After coating, the web was passed through an oven 11 meter long (residence time 4 minutes total) having three temperature zones. The temperature in zone 1 (2.75 meter) was 57° C.; temperature in zone 2 (2.75 meter) was 80° C.; temperature in zone 3 (about 5.5 meter) was 93° C. The caliper of the dried adhesive was approximately 2.5-3.0 mils thick. The transfer adhesive films were then stored at ambient conditions.

Pattern Embossing

All examples excluding examples 18 and 20 were prepared by first laminating the exposed surface of a transfer tape to one side of a nonwoven sample of appropriate dimensions by hand. Next, a second transfer tape was laminated to the remaining exposed side of nonwoven to create a liner-adhesive-nonwoven-adhesive-liner stack. The samples were then fed into the embossing station by hand and the adhesive construction was embossed through the liner. Samples 18 and 20 were prepared as a roll-roll process such that 2 rolls of adhesive and one roll of nonwoven were laminated and embossed in the liner-adhesive-nonwoven-adhesive-liner stack-up in a single nipped process.

Embossing Station 1

Samples were embossed by being passed through a metal roll that is patterned (e.g., engraved) with raised and depressed areas and a smooth metal roll of about 14 inches in width, in generally similar manner to the methods described, e.g., in U.S. Pat. No. 6,383,958 (Swanson et al) at conditions reported in Table 8 below.

Embossing Station 2

Samples were embossed by being passed through a metal roll that is patterned (e.g., engraved) with raised and depressed areas and a smooth metal roll of about 22 inches in width, in generally similar manner to the methods described, e.g., in U.S. Pat. No. 6,383,958 (Swanson et al) at conditions reported in Table 8 below.

TABLE 8

Embossing Station Conditions

| | Embossing Station | Pressure | Gap between rolls (inches) | Roll Temperature (Pattern/Smooth, ° C.) | Speed (feet per minute) |
|---|---|---|---|---|---|
| Example 12 | 1 | 150 PLI | 0 | 230/230 | 2 |
| Example 13 | 1 | 150 PLI | 0 | 230/230 | 2 |
| Example 14 | 1 | 350 PLI | .0055 | 276/264 | 3 |
| Example 15 | 1 | 800 PLI | .006 | 270/270 | 3 |
| Example 16 | 1 | 800 PLI | .006 | 270/270 | 5 |
| Example 17 | 1 | 800 PLI | .006 | 270/270 | 5 |
| Example 18 | 2 | 300 PSI | .003 | 288/272 | 20 |
| Example 19 | 2 | 300 PSI | .003 | 287/271 | 5 |
| Example 20 | 2 | 300 PSI | .003 | 287/271 | 20 |
| Example 21 | 2 | 300 PSI | .003 | 225/235 | 2 |

TABLE 9

Lap Shear (0° Peel) Adhesion Strength Test Data

| Example | Average of Max Load Divided by Active Adhesive Area (oz/in$^2$) |
|---|---|
| 12 | 149.6 |
| 13 | 149.5 |
| 14 | 112.8 |
| 15 | 87.3 |
| 16 | 70.1 |
| 17 | 107.2 |
| 18 | 81.1 |
| 19 | 86.4 |
| 20 | 97.6 |
| 21 | 91.3 |

TABLE 10

90° Peel Adhesion Strength Test Data

| Example | Average of Max Load Divided by Active Adhesive Area (oz/in$^2$) | Average of Damage Visual rating (0 to 5) | Ratio Lap Shear:90° Peel |
|---|---|---|---|
| 12 | 310.0 | 0.0 | 0.48 |
| 13 | 271.1 | 0.0 | 0.55 |
| 14 | 285.4 | 0.0 | 0.40 |
| 15 | 253.7 | 0.0 | 0.34 |
| 16 | 185.4 | 0.0 | 0.38 |
| 17 | 220.7 | 0.0 | 0.49 |
| 18 | 179.0 | 0.0 | 0.45 |
| 19 | 167.2 | 0.0 | 0.52 |
| 20 | 223.1 | 0.0 | 0.44 |
| 21 | 206.5 | 0.0 | 0.44 |

TABLE 11

Weight Hanging Test Data

| Example | Average Time Hanging 1 lbs (hours) |
|---|---|
| 12 | 72 |
| 13 | 72 |
| 14 | 72 |
| 15 | 72 |
| 16 | 72 |
| 17 | 72 |
| 18 | 72 |
| 19 | 72 |
| 20 | 72 |
| 21 | 72 |

TABLE 12

Repositionability Test Data

| Example | Average Time Hanging 1 lbs (hours) |
|---|---|
| 4 | 72 |
| 12 | 72 |
| 13 | 72 |
| 14 | 72 |
| 15 | 72 |
| 16 | 72 |
| 17 | 32 |
| 18 | 72 |
| 19 | 72 |
| 20 | 72 |
| 21 | 72 |
| 22 | 72 |
| Comparative Example 1 | 0* |
| Comparative Example 2 | 72 |
| Comparative Example 3 | 24 |
| Comparative Example 4 | 72* |

*Wall damage observed during repositioning experiment.

The patents, patent documents, and patent applications cited herein are incorporated by reference in their entirety as if each were individually incorporated by reference. It will be apparent to those of ordinary skill in the art that various changes and modifications may be made without deviating from the inventing concepts set from above. Thus, the scope of the present disclosure should not be limited to the structures described herein. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims and equivalents thereof

We claim:

1. An adhesive article for mounting an object to a surface, the article comprising:
    a first adhesive layer;
    a core adjacent the first adhesive layer and defining a perimeter, the core comprising core material and including first and second major surfaces; and
    a first arranged pattern of recesses on at least the first major surface of the core, each recess terminating in a membrane, wherein the membrane defines the bottom surface of the recess and comprises core material; and
    an adhesive interface within the membrane, wherein the adhesive interface comprises contact between the first adhesive layer and the membrane,
    wherein the article is configured such that removal of the article from an adherend at a peel angle exceeding 35 degrees results in at least one of delamination of the first adhesive layer from the first major surface of the core or degradation of the core.

2. The adhesive article of claim 1, wherein the core comprises a non-woven material.

3. The adhesive article of claim 1, wherein the membrane comprises consolidated core material.

4. The adhesive article of claim 3, wherein the core material has a void volume, and wherein the void volume of the membrane is substantially less than a void volume of the core material in the interstitial spaces between adjacent recesses.

5. The adhesive article of claim 1, wherein the membrane comprises a film of core material.

6. The adhesive article of claim 1, wherein the membranes reside in one more planes substantially parallel to a plane coincident with the first major surface.

7. The adhesive article of claim 1, wherein the first major surface includes interstitial spaces between recesses, wherein contact between the interstitial spaces and the first adhesive layer defines a first core interface, and wherein a Peel Ratio between the adhesive interface and the first core interface is at least 1.15:1.

8. The adhesive article of claim 1, further comprising a second adhesive layer adjacent the second major surface.

9. The adhesive article of claim 1, wherein the arranged pattern of recesses has a density of at least 20 recesses per square centimeter.

10. The adhesive article of claim 8, and further including a second arranged pattern of recesses on the second major surface of the core, each recess of the second arranged pattern terminating in a membrane shared with a recess of the first arranged pattern, wherein the membrane defines the bottom surface of each the recess and comprises core material; and a second adhesive interface at the bottom surface of the recess of the second arranged pattern of recesses or within the membrane, wherein the second adhesive interface comprises contact between the second adhesive layer and the membrane.

11. The adhesive article of claim 1, wherein the adhesive is ultrasonically bonded to the membrane.

12. The adhesive article of claim 1, wherein the application of force in a direction normal to the core plane results in a loss of structural integrity within a portion of the core.

13. An adhesive article for mounting an object to a surface, the article comprising:
a first adhesive layer comprising a first peelable adhesive composition:
a core adjacent the first adhesive layer and defining a perimeter, the core comprising porous core material having a first void volume and including first and second major surfaces; and
a first arranged pattern of recesses on at least the first major surface of the core, each recess terminating in a membrane comprising core material and having a second void volume less than the first void volume, the membrane defining a bottom surface of the recess,
wherein the first peelable adhesive composition is at least partially within the pores of each membrane, and
wherein the article is configured such that removal of the article from an adherend at a peel angle exceeding 35 degrees results in at least one of delamination of the first adhesive layer from the first major surface of the core or degradation of the core.

14. The adhesive article of claim 13, wherein the core comprises a non-woven fabric, and wherein the first adhesive composition at least partially infiltrates the pores of the core material having the first void volume adjacent the membrane.

* * * * *

UNITED STATES PATENT AND TRADEMARK OFFICE
CERTIFICATE OF CORRECTION

PATENT NO. : 11,078,383 B2  
APPLICATION NO. : 16/797516  
DATED : August 3, 2021  
INVENTOR(S) : Brett Krull et al.

Page 1 of 1

It is certified that error appears in the above-identified patent and that said Letters Patent is hereby corrected as shown below:

In the Claims

Column 46  
Line 45, In Claim 1, before "core material" insert -- a --.  
Line 49, In Claim 1, delete "the bottom" and insert -- a bottom --, therefor.  
Line 50, In Claim 1, before "core" insert -- the --.

Column 47  
Line 17 (approx.), In Claim 10, before "further" delete "and".  
Line 22 (approx.), In Claim 10, before "recess" delete "the".  
Line 22 (approx.), In Claim 10, before "core" insert -- the --.

Column 48  
Line 14, In Claim 13, before "core" insert -- the --.

Signed and Sealed this  
Twenty-sixth Day of April, 2022

Katherine Kelly Vidal  
*Director of the United States Patent and Trademark Office*